United States Patent
Da Costa et al.

(10) Patent No.: US 10,467,869 B2
(45) Date of Patent: Nov. 5, 2019

(54) APPARATUS AND METHOD FOR PROVIDING BOOST PROTECTION LOGIC

(71) Applicant: Immersion Corporation, San Jose, CA (US)

(72) Inventors: Henry Da Costa, Montreal (CA); Kaniyalal Shah, Fremont, CA (US); Andry Rabemiarisoa, Lasalle (CA); Liwen Wu, Verdun (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/031,810

(22) Filed: Jul. 10, 2018

(65) Prior Publication Data
US 2019/0035235 A1   Jan. 31, 2019

Related U.S. Application Data

(60) Provisional application No. 62/538,768, filed on Jul. 30, 2017, provisional application No. 62/554,708, filed on Sep. 6, 2017.

(51) Int. Cl.
*G08B 6/00* (2006.01)
*G06F 3/01* (2006.01)
*G06F 3/038* (2013.01)

(52) U.S. Cl.
CPC .............. *G08B 6/00* (2013.01); *G06F 3/016* (2013.01); *G06F 3/038* (2013.01)

(58) Field of Classification Search
CPC . B06B 1/023; B06B 2201/52; B06B 2201/53; H02P 25/032
USPC .............................................. 340/407.1, 7.6
See application file for complete search history.

(56) References Cited

U.S. PATENT DOCUMENTS

| | | | |
|---|---|---|---|
| 4,578,630 A * | 3/1986 | Grosch | H02M 3/158 323/271 |
| 4,827,208 A | 5/1989 | Oliver et al. | |
| 5,717,360 A * | 2/1998 | Vu | H03F 3/3001 330/253 |
| 6,351,420 B1 * | 2/2002 | Akaogi | G11C 5/145 327/538 |

(Continued)

FOREIGN PATENT DOCUMENTS

EP   2624100 A1   8/2013

OTHER PUBLICATIONS

Extended European Search Report issued in European Application No. 18184796.3, dated Jan. 3, 2019.

*Primary Examiner* — Daryl C Pope
(74) *Attorney, Agent, or Firm* — Medler Ferro Woodhouse & Mills PLLC

(57) ABSTRACT

An apparatus, such as a haptic-enabled device, and a method for providing boost protection logic are presented. The method comprises receiving, by a control circuit of the apparatus, a nonzero drive signal to be used by the haptic actuator to generate a haptic effect. The control circuit causes a first portion of the nonzero drive signal to be applied to the haptic actuator in a boost mode. The control circuit detects a boost duration exceeding a first defined time threshold, such as a boost timeout threshold, or detects an accumulated boost time exceeding the first defined time threshold. In response, the control circuit causes a second portion of the nonzero drive signal to be applied to the haptic actuator in an amplitude-limited mode.

20 Claims, 37 Drawing Sheets

Haptic-enabled Device 10

Control circuit 16

Haptic Actuator 18

(56) References Cited

U.S. PATENT DOCUMENTS

| | | | |
|---|---|---|---|
| 8,536,906 B2* | 9/2013 | Sprentall | H03K 7/08 327/109 |
| 8,681,519 B2* | 3/2014 | Phadke | H02M 3/1584 323/272 |
| 2002/0126432 A1 | 9/2002 | Goldenberg et al. | |
| 2012/0224401 A1* | 9/2012 | Phadke | H02M 1/4225 363/84 |
| 2012/0313682 A1* | 12/2012 | Sprentall | H03K 7/08 327/172 |
| 2013/0222309 A1 | 8/2013 | Sun et al. | |
| 2015/0028337 A1 | 1/2015 | Kartal | |
| 2015/0227204 A1* | 8/2015 | Gipson | G06F 3/016 345/156 |
| 2018/0162273 A1* | 6/2018 | Ben Abdelaziz | B60K 37/06 |
| 2019/0035235 A1* | 1/2019 | Da Costa | G06F 3/016 |

* cited by examiner

APPARATUS AND METHOD FOR PROVIDING BOOST PROTECTION LOGIC

CROSS-REFERENCE TO RELATED APPLICATIONS

This application claims priority to U.S. Provisional Patent Application No. 62/538,768, filed Jul. 30, 2017 and to U.S. Provisional Patent Application No. 62/554,708, filed Sep. 6, 2017, the entire contents of which are incorporated herein by reference.

FIELD OF THE INVENTION

The present invention is directed to an apparatus and method for providing boost protection logic for protecting a haptic actuator, such as a haptic actuator in a mobile device, user interface device, wearable device, or other consumer electronics.

BACKGROUND

As electronic user interface systems become more prevalent, the quality of the interfaces through which humans interact with these systems is becoming increasingly important. Haptic feedback, or more generally haptic effects, can improve the quality of the interfaces by providing cues to users, providing alerts of specific events, or providing realistic feedback to create greater sensory immersion within a virtual environment. Examples of haptic effects include kinesthetic haptic effects (such as active and resistive force feedback), vibrotactile haptic effects, and electrostatic friction haptic effects.

SUMMARY

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

One aspect of the embodiments herein relate to a method and apparatus for applying one or more nonzero drive signals to a haptic actuator. The method comprises receiving, by a control circuit of the apparatus, a nonzero drive signal to be used by the haptic actuator to generate a haptic effect, wherein the haptic actuator has a defined rated maximum voltage or a defined maximum rated current. The method further comprises causing, by the control circuit, a first portion of the nonzero drive signal to be applied to the haptic actuator in a boost mode, in which the first portion of the nonzero drive signal is scaled to a boosted voltage range or boosted current range, wherein an absolute value of a minimum value or maximum value of the boosted voltage range or boosted current range exceeds the defined rated maximum voltage or the defined rated maximum current of the haptic actuator. The control circuit detects a boost duration exceeding a first defined time threshold, wherein the boost duration is a duration since a start time of the boost mode. In response to detecting the boost duration exceeding the first defined time threshold, the control circuit causes a second portion of the nonzero drive signal to be applied to the haptic actuator in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

One aspect of the embodiments herein relate to a method and apparatus for applying one or more nonzero drive signals to a haptic actuator, the method comprising: receiving, by a control circuit of the apparatus, a nonzero drive signal to be applied to the haptic actuator, wherein the haptic actuator has a defined rated maximum voltage or a defined rated maximum current. The control circuit further causes the nonzero drive signal to be applied to the haptic actuator in a boost mode, in which the nonzero drive signal is scaled to a boosted voltage range or boosted current range, wherein an absolute value of a minimum value or maximum value of the boosted voltage range or boosted current range exceeds the defined rated maximum voltage or defined rated maximum current of the haptic actuator. The method further comprises detecting, after an end of the nonzero drive signal, a boost duration exceeding a first defined time threshold, wherein the boost duration is a duration since a start time of the boost mode; and detecting, after the end of the nonzero drive signal, a subsequent nonzero drive signal to be applied to the haptic actuator, wherein the nonzero drive signal and the subsequent nonzero drive signal are consecutive nonzero drive signals. The control circuit further causes the subsequent nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

One aspect of the embodiments herein relates to a method and apparatus for applying one or more nonzero drive signals to a haptic actuator, the method comprising: receiving, by a control circuit of the apparatus, a nonzero drive signal to be applied to a haptic actuator, wherein the haptic actuator has a defined rated maximum voltage or a defined rated maximum current. The control circuit causes the nonzero drive signal to be applied in a boost mode, in which signal values of the nonzero drive signal are scaled to a boosted voltage range or a boosted current range, wherein an absolute value of a minimum value or maximum value of the boosted voltage range or boosted current range exceeds the defined rated maximum voltage or defined rated maximum current of the haptic actuator, and wherein the nonzero drive signal is one of one or more nonzero drive signals that are applied in the boost mode. The method further comprises tracking an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof. The method further comprises tracking an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or defined rated maximum current, or ii) a second time that is determined by scaling the cumulative amount of time in which the one or more drive signals in the boost mode have been applied at voltages or currents that exceed in absolute value the defined rated maximum voltage or defined rated maximum current. The control circuit further detects the accumulated boost time exceeding a first defined time threshold while a first portion of the nonzero drive signal is being applied in the boost mode. In response to detecting the accumulated boost time exceeding the first defined time threshold, the control circuit causes a second portion of the nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

One aspect of the embodiments herein relates to a method and apparatus for applying one or more nonzero drive signals to a haptic actuator, the method comprising: receiving, by a control circuit of the apparatus, a nonzero drive signal to be applied to a haptic actuator, wherein the haptic actuator has a defined rated maximum voltage or current. The control circuit causes the nonzero drive signal to be applied in a boost mode, in which signal values of the nonzero drive signal are scaled to a boosted voltage range or boosted current range, wherein an absolute value of a minimum value or maximum value of the boosted voltage range or boosted current range exceeds the defined rated maximum voltage or current of the haptic actuator, and wherein the nonzero drive signal is one of one or more nonzero drive signals that are applied in the boost mode. The method further comprises tracking an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof. The method further comprises tracking an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or current, or ii) a second time that is determined by scaling the cumulative amount of time in which the one or more drive signals in the boost mode have been applied at voltages or currents that exceed in absolute value the defined rated maximum voltage or current. The control circuit detects the accumulated boost time exceeding a first defined time threshold while the nonzero drive signal is being applied in the boost mode. The control circuit further receives, after an end of the nonzero drive signal, a subsequent nonzero drive signal. The method further comprises causing the subsequent nonzero drive signal to be applied in an amplitude-limited mode, in which the subsequent nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or current of the haptic actuator, wherein none of the nonzero drive signal is applied in the amplitude-limited mode.

Features, objects, and advantages of embodiments hereof will become apparent to those skilled in the art by reading the following detailed description where references will be made to the appended figures.

BRIEF DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Figure 1:
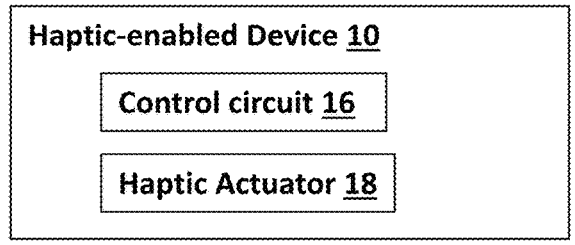
FIGS. 1, 1A, and 1B illustrate block diagrams of control circuit for providing boost protection logic, according to embodiments hereof.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments herein relate to boost protection logic that protects a haptic actuator from damage when the haptic actuator is being overdriven. Overdriving the haptic actuator may refer to, e.g., driving the haptic actuator with a drive signal (e.g., voltage signal or current signal) that exceeds a rated maximum parameter value (e.g., rated maximum voltage or rated maximum current) of the haptic actuator. When overdriving the haptic actuator, the drive signal that is applied to the haptic actuator may be, e.g., a boosted drive signal. For instance, an amplitude modification circuit or module, such as a boost circuit, may amplify a drive signal to exceed the rated maximum voltage of the haptic actuator. More generally speaking, the amplitude modification circuit may map a drive signal to a boosted range, such as a boosted voltage range or boosted current range, that exceeds a rated maximum voltage or rated maximum current of the haptic actuator, in order to generate a boosted drive signal, which may also be referred to as a scaled drive signal or mapped drive signal. The boosted drive signal may desirably create a crisp and strong haptic effect, such as a haptic effect for simulating a mechanical click of a virtual home button displayed on the touchscreen of a mobile device. This boosting of the drive signal, however, increases a risk of damaging the actuator from, e.g., overheating. Thus, embodiments herein relate to a boost protection logic, implemented in hardware or software, that can boost a drive signal while taking measures to protect the haptic actuator from damage.

One aspect of the embodiments of the boost protection logic herein relates to exiting a boost mode if an amplitude modification circuit or module, or more generally a control circuit, has been operating in the boost mode for too long. The boost mode may refer to a mode in which a drive signal is scaled or otherwise mapped to a boosted voltage range or boosted current range. More generally speaking, the boost mode may be a mode in which a signal value of a voltage signal or current signal being applied to a haptic actuator is allowed to exceed a rated maximum voltage or rated maximum current of the haptic actuator. The scaling can be done by, for instance, multiplying signal values of a first drive signal to produce a boosted drive signal. The first drive signal can already be a voltage signal or current signal, or can be a signal whose signal values are dimensionless. In the latter case, the control circuit may map the dimensionless signal values to voltage values or current values. In the boost mode, some of the voltage values or current values to which the signal values of the first drive signal are mapped may exceed the defined rated maximum voltage or defined rated maximum current of the haptic actuator. In one instance, the boost protection logic may cause the control circuit to exit the boost mode if a duration spent in the boost mode (which may be referred to as a boost duration) exceeds a boost timeout threshold. If this condition occurs while a drive signal is still being applied to a haptic actuator, a remaining portion of the drive signal may be applied in an amplitude-limited mode. In the amplitude-limited mode, the drive signal may be scaled or otherwise mapped to an amplitude-limited voltage range or amplitude-limited current range that does not exceed the rated maximum voltage or rated maximum current of the haptic actuator. For instance, the maximum voltage or current value that is permitted to be applied to the haptic actuator in the amplitude-limited mode may be limited to 100%, 80%, 75%, or some other percentage of the rated maximum voltage or rated maximum current of the haptic actuator.

In an embodiment, if the boost duration reaches or exceeds the boost timeout threshold, the control circuit may transition to an amplitude-limited mode, in which the control circuit limits the signal amplitude, or more generally signal value, that is applied to the haptic actuator. The signal value may be limited so that it does not exceed the rated maximum voltage or rated maximum current of the haptic actuator. By limiting the signal value that is applied to the haptic actuator in the amplitude-limited mode, the haptic actuator may cool in temperature, or at least refrain from increasing in temperature. After the drive signal ends, the control circuit may transition from the amplitude-limited mode to a cool-down mode. In some cases, the control circuit may be able to transition to the cool-down mode without entering the amplitude-limited mode, by entering the cool-down mode from a boost cool-down mode, as discussed below. The cool-down mode may be a mode in which the haptic actuator is at rest or, more generally speaking, is not being driven. In the cool-down mode, the control circuit may wait for a subsequent drive signal. The cool-down mode may force all subsequent drive signals to be applied in the amplitude-limited mode until sufficient time is spent in the cool-down mode. For instance, a duration spent in the cool-down mode may have to reach or exceed a cooling time threshold, such as 90 ms, before the control circuit can re-enter the boost mode. In some cases, the boost timeout threshold may have to be satisfied by a continuous duration spent in the cool-down mode, which may be a duration of a time period that is uninterrupted by any drive signal during the period. Waiting in this manner in the cool-down mode may thus prevent the haptic actuator from overheating, and in some cases may allow the haptic actuator to cool in temperature.

In an embodiment, the boost mode, amplitude-limited mode, and cool-down mode may form part of a state machine that is implemented by a control circuit to determine how to drive a haptic actuator. As stated above, the boost mode and the amplitude-limited mode may dictate a voltage range or current range in which the haptic actuator is driven. The control circuit may transition from the boost mode to the amplitude-limited mode, and from the amplitude-limited mode to a cool-down mode. The cool-down mode may control whether the control circuit returns to the amplitude-limited mode or whether the control circuit instead returns to the boost mode. In an embodiment, the state machine may have other modes (also referred to as states), such as an extended boost mode or boost cool-down mode, which are discussed in more detail below.

In an embodiment, transitions among the various modes (e.g., boost mode, amplitude-limited mode, cool-down mode) may be controlled by a duration spent in some of the modes. For instance, the transition from the boost mode to the amplitude-limited mode may be triggered based on a duration spent by a control circuit in the boost mode (i.e., a boost duration), and whether the duration has reached or exceeds a boost timeout threshold. In some cases, the boost duration may span multiple drive signals, and may count time periods separating the multiple drive signals, in which the haptic actuator is undriven.

In an embodiment, the transition from the cool-down mode to the boost mode may be triggered based in part on a duration in which the haptic actuator has been cooling in temperature or, more generally, in which the haptic actuator has been at rest. In some cases, this duration may be a duration since an end of the most recent drive signal. This duration may correspond to a duration in which the control circuit has spent in a cool-down period, which may cover a time period spent in the cool-down mode and in a boost cool-down mode (the boost cool-down mode is discussed below in more detail). In some cases, this duration may refer to a continuous time period (also referred to as a continuous duration) in the cool-down period. Such cases thus may require a cooling time threshold to be exceeded by a duration of a continuous cool-down time period, such that the haptic actuator has been continuously at rest for at least a cooling time threshold before it can be driven in the boost mode again.

In an embodiment, the transition between various modes may be based on an accumulated boost time, which may be a cumulative amount of time in which a control circuit has spent in the boost mode while applying one or more drive signals. The transition may also be based on an accumulated heating time and an accumulated cooling time. The accumulated heating time may be a cumulative amount of time in which signal values have been scaled to a value that exceeds a rated maximum voltage or rated maximum current of a haptic actuator. The accumulated cooling time may be a cumulative amount of time in which the haptic actuator has been at rest or otherwise undriven. In some cases, these cumulative times may be tracked via a timer, and may span multiple drive signals or span multiple cooling periods (also referred to as rest periods).

In an embodiment, when the accumulated boost time reaches or exceeds a time threshold, such as a boost timeout threshold, the control circuit may begin to transition from applying a drive signal in the boost mode to applying the drive signal in an amplitude-limited mode. In an embodiment, the accumulated heating time may be used to track how long the one or more drive signals, while applied in the boost mode, have actually been applied to the haptic actuator at a level that exceeded the defined rated maximum voltage or current. In an embodiment, the accumulated heating time may be used to set a cooling time threshold, which may be, e.g., a minimum cumulative amount of time that the haptic actuator has to cool or otherwise remain undriven before any more drive signals can be applied in the boost mode again. The control circuit may continue applying drive signals in the amplitude-limited mode until an accumulated cooling time reaches or exceeds the cooling time threshold. When the accumulated cooling time does exceed the cooling time threshold, the control circuit may reset the accumulated cooling time, the accumulated heating time, and the accumulated boost time to, e.g., zero. Because the accumulated boost time is reset to zero or to another reset value that is less than the boost timeout threshold, the control circuit may continue to apply drive signals in the boost mode until the accumulated boost time reaches the boost timeout threshold again.

Various embodiments of the present disclosure are illustrated in more detail in the figures. FIG. 1 illustrates a haptic-enabled device 10 that includes a control circuit 16 and a haptic actuator 18. In an embodiment, the haptic-enabled device 10 may be a user interface device, such as a mobile phone, tablet computer, laptop, game console controller, wearable device (e.g., a virtual reality head-mounted device, or a smart watch), or any other user interface device. The control circuit 16 may be a microprocessor(s), a field programmable gate array (FPGA) chip, a programmable logic array (PLA) chip, a digital signal processor, or any other control circuit. The control circuit 16 may be a general-purpose control circuit, such as a general purpose processor for the haptic-enabled device 10, or may be a control circuit dedicated to generating haptic effects.

In an embodiment, the control circuit 16 may be configured to drive the haptic actuator 18 or cause the haptic actuator 18 to be driven. More specifically, the control circuit 16 may cause the haptic actuator 18 to be driven in a boost mode or in an amplitude-limited mode. In an embodiment, the control circuit 16 may be configured to detect or otherwise receive a drive signal for a haptic effect from a memory or other source, and scale or otherwise map the drive signal to a boosted voltage range or boosted current range, or an amplitude-limited voltage range or amplitude-limited current range. The control circuit 16 may then drive the haptic actuator 18 with the drive signal after it has been scaled, or cause another circuit to drive the haptic actuator 18 with the scaled drive signal.

In one example, the drive signal may be a waveform that the control circuit 16 is configured to retrieve or otherwise receive from memory. The waveform may, e.g., have been previously created by an author and stored in memory. In some cases, the drive signal that is retrieved may comprise a plurality of signal values, which may also be referred to as signal samples. Each signal value may, e.g., be an 8-bit digital value that is in a range of 0 to 255. In such a scenario, the signal value that is retrieved may be a dimensionless value. The control circuit 16 may scale or otherwise map the signal value to a voltage value or current value. For instance, the range of 0-255 for the 8-bit digital value may be linearly scaled to a voltage range of 0-5V by multiplying signal values that are retrieved by $5/255$ V, or about 0.0196 V. In some instances, the voltage range may include negative voltages, such as a range from −5V to 5V. In such instances, the signal values retrieved by the control circuit 16 may be subtracted by 127, and then multiplied by $5/127$ V. In another example, the control circuit 16 may retrieve or otherwise receive signal values that already have units of voltage or current. For instance, the control circuit 16 may receive a sinusoidal drive signal having signal values that are in a range of 0-5 V. In this example, the control circuit 16 may scale the drive signal by multiplying its signal values by a multiplication factor, such as 0.5, 1, 2, 3, or some other number. In an embodiment, the maximum value of the boosted voltage range may be, e.g., 2 or 3 times the rated maximum voltage or rated maximum current of the haptic actuator 18.

As stated above, the voltage range or current range to which a drive signal is scaled to may be a boosted voltage range or boosted current range, or may be an amplitude-limited voltage range or current range. The boosted voltage range or boosted current range may be a range in which an absolute value of a minimum value or maximum value thereof exceeds a defined rated maximum voltage or defined rated maximum current of a haptic actuator. In some cases, the defined rated maximum voltage or current may be a maximum voltage or current at which the haptic actuator can be sustainably operated without overheating. This quantity may be defined in, e.g., a data sheet provided by a manufacturer of the haptic actuator. As an example, if a haptic actuator has a defined rated maximum voltage of 5 V, a boosted voltage range may be, e.g., a range of −8 V to 8 V, a range of −10 V to 0 V, or a range of 0 V to 10 V. The amplitude-limited voltage range or current range may be a range in which an absolute value of a minimum value or maximum value of the range does not exceed the defined rated maximum voltage or current of the haptic actuator. In the above example, the amplitude-limited range may be, e.g., a range of 0-5 V, a range of −2.5 V to 2.5 V, or a range of 0-2.5 V.

In an embodiment, the drive signals that are scaled or applied in the embodiments herein may be nonzero drive signals. As discussed below in more detail, a nonzero drive signal may refer to a drive signal having nonzero signal values and excluding a finite duration of zero value (or, more generally speaking, a drive signal having signal values that exceed a defined noise threshold, and excluding a finite duration of only noise). In other words, a finite duration of zero value, or of just noise, may be considered a cooling period (also referred to as a rest period) between two nonzero drive signals.

Figure 1A:
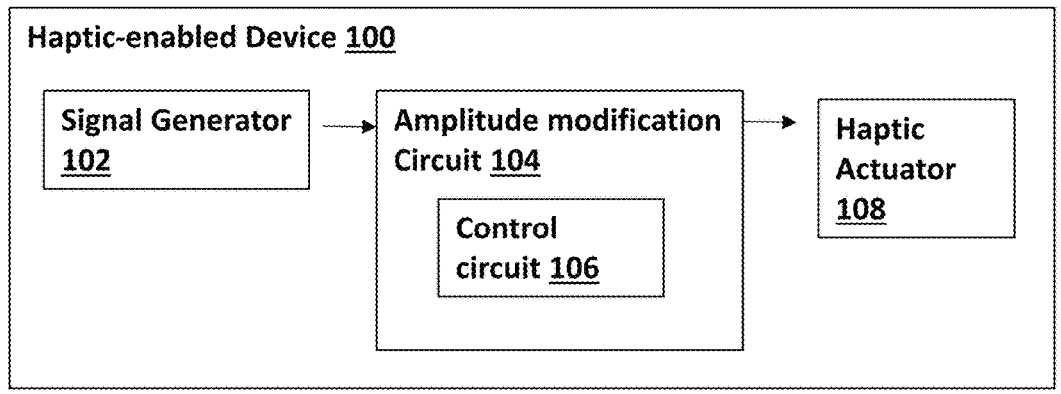

FIG. 1A illustrates a haptic-enabled device 100 that is an embodiment of the haptic-enabled device 10. The haptic-enabled device 100 may be an apparatus that includes a signal generator 102, a control circuit 106, and a haptic actuator 108. The control circuit 106 may be part of an amplitude modification circuit 106, and may control operation of the amplitude modification circuit 106. In an embodiment, the control circuit 106 and haptic actuator 108 may be the same as or similar to the control circuit 16 and haptic actuator 18 of FIG. 1.

In an embodiment, the signal generator 102 may be a hardware component configured to generate a nonzero drive signal that is used to create a haptic effect for the haptic-enabled device 100. In FIG. 1A, the signal generator 102 may be implemented in hardware, such as a dedicated signal generator chip. In the context of FIG. 1A, the signal generator 102 may also be referred to as a signal generating circuit. In an embodiment, the signal generator 102 may generate a nonzero drive signal by retrieving a stored waveform. For instance, the signal generator 102 may have memory that has been loaded with waveforms defined by a user of the haptic-enabled device 100 or by any other author of haptic effects. In an embodiment, the signal generator 102 may have dedicated circuitry that is configured to generate a waveform of a drive signal based on a waveform identifier, such as a waveform name or other ID. The waveform identifier may correspond with, e.g., a particular shape, frequency, and/or amplitude of a waveform of a drive signal. The signal generator 102 may be configured to generate the corresponding waveform based on the waveform identifier. In an embodiment, the signal generator 102 may be implemented as a field programmable gate array (FPGA) chip, a programmable logic array (PLA) chip, an analog circuit, or any other dedicated signal generator chip. The output of the signal generator 102 may be analog, such as a voltage signal v(t), or may be digital, such as a stream of digital samples, wherein each digital sample may include one or more bytes that encode a signal value.

In an embodiment, the amplitude modification circuit 104 (e.g., boost circuit) may provide an interface between the signal generator 102 and the haptic actuator 108. This interface may map a nonzero drive signal from the signal generator 102 to a voltage signal or current signal appropriate to a particular actuator or type of actuator (e.g., to be appropriate to a rated maximum voltage of a particular actuator, such as a linear resonant actuator (LRA), piezo-electric, eccentric rotating mass (ERM) actuator, or electrostatic friction (ESF) actuator), or to a particular situation (e.g., to be appropriate to whether a crisp haptic effect is being desired). The presence of the amplitude modification circuit 104 may thus allow the signal generator 102 to be designed independently of specific haptic actuators that may be used to generate a haptic effect, and may allow the signal generator 102 to be adapted for new haptic effects (e.g., a new type of crisp haptic effect for simulating a button press) for which the signal generator 102 may not have been originally designed.

In an embodiment, the amplification modification circuit 104 may include a control circuit 106 that receive the nonzero drive signal in real time from the signal generator 102. For instance, the signal generator 102 may output signal values for the nonzero drive signal sequentially in time. As the signal generator 102 sequentially generates new signal values of a nonzero drive signal, the control circuit 104 may sequentially detect (or, more generally, receive) the new signal values as soon as they are generated. Thus, at a particular instance in time when the signal generator 102 outputs a new value of a drive signal, the new value may immediately be output to the control circuit 106 of the amplitude modification circuit 104, and the control circuit 106 may map the signal values to a voltage range or current range in a manner that is substantially in real-time.

In an embodiment, the amplitude modification circuit 104 may be a boost circuit, or a boost/attenuate circuit. In an embodiment, the amplification modification circuit 104 may include hardware components that are configured to multiply a nonzero drive signal received by the control circuit 106. When the amplitude modification circuit 104 is acting as a boost circuit, it may be configured to multiply the nonzero drive signal by a multiplication factor (e.g., a gain) of more than 1. For instance, such hardware components may be controlled by the control circuit 106 to multiply a nonzero drive signal by a multiplication factor of between 2 to 3. When the amplitude modification circuit 104 is acting as an attenuate circuit, it may be configured to multiply the nonzero drive signal by a multiplication factor of less than 1 (i.e., between 0 and 1). In an embodiment, the control circuit 106 may be configured to implement boost protection logic for the haptic-enabled device 100 by controlling a multiplication factor used by the amplitude modification circuit 104 in multiplying a nonzero drive signal. In an embodiment, the amplitude modification circuit 104 may include additional components, such as an operational amplifier, that are controlled by the control circuit 106 for converting the output from the signal generator 102 to a determined voltage or current value. In an embodiment, the control circuit 106 may be configured to calculate a digital voltage value or current that represents a voltage or current to be applied to the haptic actuator 108, and the amplitude modification circuit 104 may include a digital to analog converter (DAC) that converts the digital voltage value or digital current value to an analog format.

In an embodiment, the amplitude modification circuit 104 may boost the nonzero drive signal from the signal generator 102 in real-time. More specifically, the amplitude modification circuit 104 may boost a new (e.g., most recent) signal value of the nonzero drive signal from the signal generator 102 as soon as the amplitude modification circuit 104 receives the new signal value, rather than wait to buffer all signal values of a nonzero drive signal before performing boosting of the nonzero drive signal.

In an embodiment, the amplification modification circuit 104 may include one or more dedicated timer circuits, such as a boost timer circuit (also referred to as a boost timer) and a cool-down timer circuit (also referred to as a cool-down timer). The one or more timer circuits may be used to track whether a boost timeout threshold, cooling time threshold, or extended boost mode timeout, which are discussed in more detail below, have elapsed. For instance, the one or more timer circuits may be counters that increment or decrement to track an amount of time that has elapsed.

In an embodiment, the haptic actuator 108 may be a haptic output device that is configured to actuate a component of the haptic output device. For instance, the haptic actuator 108 may be a linear resonant actuator (LRA), such as a voice coil configured to actuate a magnet, or such as a piezoelectric actuator configured to actuate a piezoelectric layer. In another example, the haptic actuator 108 may include a motor. For instance, the actuator 108 may be an eccentric rotating mass (ERM) actuator configured to actuate a mass that is attached to the motor. In an embodiment, the haptic actuator 108 may heat up when a drive signal is applied to the haptic actuator. While embodiments herein discuss a haptic actuator, the present disclosure may apply to a more general haptic output device (e.g., an electrostatic friction (ESF) device) that is configured to heat up when driven by a drive signal.

Figure 1B:
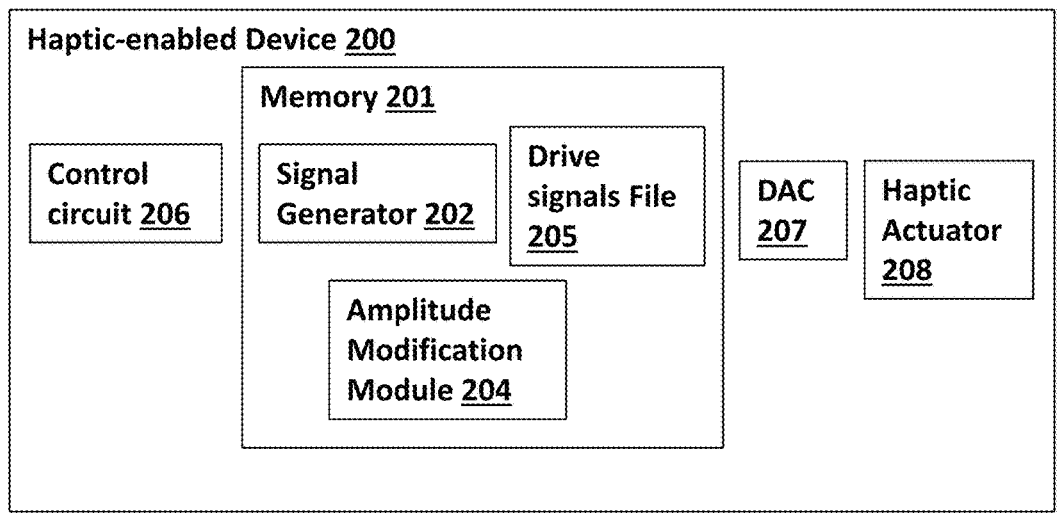

FIG. 1B illustrates a haptic-enabled device 200 that may be an embodiment of the haptic-enabled device 10. The haptic-enabled device 200 has a signal generator 202 and an amplitude modification module 204 that are implemented in software. More specifically, the haptic-enabled device 200 may include a control circuit 206 (e.g., a microprocessor), a non-transitory computer-readable medium such as memory 201, a digital to analog converter (DAC) 207, and a haptic actuator 208. In an embodiment, the control circuit 206 may be a general purpose microprocessor or a dedicated processor, such as a microcontroller dedicated to generating haptic effects. In an embodiment, the memory 201 (e.g., solid state memory) may be a non-transitory computer-readable medium that stores instructions that are executable by the control circuit 206 for implementing the signal generator 202 and the amplification module 204. In the context of FIG. 1B, the signal generator 202 may also be referred to as a signal generating module. In an embodiment, the signal generator 202 and the amplitude modification module 204 may be stored as two separate functions in the memory 201 or may be stored as two separate blocks of code in the same function in memory 201, and may be executable by the control circuit 206.

In an embodiment, the signal generator 202 may be configured to output a nonzero drive signal. The amplitude modification module 204 may receive the nonzero drive signal as an input, and may map the nonzero drive signal to a particular voltage range or current range. In an embodiment, the nonzero drive signal may already be stored in memory as a series of signal values. For instance, FIG. 1B depicts the memory 201 storing one or more nonzero drive signals in a drive signals file 205, which may have been previously created by a haptic effects author. In one example, the one or more nonzero drive signals in file 205 may be stored as a series of signal values, wherein each of the signal values may be an 8-bit digital value that is in a range of 0-255. The file 205 may identify timing information for the stored nonzero drive signals. For instance, it may indicate that a particular nonzero drive signal has a sampling rate of 8 kHz, which may mean that each signal value of the nonzero drive signal represents a duration of ⅛ kHz, or 0.125 msec. The signal generator 202 may be configured to retrieve a stored nonzero drive signal from file 205, and output the retrieved nonzero drive signal to the amplitude modification module 204. In some cases, the nonzero drive signal may be retrieved and output from the signal generator 202 to the amplitude modification module 204 in response to a command or triggering event to output a haptic effect. For instance, if an application determines that a haptic effect is to be generated, the signal generator 202 may retrieve from the file 205 a nonzero drive signal associated with the haptic effect, and the signal modification module 204 may then map the nonzero drive signal that was retrieved to a boosted voltage range or current range, or to an amplitude-limited voltage range or current range.

In another example, the drive signals file 205 may be omitted, and the signal generator 202 may more dynamically generate a nonzero drive signal. For instance, the signal generator 202 may dynamically calculate 40 signal values of a nonzero drive signal and output the calculated signal values to the module 204. In another example, the signal generator 202 may be omitted, and the amplitude modification module 204 may directly retrieve nonzero drive signals from the drive signals file 205.

In an embodiment, the amplitude modification module 204 may scale or otherwise a nonzero drive signal to a boost voltage range or current range, or to an amplitude-limited voltage range or current range. For instance, the amplitude modification module 204 may boost a nonzero drive signal from the signal generator 202 in real-time. In this instance, the amplification modification module 204 may periodically check (e.g., at a rate of 8 kHz, 16 kHz, 32 kHz, or any other rate) an output of the signal generator 202 for newly generated signal samples, and multiply the newly generated signal samples by a multiplication factor. In an embodiment, the control circuit 206 may have to switch between executing instructions for the signal generator 202, executing instructions for the amplitude modification module 204, and executing instructions of any other module of the haptic-enabled device 200. The switching may occur at a much faster rate than a refresh rate of the samples of the nonzero drive signal, and much faster than a sampling rate of the nonzero drive signal, such that the amplitude modification module 204 is still considered to be operating in real-time or near real-time.

In an embodiment, the voltage value or current value that is determined by the amplitude modification module 204 as a result of the mapping may be represented in digital form. The DAC 207 may convert the voltage value or current value from digital form to analog form, after which the voltage value or current value is applied to the haptic actuator 208.

Figure 1C:
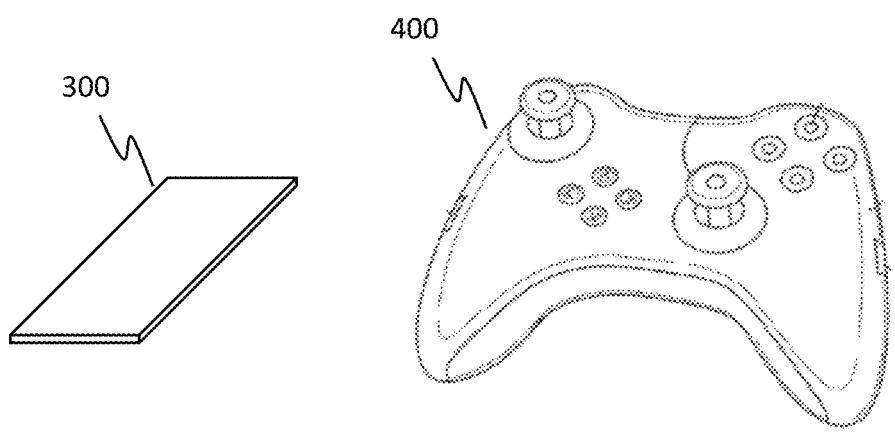
FIG. 1C illustrates examples of haptic-enabled devices, according to embodiments hereof.

As discussed above, the haptic-enabled devices 100, 200 may be any of a variety of user interface devices. For instance, FIG. 1C illustrates a haptic-enabled device 300 that is a mobile phone, and a haptic-enabled device 400 that is a game console controller. A haptic actuator (e.g., 108) of the embodiments herein may be used to generate a haptic effect that is, e.g., a vibrotactile haptic effect. In one example, the vibrotactile haptic effect may be generated to simulate a click of a virtual home button that is displayed on a touchscreen of the haptic-enabled device 300.

Figure 2A:
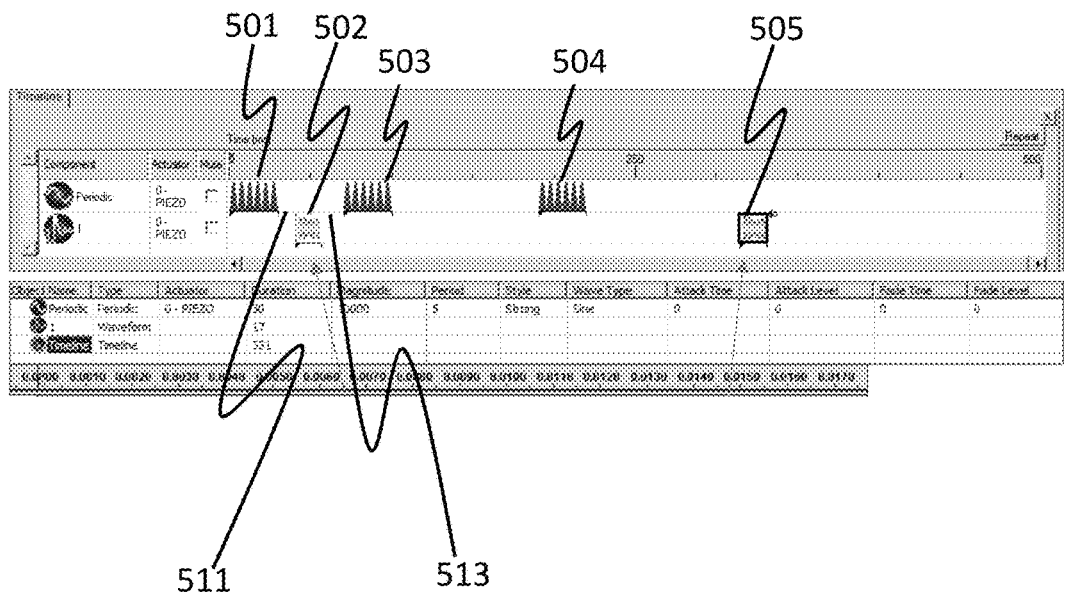
FIG. 2A illustrates various nonzero drive signals, according to an embodiment hereof.

FIG. 2A illustrates an example of nonzero drive signals that, for instance, are stored in drive signals file 205 and are received by the control circuit 202 while executing the amplitude modification module 204. More specifically, FIG. 2A depicts a software interface in which an author may select or otherwise generate nonzero drive signals 501-505 for generating a haptic effect or multiple haptic effects. The nonzero drive signals 501-505 may be considered to be generating a single haptic effect if, for instance, the nonzero drive signals 501-505 are generated in response to the same triggering condition (e.g., a user input, or an event in a game). Similarly, the nonzero drive signals 501-505 may be considered to be generating different respective haptic effects if, for instance, the nonzero drive signals 501-505 are generated in response to separate respective triggering conditions.

Figure 2B:
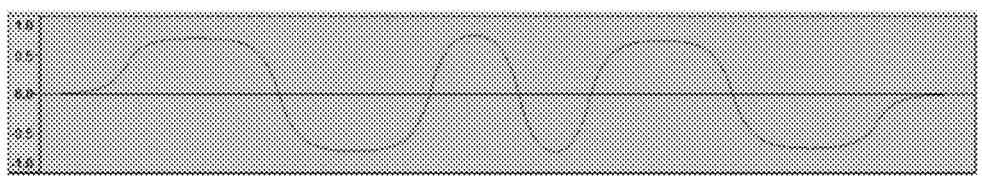
FIG. 2B illustrates a waveform for a nonzero drive signal, according to an embodiment hereof.

In an embodiment, the author may design the haptic effect or haptic effects to include nonzero drive signals 501, 503, 504, which may each be a sinusoidal or other periodic signal having a defined duration, peak-to-peak amplitude (also referred to as peak-to-peak magnitude), period, or frequency. The nonzero drive signals 501, 503, 504 in FIG. 2A may have the same signal definition. In an embodiment, the nonzero drive signals 502 and 505 may have been drawn or otherwise customized by an author. For instance, FIG. 2B illustrates a waveform that an author may have drawn. The waveform may be stored in memory 201 as a plurality of signal values, wherein each of the signal values may represent a defined duration (e.g., 0.25 ms). The waveform may form a signal definition, and each of signals 502 and 505 may have the signal definition represented by the waveform of FIG. 2B.

In an embodiment, a nonzero drive signal may define a waveform that at most crosses a zero value at a particular instance or at particular instances in time, but otherwise has nonzero signal values. For instance, as illustrated in FIGS. 2A and 2B, nonzero drive signal 502 may be preceded by a finite duration 511 of zero value, and may be considered to begin when nonzero signal values are detected. The nonzero drive signal 502 may be followed by a finite duration 513 of zero value, and may be considered to end when the finite duration 513 of zero value is detected. Although the nonzero drive signal 502 may cross zero at particular instances in time, also referred to as zero crossing points, the zero crossing points may be considered to have no finite duration, and thus may still be part of the nonzero drive signal 502. In an embodiment, if the output of the signal generator 102/202 is an analog output, then a value of the analog output that is close to zero, such as a value that is less than a background noise threshold, may also be considered a zero value. In an embodiment, if the nonzero drive signal is configured to cause a haptic actuator (e.g., 108) to generate a force, the signal values of the nonzero drive signal may be referred to as force values.

Figure 3:
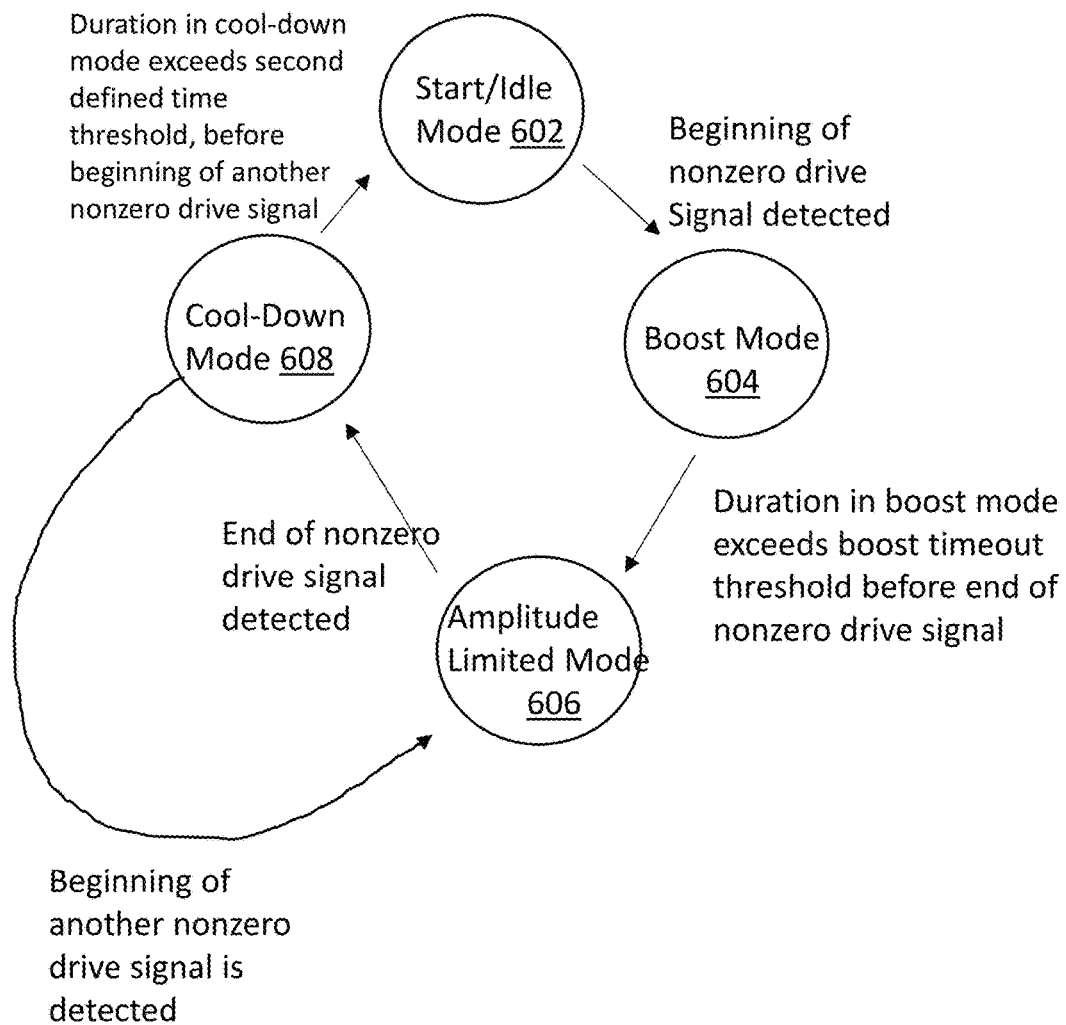
FIGS. 3 and 4 illustrate state machines that may be implemented by boost protection logic, according to embodiments hereof.

FIG. 3 illustrates boost protection logic that may be represented by a state machine. The state machine may be executed or otherwise implemented in an amplitude modification circuit (e.g., 104) or module (e.g., 204). For instance, the control circuit 16/106/206 of the amplitude modification circuit 104 or module 204 may track what state the circuit/module 104/204 is currently in, and control how a nonzero drive signal is modified or otherwise mapped based on the current state. In an embodiment, the transition of states may be reflected in a register or in a variable in memory that stores an indicator of a current state of the control circuit 16/106/206 with respect to driving the haptic actuator 18/108/208, which may also be a current state of the amplitude modification circuit/module 104/204.

In FIG. 3, the state machine may transition between a start/idle mode (also referred to as a start state) 602, a boost mode 604, an amplitude-limited mode 606, and a cool-down mode 608 (which may correspond to a cool-down period). In the start/idle mode 602, the control circuit 102/202 may be in a state in which it has not yet detected a nonzero drive signal from the signal generator 102/202, and is waiting for a beginning of a nonzero drive signal from the signal generator 102/202 to be detected. For instance, the control circuit 16/106/206 may monitor an output of the signal generator 102/202 to determine whether a nonzero drive signal has been received from the signal generator 102/202. If the control circuit detects a beginning of a nonzero drive signal, or otherwise begins to receive a nonzero drive signal, the control circuit 16/106/206 may transition to boost mode 604.

In the boost mode 604, the control circuit 16/106/206 may scale or otherwise map the nonzero drive signal to a boosted voltage range or a boosted current range, wherein an absolute value of a minimum value or a maximum value of the range exceeds a defined rated maximum voltage of the haptic actuator 18/108/208. Thus, the boost mode 604 allows an amplitude of the nonzero drive signal to be boosted beyond the defined rated maximum voltage of a haptic actuator 18/108/208. For instance, if the haptic actuator 18/108/208 has a defined rated maximum voltage of 8 V, the control circuit 16/106/206 in the boost mode may receive a sinusoidal drive signal stored in memory and apply the sinusoidal drive signal to the haptic actuator by scaling the sinusoidal drive signal so that it has a peak-to-peak amplitude of 10 $V_{pp}$ or 15 $V_{pp}$, and applying the scaled sinusoidal drive signal to the haptic actuator. As discussed above, the scaling may be performed by multiplying the signal values of the drive signal by a multiplication factor (e.g., 10/255 V or 15/255 V), or in some other manner.

In an embodiment, the state machine of FIG. 3 is used for situation in which a first non-zero drive signal (e.g., 701 or 801 in FIG. 5 or 6, respectively) lasts longer than a first defined time threshold, such as a boost timeout threshold (e.g., 9 ms, or 12 ms). In such an embodiment, the boost timeout threshold may be exceeded before an end of the first nonzero drive signal. The state machine in FIGS. 8 and 11 may refer to a more general situation in which the first nonzero drive signal can be longer or shorter than the boost timeout threshold. Referring back to FIG. 3, if the control circuit 16/106/206 detects that a duration spent in the boost mode (since a start time of the boost mode) exceeds the first defined time threshold, the control circuit 106/206 may transition to the amplitude-limited mode 606. In an embodiment, the start time of the boost mode 604 in which the first nonzero drive signal (e.g., 701) is applied may be defined as a beginning of the first nonzero drive signal, when the control circuit 16/106/206 transitioned from the start/idle mode 602 to the boost mode 604. Further, the start time may refer to a most recent start time of the boost mode 604. If the control circuit exits the boost mode 604 and then later re-enters the boost mode 604, the most recent start time of the boost mode 604 may be updated to be equal to when the control circuit re-entered the boost mode 604.

In an embodiment, the control circuit 106/206 may start a boost timer when there is a transition from the start/idle mode 602 to the boost mode 604. The boost timer may reflect how long is a duration being spent in the boost mode (i.e., a boost duration), or may reflect more generally a duration since the start time of the boost mode 604 for the first nonzero drive signal 701 or 801. This duration may be referred to as a boost duration. The boost timer may be used to determine whether the duration for the boost mode exceeds a first defined time threshold, such as the boost timeout threshold. In some cases, the boost timer may track an amount of time that has elapsed since a start time of the boost mode. When the amount of time exceeds the boost timeout threshold, the boost timer may stop tracking that amount of time. For instance, it may stop incrementing in value. In some cases, the boost timer may be reset after the control circuit 16/106/206 re-enters the start/idle mode 602. In an embodiment, the control circuit 16/106/206 may periodically check (e.g., every 1 ms or every 50 μs) the timer to determine whether the duration since the start time of the boost mode, which may also be referred to as the amount of time that has elapsed since the start time of the boost mode, exceeds the first defined time threshold at a time at which the timer is being checked.

In an embodiment, the defined time thresholds herein (e.g., the first defined time threshold, second defined time threshold, third defined time threshold, fourth defined time threshold) may be defined by a user, such as a user of the haptic-enabled device 10, a designer of the amplitude modification circuit 104, a programmer of the amplitude modification module 204, an author of haptic effects, or by some other user. The user may have set the values of the time thresholds in memory 201, before the amplitude modification circuit 104 or amplitude modification module 204 began operating. In an embodiment, the defined time thresholds may be dynamically determined at run-time, such as by instructions of the amplitude modification module 204 that are executed by the control circuit 206. In such an embodiment, the defined time thresholds may be referred to as determined time thresholds (e.g., determined second time threshold).

In an embodiment, after the control circuit 16/106/206 has applied a first portion of the first nonzero drive signal (e.g., 701) in the boost mode 604, the boost timeout threshold may be exceeded. In an embodiment, the control circuit 16/106/206 may monitor a boost duration in order to detect the boost duration exceeding the boost timeout threshold, wherein the boost duration is a duration since a start time of the boost mode 604. In response to the boost duration exceeding the boost timeout threshold, the control circuit 16/106/206 may transition from the boost mode 604 to the amplitude-limited mode 606. In an embodiment, the control circuit 16/106/206 may apply a second portion (e.g., a remaining portion) of the nonzero drive signal in the amplitude-limited mode 606. In such a mode, the second portion of the nonzero drive signal may be applied in a manner that does not exceed the defined rated maximum voltage or current of the haptic actuator 18/108/208. In some cases, the control circuit 16/106/206 in the amplitude-limited mode 606 may scale the second portion of the nonzero drive signal to an amplitude-limited voltage range or current range. The amplitude-limited voltage range or current range may have a minimum value and maximum value that both do not exceed the defined rated maximum voltage or current. For instance, if the haptic actuator 18/108/208 has a defined rated maximum voltage of 8 V, the control circuit 16/106/206 in the amplitude-limited mode may scale a sinusoidal drive signal, for instance, to have a peak-to-peak amplitude of 8 $V_{pp}$.

In an embodiment, as illustrated in FIG. 3, the amplitude modification circuit/module 104/204 may transition to the cool-down mode 608 after the control circuit 16/106/206 detects an end of the first nonzero drive signal (e.g., and end of nonzero drive signal 701). In other words, the control circuit 16/106/206 may transition to the cool-down mode 608 after the first nonzero drive signal has finished being applied in the amplitude-limited mode 606. The cool-down mode 608 may be a mode in which the control circuit 16/106/206 is not receiving any nonzero drive signal, or more generally a mode in which the haptic actuator 18/108/208 is not being driven. The cool-down mode 608 may place a constraint on the ability to apply a subsequent nonzero drive signal in the boost mode 604. For instance, the cool-down mode 608 may force any subsequent nonzero drive signal to be applied in the amplitude-limited mode 606 until the control circuit 16/106/206 has spent at least a second defined time threshold, such as a cooling time threshold, in the cool-down mode 608.

In an embodiment, when the control circuit 16/106/206 enters the cool-down mode, it may start a cool-down timer. More generally speaking, the control circuit 16/106/206 may start the cool-down timer when the end of the first nonzero drive signal (e.g., 701) is detected. In an embodiment, the end of the nonzero drive signal may define or otherwise represent a start time of the cool-down period. Thus, the cool-down timer may be used to measure a duration spent in the cool-down mode, or more generally a duration since a start time of the cool-down period. In the cool-down mode 608, the control circuit 16/106/206 may wait to receive or otherwise receive a next nonzero drive signal, or more generally a subsequent nonzero drive signal 16/106/206. In an embodiment, the control circuit 16/106/206 may remain in the cool-down mode 608 so long as it detects only digital signal values of zero or analog signal values that are below a defined noise threshold, and thus may leave the haptic actuator 18/108/208 undriven in the cool-down mode 608. The haptic actuator 18/108/208 may thus be allowed to cool down in temperature in the cool-down mode. As stated above, the cool-down period may refer to a period spent in the cool-down mode 608. Thus, in some instances, the cool-down period may start at a beginning of the cool-down mode 608. In other cases, as discussed below with respect to FIGS. 8 and 11, the cool-down period may start at a beginning of a boost cool-down mode.

In an embodiment, the control circuit 106/206 may track or otherwise monitor how long a cool-down period has lasted (i.e., how long it has been in a cool-down period). The cool-down period may have to be sufficiently long before the control circuit 16/106/206 can re-enter the boost mode 604, so as to give the haptic actuator 18/108/208 sufficient time to cool before the actuator 18/108/208 is heated again in the boost mode 604. As an example, a duration since a start time of a cool-down period may have to exceed a second defined time threshold (e.g., 90 ms) before the control circuit 16/106/206 is allowed to transition to the boost mode 604. If an amount of time spent in the cool-down mode 608 does not yet equal or does not yet exceed the second defined time threshold, a next nonzero drive signal may have to be applied in the amplitude-limited mode 606. In an embodiment, the cool-down timer used to track a duration spent in the cool-down period may be reset when a value of the cool-down timer reaches or exceeds the second defined time threshold. In an embodiment, the cool-down timer may be reset when the control circuit 16/106/206 exits from the cool-down mode 608 to the amplitude-limited mode 606 or to the start/idle mode 602. When the control circuit 16/106/206 returns to the cool-down mode 608, the cool-down timer may begin counting from a reset value. Because the cool-down timer is reset when a nonzero drive signal is received, the cool-down timer in such an embodiment may indicate a duration of a continuous cool-down period between two consecutive nonzero drive signals, and may require the continuous cool-down period to reach or exceed the second defined threshold before the control circuit 16/106/206 can exit from the cool-down mode 608 to the start/idle mode 602 and the boost mode 604. In another embodiment, rather than requiring the second defined time threshold to be exceeded by a duration of a continuous cool-down period, the control circuit 16/106/206 may be able to return to the start/idle mode 602 and boost mode 604 when a cumulative duration of several cool-down periods that are not continuous with each other reaches or exceeds the second defined time threshold. Such an embodiment may be implemented with, e.g., a cool-down timer that is not reset when the control circuit 16/106/206 exits from the cool-down mode 608 to the amplitude-limited mode 606. Instead, when the control circuit 16/106/206 enters the cool-down mode 608 again, the cool-down timer may begin counting from its previous, retained value. In this embodiment, the cool-down timer may ultimately be reset when its value reaches or exceeds the second defined time threshold.

In an embodiment, the state machine of FIG. 3 may be used with a variety of haptic actuators and drive signals. For instance, the state machine may be used with a nonzero drive signal having direct current (DC) signal values that all have the same polarity, or with a nonzero drive signal having signal values that vary between two different polarities. Such a nonzero drive signal includes a periodic signal, such as a sinusoidal signal, that alternates between a positive value and a negative value. Such a nonzero drive signal may have zero crossing points (points at which a signal crosses zero in value). For a haptic actuator (e.g., LRA) that operates with a nonzero drive signal having zero crossing points, after the boost timeout threshold has been reached, the control circuit 16/106/206 may prolong the application of a drive signal with a boosted voltage range or boosted current range, until a zero crossing point is reached, or until an additional time threshold is reached. This option may be reflected by an additional mode (or state), referred to as an extended boost mode, between the boost mode 604 and the amplitude-limited mode 606.

Figure 4:
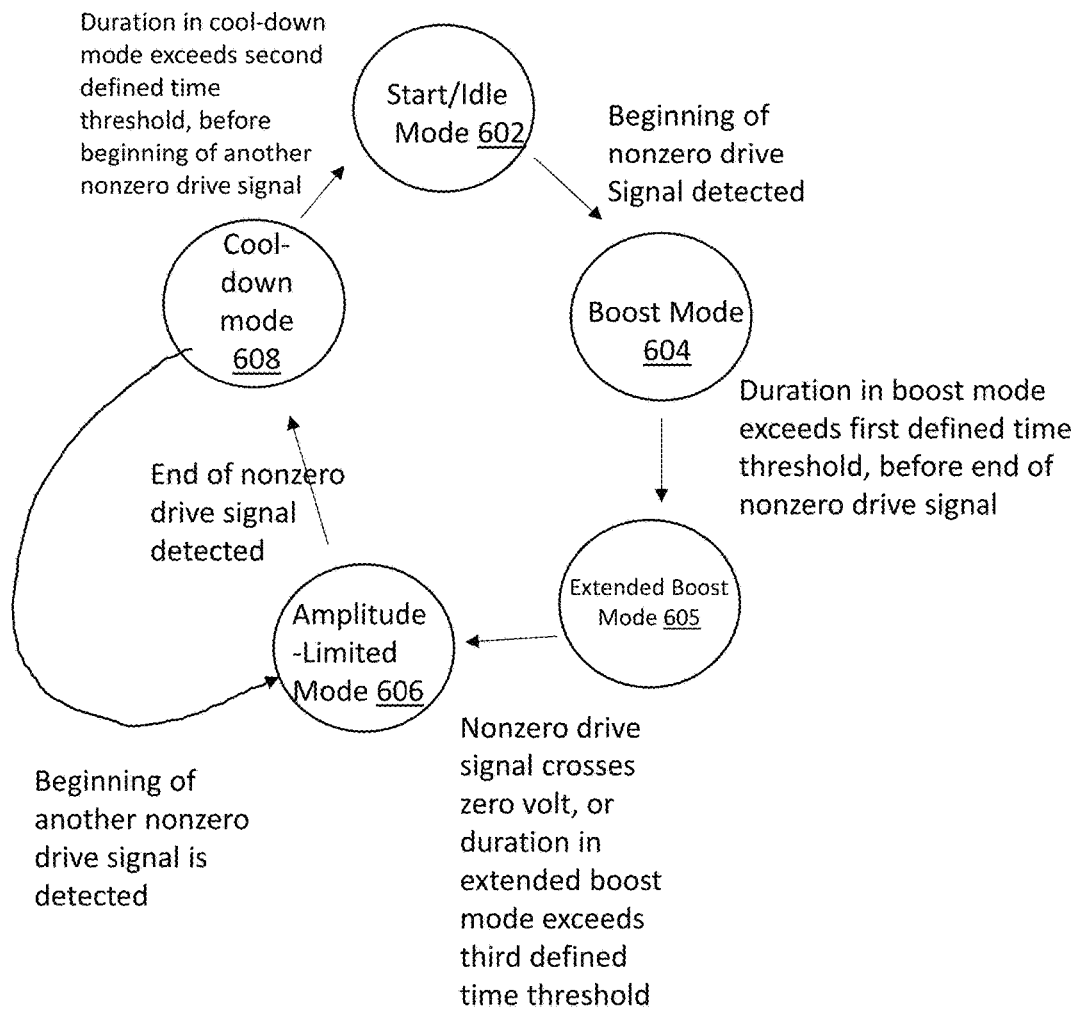

For instance, FIG. 4 illustrates a state machine that includes an extended boost mode (also referred to as a post boost mode) 605 that may prolong boosting of a nonzero drive signal until a zero crossing mode, and only then transition to an amplitude-limited mode. The extended boost mode 605 may be an extension of the boost mode 604. More specifically, when a nonzero drive signal transitions from being applied in the boost mode 604 to being applied in the amplitude-limited mode 606, as illustrated in FIG. 4, the nonzero drive signal may transition from being scaled to a boosted voltage range to being scaled to an amplitude-limited voltage range. In one example, the transition may involve a change from a nonzero drive signal being scaled to a boosted voltage range of −7 V to 7 V (wherein the defined rated maximum voltage may be 5 V) to an amplitude-limited range of −4 V to 4 V. Such a transition, if performed at certain points in time, may involve an abrupt change from one signal value to another signal value. For instance, the transition may involve a voltage value of 7 V being applied to a haptic actuator 18/108/208 while in the boost mode, followed immediately by a voltage value of 4 V being applied in the amplitude-limited mode when the boost timeout threshold is reached. Such an abrupt transition may create a sound or other audible noise (e.g., a click sound), especially in a high-definition (HD) haptic actuator or other haptic actuator having a high bandwidth, which may be undesirable. To avoid such an abrupt transition, the transition from using the boosted voltage range or current range to using the amplitude-limited voltage range or current range may be timed to occur at a zero crossing point. Such a transition avoids an abrupt transition because a signal value of zero may be scaled to the same voltage value or current value, namely zero volts or amps, in both the boosted voltage/current range and the amplitude-limited voltage/current range. More particularly, if the scaling involves multiplying a signal value by a multiplication factor, doing so with a signal value of zero will yield the same scaled value in both the boosted voltage/current range and the amplitude-limited voltage/current range. Thus, waiting until a zero crossing point before transitioning to the amplitude-limited mode 606 may avoid an abrupt transition of signal values, which may avoid a click or other sound being generated during the transition.

Referring again to FIG. 4, a control circuit 16/106/206 may apply a first portion of a nonzero drive signal in the boost mode 604. When a boost duration, which may be a duration since a start time of the boost mode 604, exceeds a first defined time threshold such as a boost timeout threshold, the control circuit 16/106/206 may transition from the boost mode 604 to an extended boost mode 605 in which the nonzero drive signal continues to be scaled to the boosted voltage range or current range, until a zero crossing point is reached, or until another time threshold has been reached, whichever occurs first in time. If the boost mode 604 involved multiplying the nonzero drive signal 604 by a factor of 3, the extended boost mode may involve continuing to multiply the nonzero drive signal 604 by the factor of 3. Because the nonzero drive signal has one or more zero crossing points, the control circuit 16/106/206 in the extended boost mode 605 may wait for the zero crossing point to transition to the amplitude-limited state 606. In an embodiment, the control circuit 16/106/206 may be limited to a third defined time threshold, which may be referred to as an extended boost timeout threshold, in the extended boost mode. Thus, even if the control circuit 16/106/206 has not yet encountered a zero crossing threshold, it may transition to the amplitude-limited mode 606 anyway if a duration since a start time of the extended boost mode (i.e., since the boost timeout threshold reached or exceeded the boost timeout threshold) reaches or exceeds the third defined time threshold.

Figure 5:
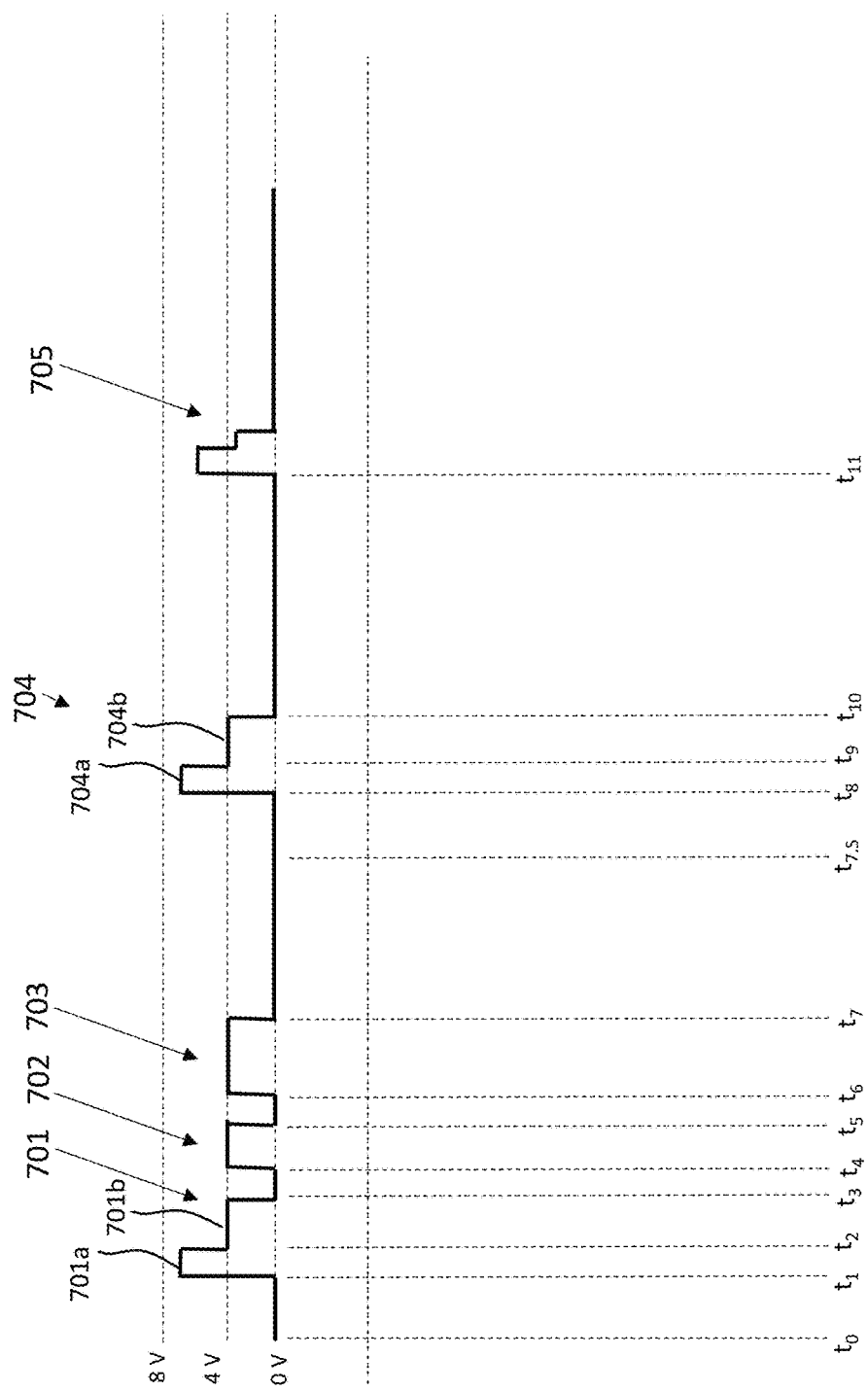
FIGS. 5-7 illustrate applying various nonzero drive signals in a boost mode or an amplitude-limited mode, according to embodiments hereof.

FIG. 5 illustrates a plurality of nonzero drive signals that are applied as voltage drive signals 701-705 to a haptic actuator 18/108/208 according to the state machine of, e.g., FIG. 3. The voltage signals 701-705 are each DC signals that may be applied to, e.g., an ERM actuator. Between time $t_0$ and $t_1$, the control circuit 16/106/206 may be in the start/idle mode 602, in which the control circuit 16/106/206 has not yet detected or otherwise received a nonzero drive signal for a haptic effect. The nonzero drive signal may be received from memory, for example.

In an embodiment, at time $t_1$, the control circuit 16/106/206 may detect a beginning of a first nonzero drive signal for a haptic effect, such as a square pulse having an 8-bit value of 255, or a square pulse having a value of 3.5 V. The square pulse may have a duration equal to $t_3-t_1$. The control circuit 16/106/206 may enter the boost mode 604 as a result. In the boost mode 604, a first portion of the first nonzero drive signal may be applied, as a first portion 701a of the voltage signal 701. For instance, the control circuit 16/106/206 may scale the signal value of 255 or of 3.5 V of the first nonzero drive signal to 7 V, by multiplying the signal value by a multiplication factor of 7/255 V (i.e., 255×7/255 V=7 V) or by a multiplication factor of 2 (i.e., 3.5 V×2=7 V).

At time $t_2$, the control circuit 16/106/206 may detect a duration since a start time of the boost mode 604 to have reached or exceeded a boost timeout threshold (e.g., 9 ms). In an embodiment, the start time of the boost mode 604 may be time $t_1$. The control circuit 16/106/206 may, e.g., periodically check whether a current time t minus $t_1$ is equal to or is greater than the boost timeout threshold, wherein a frequency at which the check is performed may be, e.g., 10 KHz (once every 0.1 ms) or some other frequency. In this example, the boost timeout threshold may be shorter than a duration of the first nonzero drive signal In response to detecting the duration since the start time of the boost mode 604 reaching or exceeding the boost timeout threshold, the control circuit 16/106/206 may transition to an amplitude-limited mode, in which a second portion of the first nonzero drive signal is scaled to an amplitude-limited voltage range or current range. In one example, if the first nonzero drive signal is a square pulse lasting, e.g., 30 ms, the first portion of the first nonzero drive signal may be an earliest 9 ms portion of the square pulse, while the second portion may be the remaining 21 ms portion that immediately follows the first portion. In the amplitude-limited mode, the control circuit 16/106/206 may scale the second portion of the nonzero drive signal to an amplitude-limited voltage range, such as a range of 0 V to 4 V (the haptic actuator 18/108/208 in this example may have a defined rated maximum voltage of 4 V). The scaling may involve, e.g., multiplying the 8-bit value of 255 or the value of 3.5 V of the square pulse by a multiplication factor of $4/255$ V (i.e., $255 \times 4/255 = 4$ V) or by a multiplication factor of $4/3.5$ (i.e., $3.5 \text{ V} \times 4/3.5 = 4$ V). The second portion of the first nonzero drive signal may be scaled to be the second portion 701b of the voltage signal 701.

At time $t_3$, the control circuit 16/106/206 may detect an end of the first nonzero drive signal, and transition from the amplitude-limited mode 606 to the cool-down mode 608. In the cool-down mode 608, the ERM actuator may be allowed to cool in temperature, while the control circuit 16/106/206 waits for a subsequent nonzero drive signal. In an embodiment, time $t_3$ may define a start of a first cool-down period.

At time $t_4$, a beginning of a second nonzero drive signal may be detected or otherwise received, and may be applied as voltage signal 702. More specifically, the control circuit 106/206 at $t_4$ may determine that the duration spent in the cool-down mode 608, or more generally a length of the first cool-down period (also referred to as a cool-down duration), has not reached or does not yet exceed a cooling time threshold, such as 90 ms. In FIG. 5, this duration, and more generally the length of the first cool-down period (also referred to as a cool-down duration), may be equal to an interval between $t_3$ and $t_4$, which may be a length of time between an end of the first nonzero drive signal and a beginning of the second nonzero drive signal. The first nonzero drive signal and the second nonzero drive signal may be referred to as consecutive nonzero drive signals, because no other nonzero drive signal is between them (i.e., there is no intervening nonzero drive signal between them). In response to determining that the length of the first cool-down period has not reached or has not exceeded the cooling time threshold, the control circuit 106/206 may apply the second nonzero drive signal in the amplitude-limited mode 606. For instance, the second nonzero drive signal may also be a square pulse having an 8-bit digital value of 255 and a duration equal to $t_5 - t_4$, and the control circuit 16/106/206 may scale the second nonzero drive signal to a voltage value of 4 V by multiplying the nonzero drive signal by a factor of $4/255$ V, and applying the scaled nonzero drive signal as voltage signal 702.

Similarly, at time $t_5$, the control circuit 16/106/206 may detect an end of the second nonzero drive signal and transition to the cool-down mode 608. In an embodiment, $t_5$ may define a start time of a second cool-down period. At time $t_6$, the control circuit 16/106/206 may detect or otherwise receive a third nonzero drive signal, and may determine whether a length of the second cool-down period (also referred to as a cool-down duration) exceeds the cooling time threshold. The length of the second cool-down period may be a duration of a continuous time period immediately preceding the third nonzero drive signal in which the haptic actuator 18/108/208 was not driven. More generally, the control circuit 16/106/206 may determine whether a duration between the beginning of the third nonzero drive signal (i.e., $t_6$) and an end of a previous consecutive nonzero drive signal (i.e., $t_5$) has reached or exceeds the cooling time threshold. In FIG. 3, this duration has not reached the cooling time threshold. As a result the control circuit 106/206 may also apply the third nonzero drive signal in the amplitude-limited mode 606, in which the third nonzero drive signal is scaled to the voltage drive signal 703.

At time $t_7$, the control circuit 106/206 may detect an end of the third nonzero drive signal, and enter the cool-down mode 608 again. The time $t_7$ may define a start time of a third cool-down period. The control circuit 16/106/206 may remain in that state until time $t_{7.5}$. In the example of FIG. 5, $t_{7.5} - t_7$ may be equal to the cooling time threshold, such that the cooling time threshold is exceeded after time $t_{7.5}$. Thus, the control circuit 16/106/206 may detect, at or after time t5, that the cooling time threshold has been reached or has been exceeded, and may transition from the cool-down mode 608 back to the start/idle mode 602. This transition may be made by, e.g., updating a variable in memory that identifies which mode of the state machine the control circuit 16/106/206 is in. In an embodiment, this transition may not be explicitly performed. Rather, when a fourth nonzero drive signal is detected at time $t_5$, the control circuit 16/106/206 may determine whether a duration between a beginning of the fourth nonzero drive signal (i.e., t8) and an end of a previous consecutive nonzero drive signal (t7) is equal to or is greater than the cooling time threshold. This duration may be determined as a length of the third cool-down period (also referred to as a cool-down duration). In the example of FIG. 5, the control circuit 16/106/206 determines that this duration does equal or does exceed the cooling time threshold, and a first portion of the fourth nonzero drive signal in the boost mode 604, in which the first portion is scaled to portion 704a of the voltage signal 704.

At time $t_9$, the control circuit 16/106/206 may detect that a duration since a start time of the boost mode 604 has reached or exceeds the boost timeout threshold. More specifically, the control circuit 16/106/206 may detect that a duration since a most recent start time of the boost mode 604 has reached or exceeds the boost timeout threshold. For instance, the start time of the boost mode 604 may have been $t_1$, but may have been updated to time $t_8$, such that time $t_8$ is the most recent start time of the boost mode 604. In this context, the most recent start time may also be referred to as an updated start time. The update may have been performed at or shortly after time $t_8$.

At times $t_9$ and $t_{10}$, the control circuit 106/206 transitions to the amplitude-limited mode 606 and cool-down mode 608, respectively, based on the process described above. In the amplitude-limited mode 606, a second portion of the fourth nonzero drive signal may be applied as portion 704b of voltage signal 704. The fourth nonzero drive signal may end at time $t_{10}$, which may be a start time of a fourth cool-down period.

At time $t_{11}$, the control circuit 16/106/206 may detect a fifth nonzero drive signal. The control circuit may have transitioned from the cool-down mode 608 to the start/idle mode 602 at this point, because time a length of the fourth cool-down period by this point (also referred to as a cool-down duration), which may be equal to a length of the interval between time $t_{10}$ and $t_{11}$, may be greater than the cooling time threshold. As a result, the control circuit 16/106/206 may apply the at least a portion of the fifth nonzero drive signal in the boost mode 604.

Figure 6:
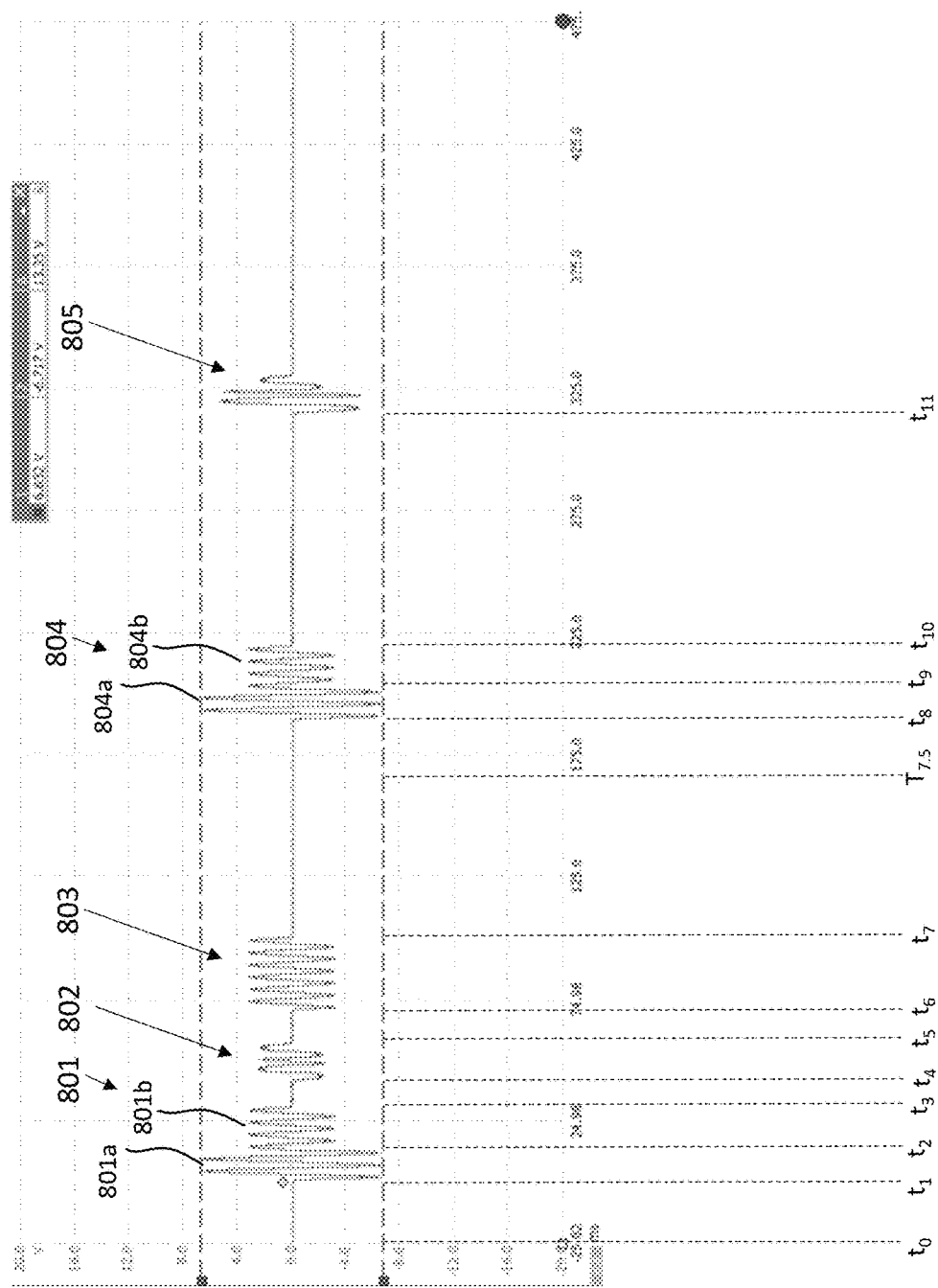

FIG. 6 similarly illustrates a plurality of nonzero drive signals that are applied as voltage signals 801-805 according to the state machine of FIG. 3. In FIG. 6, the nonzero drive signals are sinusoidal signals, and the haptic actuator may be, e.g., a LRA.

At time $t_0$, the control circuit may be in the start/idle mode 602, and may be waiting to detect or otherwise receive a nonzero drive signal. At time $t_1$, the control circuit 106/206 may detect or otherwise receive a beginning of a first nonzero drive signal, and enter the boost mode 604 as a result. In one example, the first nonzero drive signal may be a sinusoidal signal having a plurality of signal values representing an intensity of a haptic effect at different instances in time, wherein each of the signal values is an 8-bit digital value in a range of −128 (in two's complement format) and 127. The first nonzero digital value may have a duration equal to $t_3-t_1$. In another example, the first nonzero drive signal may be a sinusoidal signal having a peak-to-peak amplitude of 4.66 $V_{pp}$, with signal values that are in a range of −2.33 V to 2.33 V. At time $t_1$, a first portion of the first nonzero drive signal may be applied in the boost mode 604. This step may involve scaling the first portion of the first nonzero drive signal to be portion 801a of voltage signal 801. For instance, the boost mode 604 may scale the first nonzero drive signal to a boosted voltage range that is from −7 V to 7 V. The scaling may involve multiplying the signal values of the first nonzero drive signal by $7/128$ V (i.e., $127 \times 7/128$ V is about 7 V) or by 7/2.33, or about 3 (i.e., 2.33 V×7/2.33=7 V). In another example, the signal values of the first nonzero signal may be scaled, or more generally mapped, to voltage values that are applied to the haptic actuator 18/108/208 in some other way.

At time $t_2$, a boost timeout threshold (e.g., 9 ms) may have elapsed, and the control circuit 16/106/206 may transition to the amplitude-limited mode 606, in which scales applies a second portion (e.g., remaining portion) of the first nonzero drive signal to an amplitude-limited voltage range, which may be a range from −3.5 V to 3.5 V. The haptic actuator 18/108/208 may have a defined rated maximum voltage of, e.g., 3.5 V. This scaling may involve multiplying the signal values of the second portion of the nonzero drive signal by a multiplication factor of 3.5/128 V (e.g., 127×3.5/128 V is about 3.5 V) or a multiplication factor of 3.5/2.33 (i.e., 2.33 V×3.5/2.33=3.5 V). The scaled nonzero drive signal may be applied as portion 801b of voltage signal 801.

At time $t_3$, the control circuit 16/106/206 may detect an end of the first nonzero drive signal, and transition to the cool-down mode 608. At time $t_4$ and $t_5$, the control circuit 16/106/206 may detect or otherwise receive a second nonzero drive signal and third nonzero drive signal, respectively, and apply the second nonzero drive signal and the third nonzero drive signal in the amplitude-limited mode 606 as voltage signal 802 and 803, respectively, in a manner similar to that described in FIG. 5. Also in a manner similar to FIG. 5, the control circuit 16/106/206 may transition from the cool-down mode 608 to the start/idle mode 602 at or after time $t_{7.5}$. At time $t_8$, the control circuit 16/106/206 may apply a first portion of a fourth nonzero drive in the boost mode 604, as portion 804a of voltage signal 804. At time $t_9$, a remaining portion of the fourth nonzero drive signal may be applied in the amplitude-limited mode 606, as portion 804b of voltage signal 804. At time $t_{11}$, the control circuit 16/106/206 may apply a fifth nonzero drive signal in the boost mode 604, in a manner similar to FIG. 5.

Figure 7:
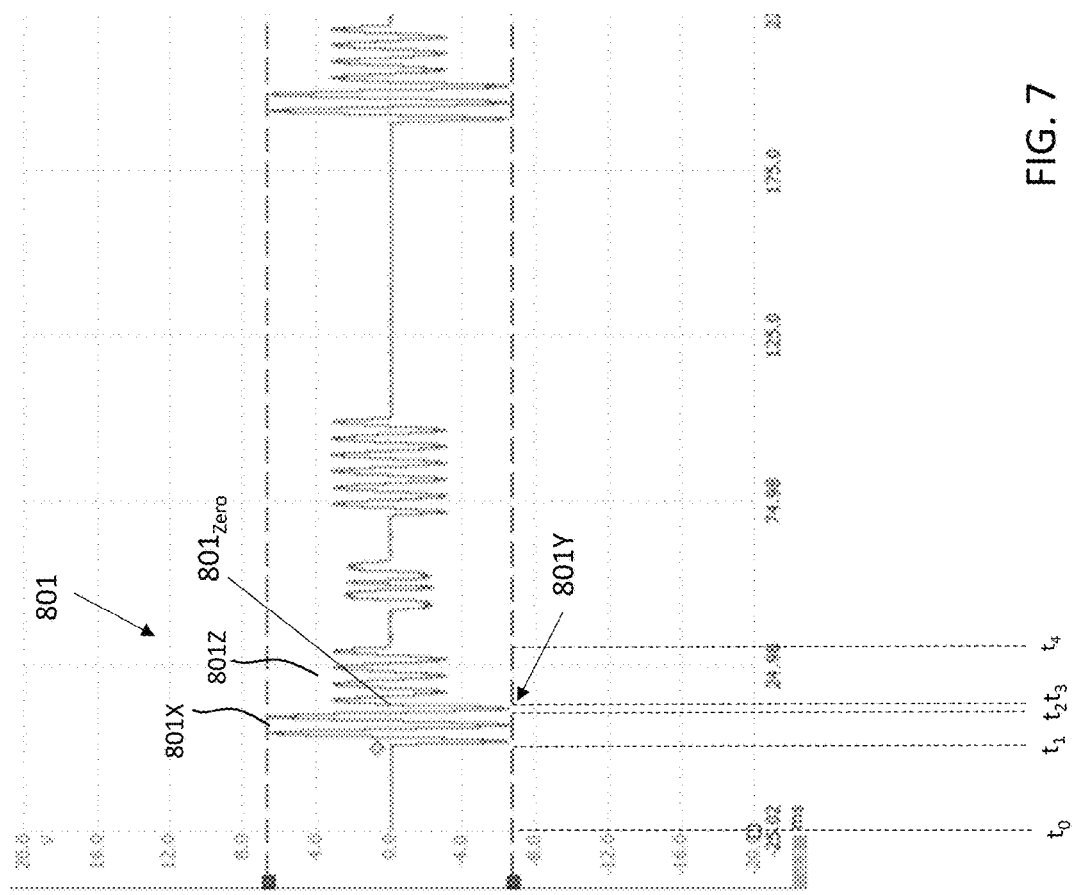

FIG. 7 illustrates a nonzero drive signal that is applied according to a haptic actuator according the state machine of FIG. 4, which includes the extended boost mode 605. More specifically, at time $t_1$, the control circuit 16/106/206 may receive a beginning of the nonzero drive signal and apply a first portion of the nonzero drive signal in the boost mode 604. This step may involve scaling or otherwise mapping the first portion of the nonzero drive signal to a boosted voltage range, wherein the scaled nonzero drive signal is applied as portion 801X of voltage signal 801. At time $t_2$, the boost timeout threshold may be reached or exceeded, but the nonzero drive signal is not at a zero crossing point. Thus, the control circuit 16/106/206 may transition from the boost mode 604 to the extended boost mode 605, in which the nonzero drive signal continues to be scaled to the boosted voltage range. In the extended boost mode 605, another portion of the nonzero drive signal may be applied as the portion 801Y of the voltage signal 801. The extended boost mode 605 may last until time $t_3$, which may be an earlier occurrence of the zero crossing point 801$_{zero}$ being reached or of a duration since a start time of the extended boost mode (i.e., $t_2$) reaching or exceeding an extended boost timeout threshold (or, more generally, a third defined time threshold). At time $t_3$, the control circuit 16/106/206 may apply a remaining portion of the nonzero drive signal in the amplitude-limited mode 606, as portion 801Z of the voltage signal 801. In some instances, the portion of the nonzero drive signal that is applied in the boost mode 604 may be referred to as a first portion of the nonzero drive signal, while the portion that is applied in the amplitude-limited mode 606 may be referred to as a second portion of the nonzero drive signal, and the portion that is applied in the extended boost mode may be referred to as a third portion of the nonzero drive signal.

Figure 8:
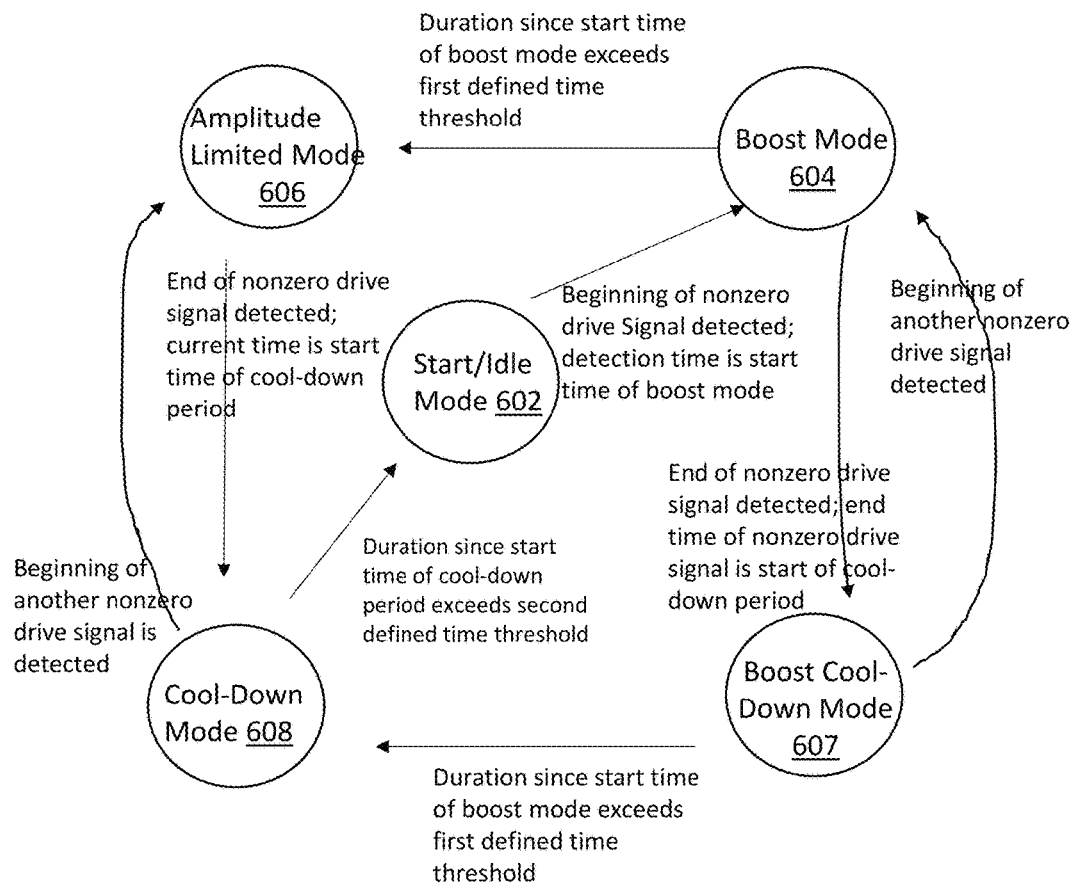
FIG. 8 illustrates a state machine that may be implemented by boost protection logic, according to embodiments hereof.

As stated above, the state machines of FIGS. 3 and 4 may relate to a situation in which a first nonzero drive signal that lasts longer than a boost timeout threshold, such that a transition to the amplitude-limited mode 606 takes place while the first nonzero drive signal is being applied to the haptic actuator 18/108/208. FIG. 8 relates to a state machine for a more general situation in which a first nonzero drive signal can also be shorter in duration than a first defined time threshold (e.g., boost timeout threshold). More specifically, FIG. 8 illustrates a boost cool-down mode 607 in addition to the start/idle mode 602, boost mode 604, amplitude-limited mode 606, and cool-down mode 608. In an embodiment, the control circuit 16/106/206 may transition from the start/idle mode 602 to the boost mode 604, and then to the amplitude-limited mode 606, and then to the cool-down mode 608 in a manner that is similar to FIGS. 3 and 4.

As illustrated in FIG. 8, the control circuit 16/106/206 may also transition from the boost mode 604 to a boost cool-down mode 607. This may occur if one or more nonzero drive signals end before the boost timeout threshold is reached or exceeded by a duration spent in the boost mode 604.

In an embodiment, the boost cool-down mode 607 may be a mode in which the control circuit 16/106/206 is waiting for a subsequent nonzero drive signal, and in which the subsequent nonzero drive signal can be applied in the boost mode 604. More specifically, when the amplitude control circuit 16/106/206 detects a beginning of a subsequent nonzero drive signal, it may transition back to the boost mode 604 and apply the subsequent nonzero drive signal therein.

In an embodiment, the duration since the start time of the boost mode 604 may continue to be incremented even while the control circuit 16/106/206 is in the boost cool-down mode 607. Thus, the boost timeout threshold can be exceeded while the control circuit 16/106/206 is in the boost cool-down mode 607, at which point the control circuit 16/106/206 may transition from the boost cool-down mode 607 to the cool-down mode 608. If this occurs, the time spent in the boost cool-down mode 607 may be included in a cool-down period. In other words, a cool-down period may start at a time at which the control circuit 16/106/206 enters the boost cool-down mode 607.

In an embodiment, when the control circuit 16/106/206 transitions from the boost mode 604 to the boost cool-down mode 607, it may start a cool-down timer to track a length of time spent in a cool-down period (also referred to as a cool-down duration). In an embodiment, the cool-down timer may be reset if/when the control circuit 16/106/206 transitions back from the boost cool-down mode 607 to the boost mode 604. In an embodiment, the control circuit 16/106/206 may transition back and forth between the boost mode 604 and the boost cool-down mode 607 until the duration since a start time of the boost mode 604 in which one or more nonzero drive signals are applied equals or exceeds the first defined time threshold (e.g., boost timeout threshold). In an embodiment, the control circuit 16/106/206 may reset the cool-down timer when it transitions from the cool-down mode 608 to the amplitude-limited mode 606.

Figure 9:
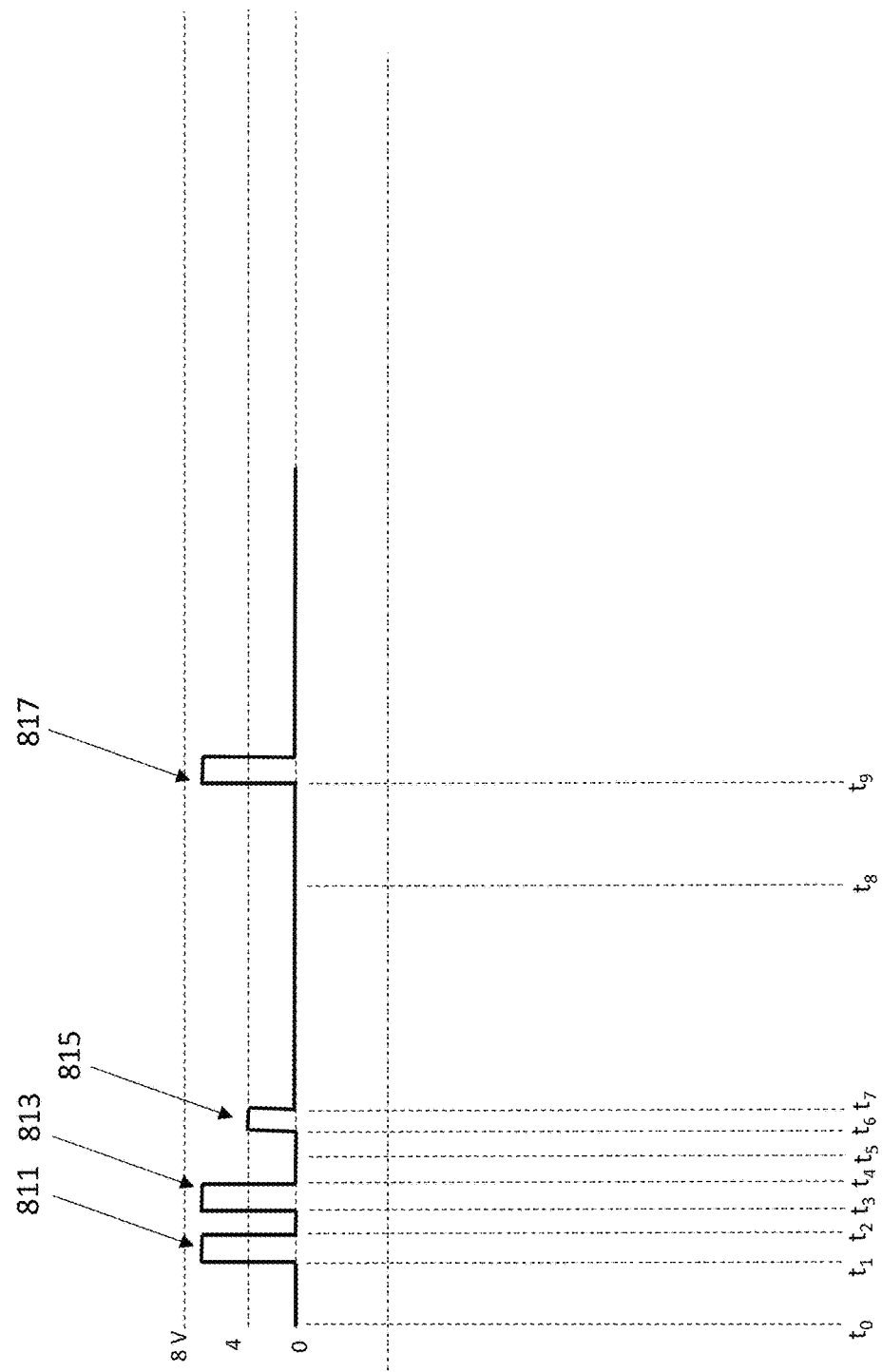
FIGS. 9 and 10 illustrate applying various nonzero drive signals in a boost mode or an amplitude-limited mode, according to embodiments hereof.

FIG. 9 illustrates a plurality of nonzero drive signals that are applied to a haptic actuator 18/108/208 in accordance with the state machine of FIG. 8. At $t_0$, the control circuit 16/106/206 may be in the start/idle mode 602. At $t_1$, the control circuit 16/106/206 may detect a beginning of a first nonzero drive signal, and may transition to the boost mode 604. The time $t_1$ at which the first nonzero drive signal is detected may be designated as a start time of the boost mode 604 for the first nonzero drive signal, and may also currently be the most recent start time of the boost mode 604. In an embodiment, the control circuit 16/106/206 may start a boost timer at $t_1$. In the boost mode 604, the first nonzero drive signal may be allowed to be applied at an amplitude that exceeds a rated maximum voltage of a haptic actuator, by being scaled to a boosted voltage range. The scaled nonzero drive signal may become voltage signal 811, which is applied to the haptic actuator 18/108/208.

At time $t_2$, an end of the first nonzero drive signal may be detected. While the control circuit 16/106/206 may, in the interval from $t_1$ to $t_2$, monitor whether a duration since the start time of the boost mode 604 exceeds the boost timeout threshold, the first nonzero drive signal may end before the boost timeout threshold is reached. At time $t_2$, the control circuit 16/106/206 may transition from the boost mode 604 to the boost cool-down mode 607. The time $t_2$ may be considered a start time of a first cool-down period. In an embodiment, a cool-down timer may be started at time $t_2$, while the boost timer may continue to run (e.g., continue to count upwards).

At time $t_3$, a beginning of a second nonzero drive signal may be detected. As a result, the control circuit 16/106/206 may transition from the boost cool-down mode 607 back to the boost mode 604, in which the second nonzero drive signal is scaled to become voltage signal 813. The control circuit 16/106/206 may be able to transition back to the boost mode 604 because the boost timeout threshold has not yet been reached. Thus, the control circuit 16/106/206 may continue to operate in the boost mode that started at time $t_1$ (i.e., the most recent start time of the boost mode 604 is still time $t_1$). In an embodiment, the transition back to the boost mode 604 may cause the cool-down timer to be reset, while the boost timer may continue to run.

At time $t_4$, an end of the second nonzero drive signal may be detected. The end of the second nonzero drive signal may also come before the boost timeout threshold is reached. Thus, the control circuit 16/106/206 may transition back to the boost cool-down mode 607. In an embodiment, time $t_4$ may be a start time of a second cool-down time period. In an embodiment, the cool-down timer may begin to increment or otherwise counter starting from time $t_4$. Further, the boost timer may continue to run.

At time $t_5$, the control circuit 16/106/206 may detect that a duration since the most recent start time of the boost mode 604 (i.e., $t_1$) equals or exceeds the first defined time threshold, such as the boost timeout threshold. As a result of the duration exceeding the first defined time threshold, the control circuit 16/106/206 may transition to the cool-down mode 608. While in the cool-down mode 608, the control circuit 16/106/206 may monitor whether a duration of the second cool-down period has reached or exceeds a cooling time threshold.

At time $t_6$, a beginning of a third nonzero drive signal may be detected. At this time, the control circuit 16/106/206 may transition from the cool-down mode 608 to the amplitude-limited mode 606, rather than to the start/idle mode, because a a value of the cool-down timer, which is equal to a length of the second cool-down period ($t_6-t_4$), is less than the cooling time threshold. More generally, the transition is to the amplitude-limited mode 606 because a length of time from an end of the previous consecutive nonzero drive signal to the beginning of the third nonzero drive signal is less than the cooling time threshold. In the amplitude-limited mode 606, the third non-zero drive signal may be scaled to the amplitude-limited voltage range, to be voltage signal 815. In an embodiment, the cool-down timer may be reset at or after $t_6$.

At time $t_7$, an end of the third non-zero drive signal may be detected, and the control circuit 16/106/206 may transition to the cool-down mode 608 again. The end of the third non-zero drive signal may correspond with a start time of a third cool-down period. In an embodiment, the cool-down timer may be started again at $t_7$.

At time $t_8$, the control circuit 16/106/206 may detect that a duration since the start time of the third cool-down period (i.e., $t_8-t_7$) exceeds the cooling time threshold, and may transition to the start/idle mode 602. As stated above, this transition may in an embodiment not be explicitly performed. At time $t_9$, when the amplitude control circuit 16/106/206 detects a beginning of a fourth nonzero drive signal, it may determine that the fourth nonzero drive signal can be applied in the boost mode. This determination may be based on the control circuit 16/106/206 currently being in the start/idle mode, or more generally may be based on a duration between the beginning of the fourth nonzero drive signal and an end of a previous consecutive nonzero drive signal exceeding the cooling time threshold. This duration may be the length of the third cool-down period, which may be reflected in a value of the cool-down timer, or as $t_9-t_7$. Further, the most recent start time of the boost mode 604 may be updated, from being $t_1$ to being $t_9$. In the boost mode 604, the fourth nonzero drive signal may be scaled to be voltage signal 817.

Figure 10:
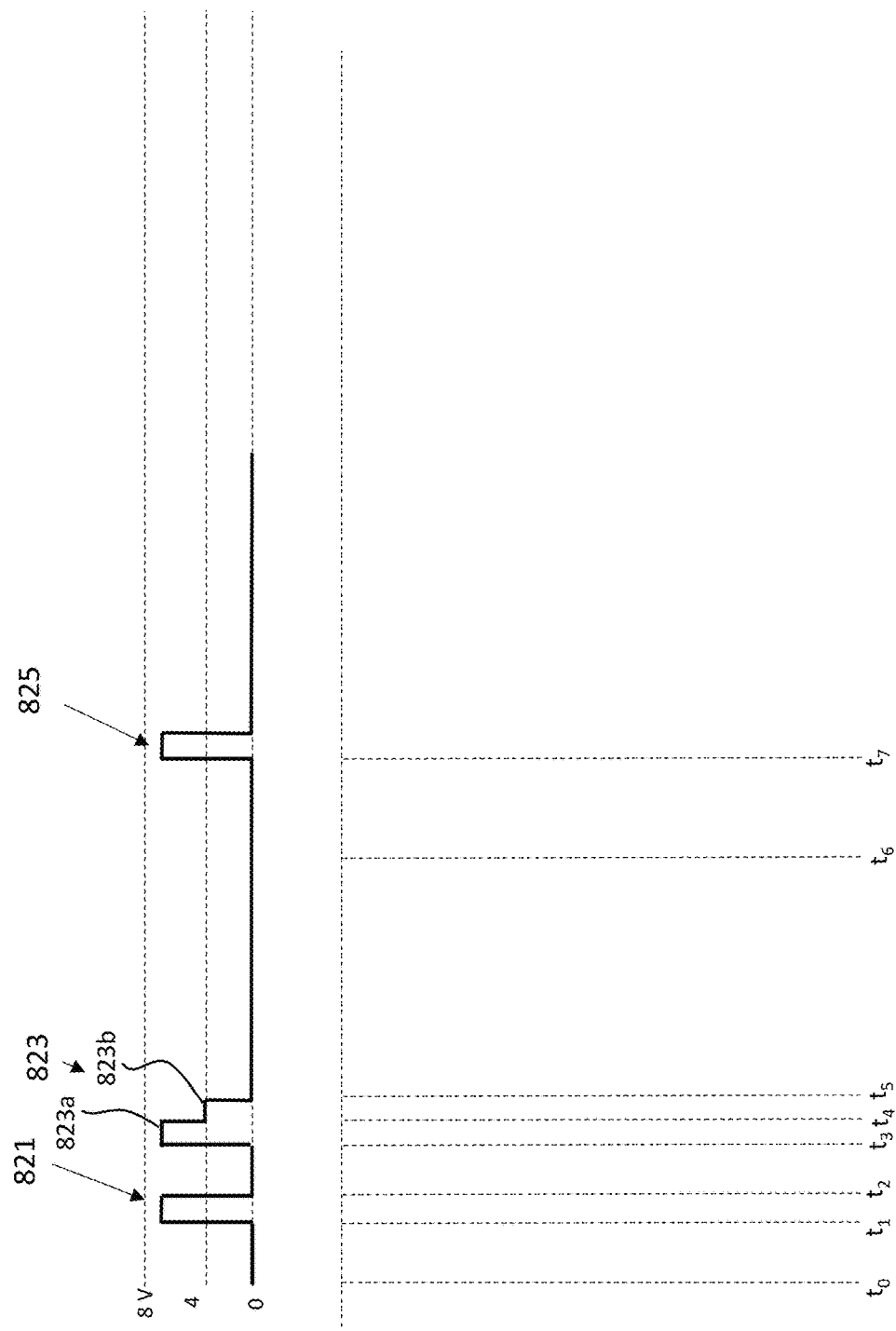

FIG. 10 illustrates a plurality of nonzero drive signals that are also applied to a haptic actuator 18/108/208 in accordance with the state machine of FIG. 10. At time $t_0$, the control circuit 16/106/206 may be in the start/idle mode 602. At time $t_1$, the control circuit 16/106/206 may detect a beginning of a first nonzero drive signal, and apply the first nonzero drive signal as voltage signal 821 in the boost mode 604. The beginning of the first nonzero drive signal 821 may be designated as a start time of the boost mode 604.

At time $t_2$, an end of the first nonzero drive signal is detected. This may occur before a duration since the start time of the boost mode 604 exceeds the first defined time threshold (e.g., boost timeout threshold). As a result, there may be a transition from the boost mode 604 to the boost cool-down mode 607. The time $t_2$ may define a start time of a first cool-down period.

At time $t_3$, a beginning of the second nonzero drive signal may be detected. As a result, the control circuit 16/106/206 may transition back to the boost mode 604. As a result, a first portion of the second nonzero drive signal is applied in the boost mode 604 as portion 823 of voltage signal 823. Note that, at time $t_3$, the control circuit 16/106/206 does not transition to the amplitude-limited mode 606 because the boost timeout threshold has not yet been reached at time $t_3$. At this point, the most recent start time of the boost mode 604 may still be time $t_1$.

At time $t_4$, while in the boost mode 604, the control circuit 16/106/206 may detect a duration since a start time of the boost mode 604 (i.e., a duration since $t_1$) exceeding the first defined time threshold (e.g., boost timeout threshold). As a result, the control circuit 16/106/206 may apply a second portion of the second nonzero drive signal in the amplitude-limited mode 606, as portion 823b of voltage signal 823.

At time $t_5$, an end of the second nonzero drive signal 823 may be detected. As a result, there may be a transition from the amplitude-limited mode 606 to the cool-down mode 608. In an embodiment, the end of the second nonzero drive signal 823 may correspond to (e.g., designated as) a start time of a second cool-down period.

At time $t_6$, the control circuit 16/106/206 may detect that a duration since a start time of the second cool-down period (i.e., $t_6-t_5$) equals or exceeds a second defined time threshold (e.g., a cooling time threshold). Upon detecting this event, the control circuit 16/106/206 may transition from the cool-down mode 608 to the start/idle mode 602. When a third nonzero drive signal is detected at time $t_7$, the control circuit 16/106/206 may apply the third nonzero drive signal in the boost mode 604 as voltage signal 825, and the most recent start time of the boost mode may be updated from being $t_1$ to being $t_7$. The control circuit 16/106/206 may determine to apply the third nonzero drive in the boost mode 604 because the third nonzero drive signal was detected while the control circuit 16/106/206 was in the start/idle mode 602, or more generally because a duration between a beginning of the third nonzero drive signal and an end of a previous consecutive nonzero drive signal exceeds the second defined time threshold. This duration may be equal to a duration of the second cool-down period, which may be equal to a value of the cool-down timer, or more generally equal to $t_7-t_5$.

Figure 11:
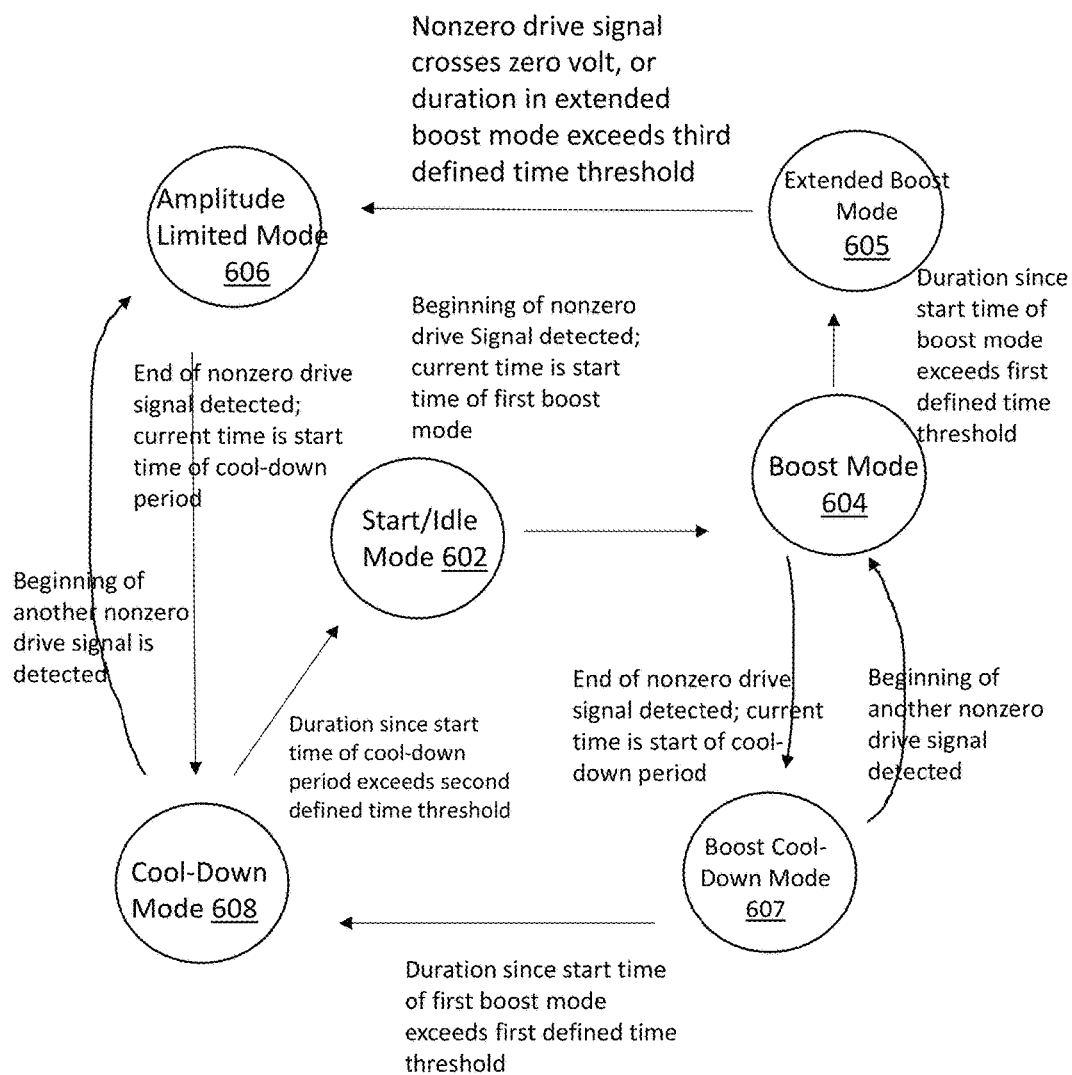
FIG. 11 illustrates a state machine that may be implemented by boost protection logic, according to embodiments hereof.

FIG. 11 illustrates a state machine that is similar to the state machine of FIG. 8, but further includes an extended boost mode 605. As discussed above, the extended boost mode may be used for a nonzero drive signal that alternates between a positive polarity and a negative polarity. More specifically, when a duration since a start time of a boost mode exceeds the first defined time threshold (e.g., boost timeout threshold), the control circuit 16/106/206 may transition from the boost mode 604 to the extended boost mode 605, rather than directly to the amplitude-limited mode 606. The extended boost mode 605 may allow the nonzero drive signal to continue to be scaled to the boosted voltage range or boosted current range until a zero crossing point until a duration spent in the extended boost mode 605 exceeds another defined time threshold (e.g., an extended boost timeout threshold), whichever occurs sooner.

Figure 12A:
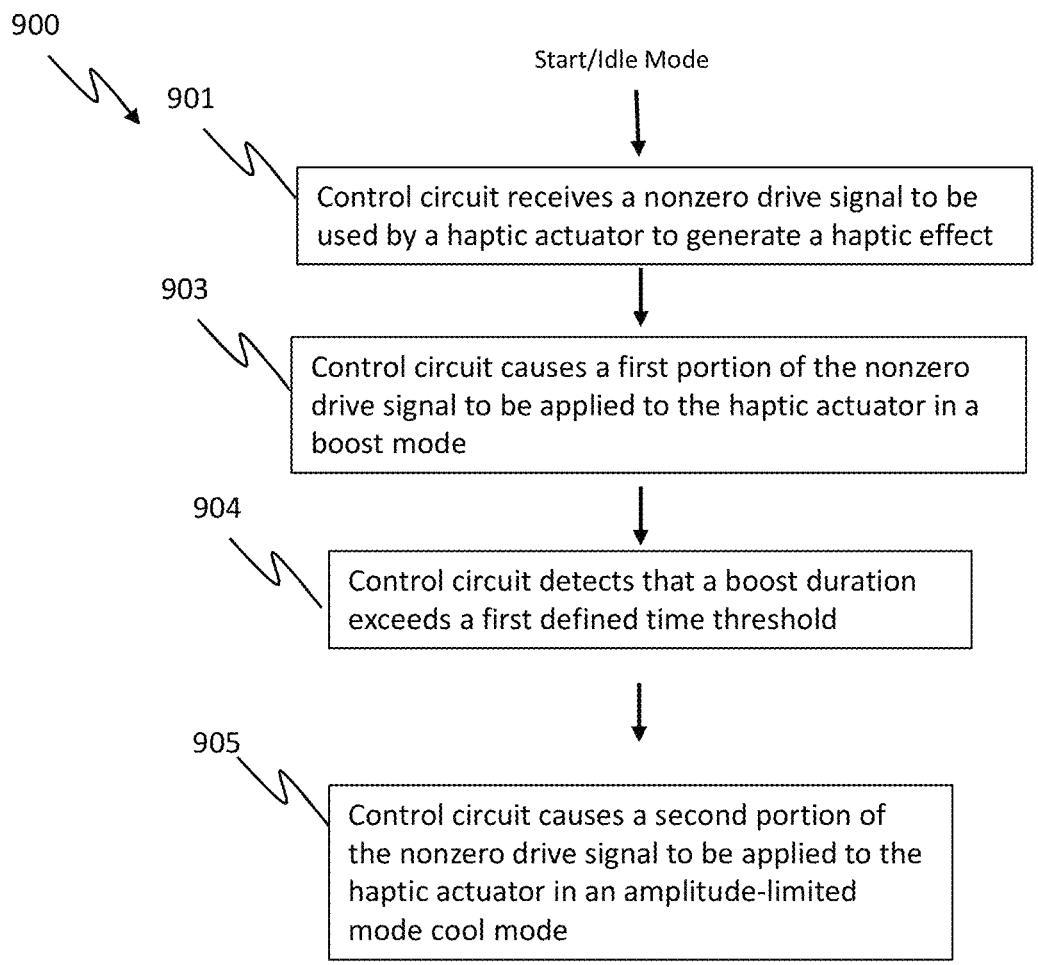
FIGS. 12A, 12B, 13, 14, 15A, 15B, and 16 illustrate various methods implemented by boost protection logic, according to embodiments hereof.

FIG. 12A illustrates an example method 900 of applying one or more nonzero drive signals to a haptic actuator, according to the embodiments herein. The method 900 may be performed by a control circuit, such as control circuit 16, 106, or 206. In an embodiment, the method begins at a step 901, in which the control circuit 16/16/106/206 receives a nonzero drive signal to be used by a haptic actuator 18/108/208 to generate a haptic effect, wherein the haptic actuator 18/108/208 may have a defined rated maximum voltage or current. The nonzero drive signal may be, e.g., the first nonzero drive signal in FIG. 5 or the second nonzero drive signal in FIG. 10. The nonzero drive signal may be received from, e.g., a signal generator 102/202, which may have retrieved the nonzero drive signal from memory.

In step 903, the control circuit 16/106/206 causes a first portion of the nonzero drive signal to be applied (e.g., by the signal modification circuit/module 104/204) in the boost mode 604, in which the first portion of the nonzero drive signal is scaled to a boosted voltage range or boosted current range, wherein an absolute value of a minimum value or maximum value of the boosted voltage range or boosted current range exceeds the defined rated maximum voltage or defined rated maximum current of the haptic actuator. For instance, step 903 may involve applying a first portion of the first nonzero drive signal in FIG. 5 in the boost mode 604, or applying a first portion of the second nonzero drive signal in FIG. 10 in the boost mode 604 (the first nonzero drive signal in FIG. 10 may also have been applied in the boost mode 604).

In an embodiment, the nonzero drive signal is one of one or more consecutive nonzero drive signals that are applied in the boost mode 604. In an embodiment, the nonzero drive signal may be a latest one (i.e., latest in time) of a plurality of consecutive nonzero drive signals, wherein the control circuit may have been in the start/idle mode 602 or the cool-down mode 608 right before the plurality of consecutive nonzero drive signals were applied. In an embodiment, an earliest nonzero drive signal of the one or more consecutive nonzero drive signals may define a start time of the boost mode 604, wherein any nonzero drive signal that precedes and is consecutive to the earliest nonzero drive signal was not applied in the boost mode, or was separated from the earliest nonzero drive signal by at least a cooling time threshold.

In step 904, the control circuit detects a boost duration exceeding a first defined time threshold, wherein the boost duration is a duration since a start time of the boost mode. The control circuit 16/106/206 may monitor the boost duration in order to detect the boost duration exceeding the first defined time threshold. In an embodiment, the nonzero drive signal may be the first nonzero drive signal of FIG. 5, and the start time of the boost mode 604 may be the beginning of the first nonzero drive signal (i.e., time $t_1$ in FIG. 5). In an embodiment, the nonzero drive signal is a latest one of a plurality of consecutive nonzero drive signals that are applied in the boost mode 604. For instance, the nonzero drive signal may be the second nonzero drive signal in FIG. 10, wherein the first nonzero drive signal and the second nonzero drive signal are consecutive nonzero drive signals that are applied in the boost mode. In this embodiment, the start time of the boost mode 604 may be a beginning of an earliest one of the plurality of consecutive nonzero drive signals (i.e., time $t_1$ in FIG. 10). Each of the consecutive nonzero drive signals may be applied in the boost mode only in response to a determination that a duration since the start time of the boost mode to the beginning of the respective nonzero drive signal has not exceeded the first defined time threshold. In an embodiment, the first defined time threshold may be exceeded at, e.g., time $t_2$ in FIG. 5 or time $t_4$ in FIG. 10.

In step 905, in response to detecting that the boost duration exceeds the first defined time threshold, the control circuit causes a second portion of the nonzero drive signal to be applied (by the signal modification circuit/module 104/204) in an amplitude-limited mode 606, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator 18/108/208. The second portion may be, e.g., the second portion of the first nonzero drive signal in FIG. 5, or the second portion of the second nonzero drive signal in FIG. 10.

Figure 12B:
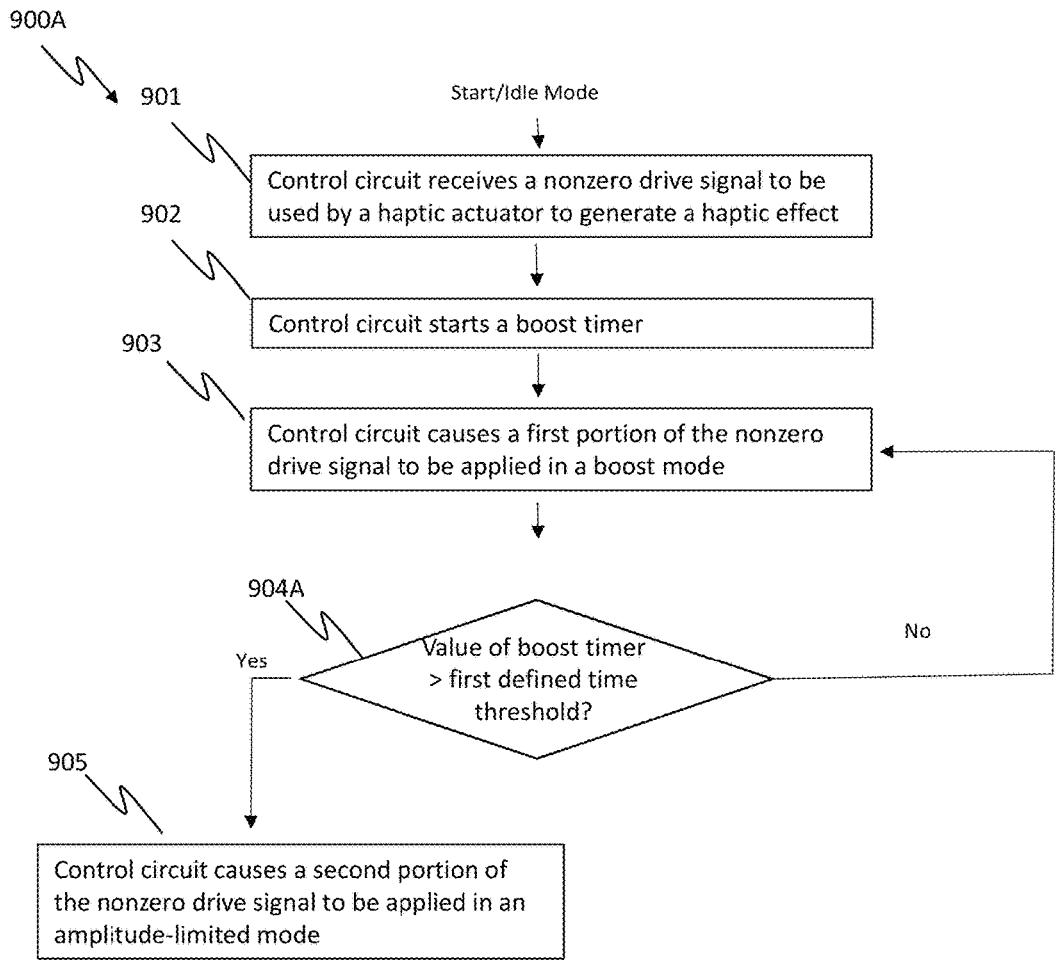

FIG. 12B illustrates a method 900A that is a more specific version of the method 900. The method 900A may also include a step 901, and then proceed to step 902. In step 902, the control circuit 16/106/206 starts a boost timer. For instance, the nonzero drive signal may be the first nonzero drive signal of FIG. 5 or the first nonzero drive signal, and the boost timer may be started at time $t_1$, and begin counting (e.g., incrementing) from a reset value (e.g., reset value of t=0 sec). The example of FIG. 10 may also involve starting a boost timer at time $t_1$. The boost timer may be started when a beginning of the nonzero drive signal is detected in a start/idle mode 602, which may be the case if the boost timer is at a reset value. In such a situation, the beginning of the nonzero drive signal constitutes a start time of a boost mode 604 for the nonzero drive signal. The boost timer may count upwards from the reset value or may count down from the first defined time threshold.

Like in method 900, method 900A may include a step 903, in which the control circuit causes a first portion of the nonzero drive signal to be applied in the boost mode 604. In step 904A, which may be an embodiment of step 904, the control circuit 16/106/206 may determine whether a current value of the boost timer is greater than the first defined time threshold. For instance, the control circuit 16/106/206 may perform step 904A periodically (e.g., every 1 ms or every 50 μs). Step 904A may apply to a situation in which the boost timer counts upwards. In an alternative embodiment, the boost timer may count down, and the control circuit 16/106/206 may instead determine whether the boost timer has counted down from the first defined time threshold to a value of zero.

In an embodiment, if the value of the boost timer has not yet exceeded the first defined time threshold, the control circuit 16/106/206 may return to step 903 to continue applying the nonzero drive signal in the boost mode 604. The value of the boost timer may exceed the first defined time threshold at, e.g., time $t_2$ in FIG. 5 or $t_4$ in FIG. 10. At that point, the control circuit 16/106/206 may proceed to step 905, in which a second portion of the nonzero drive signal is applied in the amplitude-limited mode 606.

Figure 13:
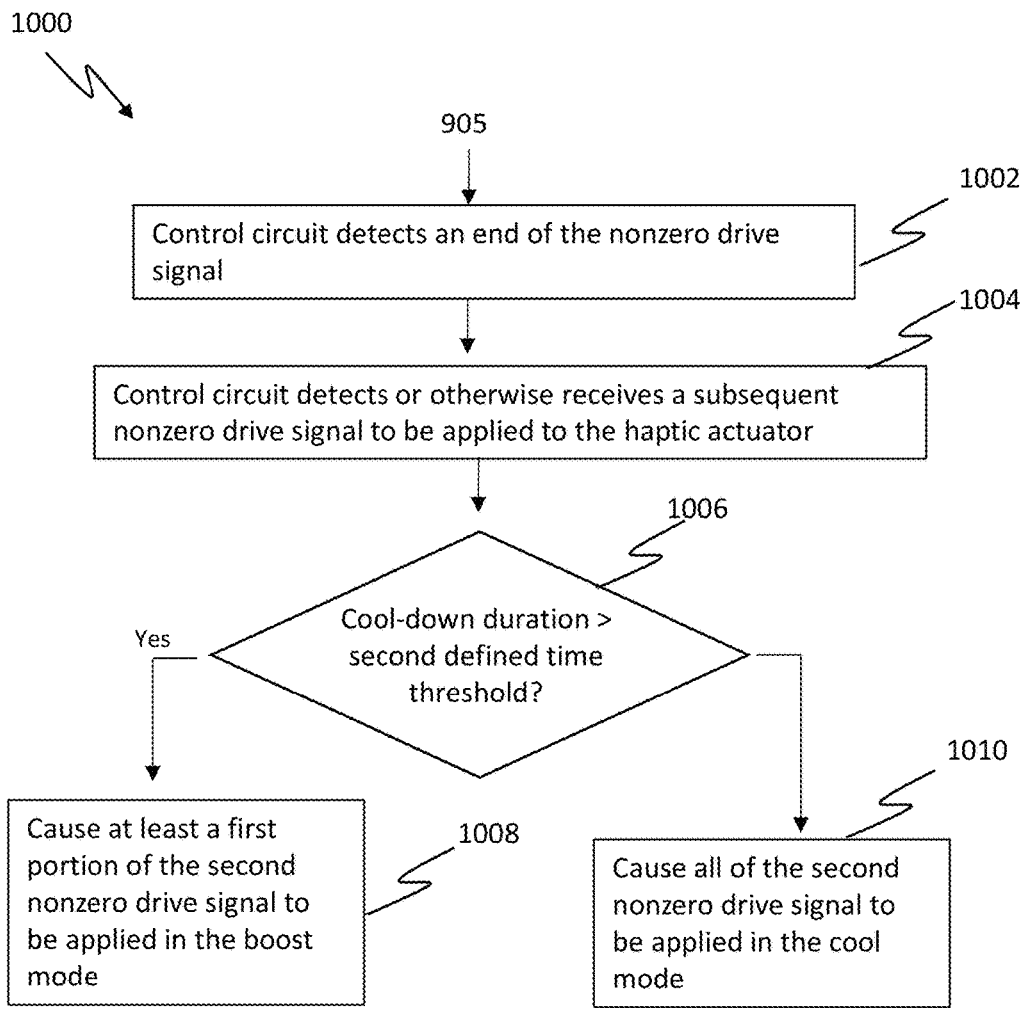

FIG. 13 illustrates a method 1000 that includes the steps of FIG. 12B, and further includes steps 1002-1010 that describe operation of the control circuit 16/106/206 after entering the amplitude-limited mode 606 in step 905. In step 1002, the control circuit 16/106/206 detects an end of the nonzero drive signal, such as an end of the first nonzero drive signal at time $t_3$ in FIG. 5, or an end of the second nonzero drive signal at time $t_5$ in FIG. 10. The end of the nonzero drive signal may define a start time of a cool-down period. In an embodiment, a cool-down timer may be started when the end of the nonzero drive signal is detected.

In step 1004, the control circuit detects a subsequent nonzero drive signal, such as the second nonzero drive signal in FIG. 5, or the third nonzero drive signal in FIG. 10.

In step 1006, the control circuit determines whether a cool-down duration exceeds a second defined time threshold (e.g., a cooling time threshold). The control circuit may monitor the cool-down duration in order to make this determination. The cool-down duration may be a length of a cool-down period that immediately precedes the subsequent nonzero drive signal, and may be reflected in a value of the cool-down timer. More generally speaking, the cool-down duration may be a duration between a beginning of the subsequent nonzero drive signal and an end of a previous nonzero consecutive nonzero drive signal. For instance, if the subsequent nonzero drive signal is the second nonzero drive signal in FIG. 5, the cool-down duration may be equal to t4–t3. If the subsequent nonzero drive signal is the third nonzero drive signal in FIG. 5, the cool-down duration may be equal to t7–t5. In an embodiment, if the cool-down timer counts downward, step 1006 may involve the control circuit 16/106/206 determining whether a current value of the cool-down timer has reached zero.

Returning to FIG. 13, in response to determining that the cool-down duration exceeds the second defined time threshold, the control circuit in step 1008 causes at least a first portion of the subsequent nonzero drive signal (e.g., the third nonzero drive signal in FIG. 10) to be applied (by the signal modification circuit/module 104/204) in the boost mode 604. In response to determining that the cool-down duration does not exceed the second defined time threshold, the control circuit in step 1010 causes all of the subsequent nonzero drive signal (e.g., the second nonzero drive signal in FIG. 5) to be applied in the amplitude-limited mode 606.

Figure 14:
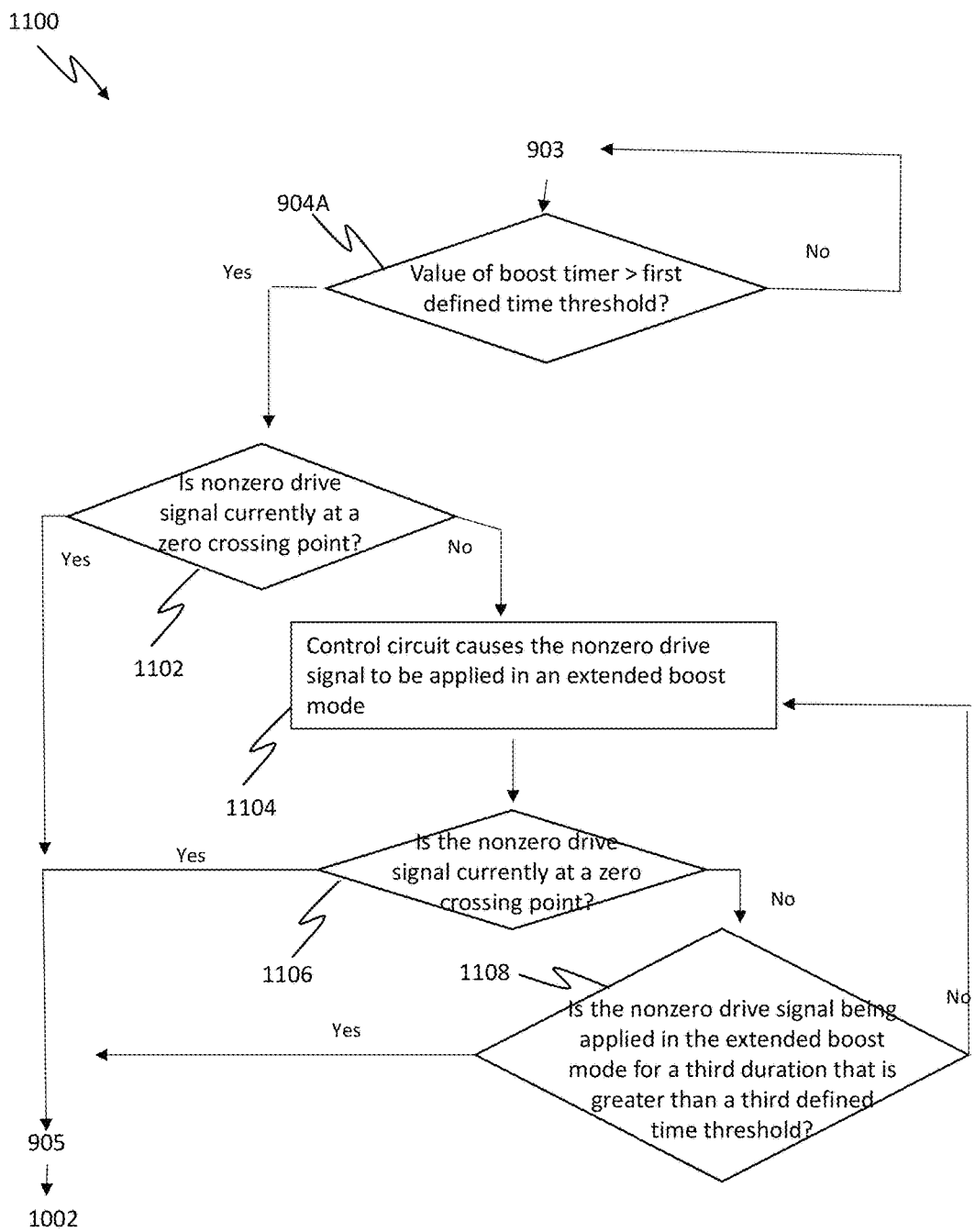

FIG. 14 illustrates a method 1100 that illustrates the extended boost mode 605 of FIGS. 4 and 11. The method involves steps of FIG. 12B, and further includes a step 1102, in which the control circuit 16/106/206 determines if the nonzero signal, such as the first nonzero drive signal in FIG. 7, is at a zero crossing point, which may be a point at which the nonzero drive signal crosses a value of zero. If so, the control circuit 16/106/206 transitions to the amplitude-limited mode (step 905). If, however, the control circuit determines that the nonzero drive signal is not at a zero crossing point, the control circuit at step 1104 causes the nonzero drive signal to be applied in an extended boost mode 605, in which the nonzero drive signal continues to be scaled to a boosted voltage range or booted current range. For instance, the portion 801Y of the voltage signal 801 in FIG. 7 may have been applied in the extended boost mode 605.

In step 1106, while in the extended boost mode, the control circuit 16/106/206 determines whether nonzero drive signal has reached a zero crossing point. If so, the control circuit 16/106/206 transitions to the amplitude-limited mode. Otherwise, the control circuit in step 1108 determines, while in the extended boost mode, if the nonzero drive signal has been applied in the extended boost mode for a third duration that is greater than a third defined time threshold (e.g., an extended boost timeout threshold). If the third duration is greater than the third defined time threshold, the control circuit 16/106/206 may transition to the amplitude-limited mode 606. Thus, the extended boost mode 605 may end at an earlier of: i) a zero crossing point of the nonzero drive when it is in the extended boost mode, or ii) a duration since a start of the extended boost mode exceeding the third defined time threshold, such as an extended boost timeout threshold.

Figure 15A:
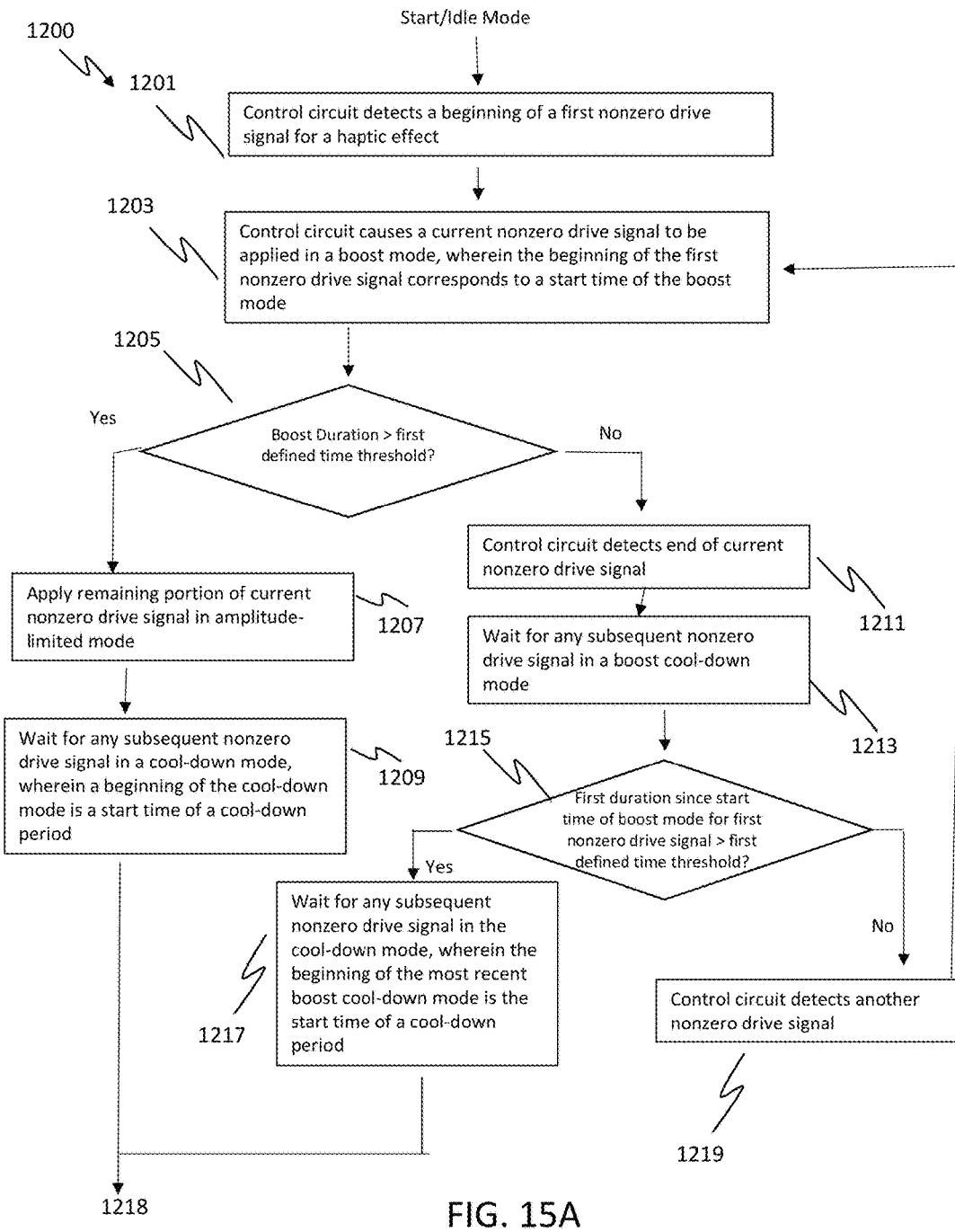
Figure 15B:
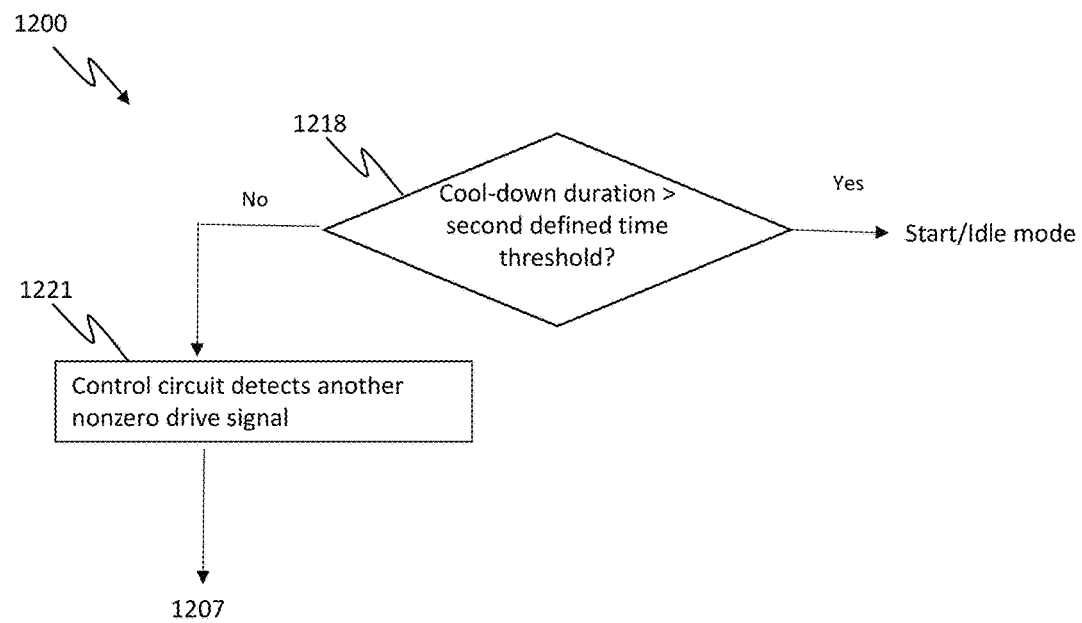

FIGS. 15A and 15B illustrate a method 1200 for applying one or more nonzero drive signals to a haptic actuator, according to the state machine of FIG. 8. In an embodiment, the method 1200 includes a step 1201, in which a control circuit 16/106/206 detects or otherwise receives a beginning of a first nonzero drive signal (e.g., the first nonzero drive signal in FIG. 9) for use by a haptic actuator to generate a haptic effect.

In step 1203, the control circuit causes a current nonzero drive signal to be applied in a boost mode 604. The steps in method 1200, including step 1203, may be part of a loop, which may cycle through numerous iterations. In other words, step 1203 may be performed multiple times. When the step 1203 is being performed the first time, which occurs when the first nonzero drive signal is detected, the first nonzero drive signal is the current nonzero drive signal. When the nonzero first drive signal has ended and step 1203 is being performed on a subsequent nonzero drive signal, the subsequent nonzero drive signal may be the current nonzero drive signal. In an embodiment, the beginning of the first nonzero drive signal may define a start time of the boost mode 604.

In step 1205, a determination is made for whether a boost duration exceeds a first defined time threshold, wherein the boost duration is a duration since the start time of the boost mode 604. For instance, with reference to FIG. 9, the start time of the boost mode 604 may be $t_1$. When the step 1205 is being performed at a time t, the boost duration may be $t-t_1$. Step 1205 may be part of a step of monitoring whether the first defined time threshold has been exceeded, which may be done continuously or periodically.

In step 1207, in response to determining that the boost duration exceeds the first defined time threshold, the control circuit may apply any remaining portion of the current nonzero drive signal in the amplitude-limited mode 606.

In step 1209, after the current nonzero drive signal has ended, the control circuit 1207 may wait for any subsequent nonzero drive signal in the cool-down mode 608. The beginning of the cool-down mode may be a start time of a cool-down period.

In step 1211, in response to determining that the boost duration has not yet exceeded the first defined time threshold, the control circuit may continue applying the current nonzero drive signal in the boost mode 604 until it detects an end of the current nonzero drive signal in step 1211.

In step 1213, the control circuit may wait for any subsequent nonzero drive signal in a boost cool-down mode 607. A beginning of the boost cool-down mode 607 may define a start time of a cool-down period. In the boost cool-down mode 607, the control circuit may determine in step 1215 whether the boost duration (the duration since $t_1$) exceeds the first defined time threshold.

In step 1217, in response to determining that the boost duration exceeds the first defined time threshold, the control circuit may exit the boost cool-down mode 607 and enter the cool-down mode 608. For instance, FIG. 9 illustrates a situation in which the control circuit determines, at time $t_5$, that the boost duration exceeds the first defined time threshold, and transitions from the boost cool-down mode 607 to the cool-down mode 608. In the cool-down mode 608, the control circuit may in step 1217 wait for any subsequent nonzero drive signal. In an embodiment, a beginning of the most recent period spent by the control circuit 16/106/206 in the boost cool-down mode may define a start time of a most recent cool-down period.

In the cool-down mode 608 in step 1218, which is illustrated in FIG. 15B, the control circuit may determine whether a cool-down duration has reached or has exceeded a second defined time threshold. The cool-down duration may be a duration since a start time of the most recent cool-down period. For instance, with reference to FIG. 9, the control circuit may be in the cool-down mode 608 in the period between $t_5$ and $t_6$, and in the interval between $t_7$ and $t_8$. The period between $t_5$ and $t_6$ may be part of a cool-down period that started when the control circuit 16/106/206 was still in the boost cool-down mode 607, which started at $t_4$. Thus, during that period, the control circuit 16/106/206 may in step 1218 determine whether a duration since time $t_4$ (i.e., $t-t_4$), which may be the cool-down duration, has exceeded the second defined time threshold. The later period of $t_7$ to $t_8$ may be part of a cool-down period that starts at $t_7$. Thus, in this period, the control circuit 16/106/206 may also be performing step 1218 by determining whether a duration since time $t_7$ (i.e., $t-t_7$), which may be the cool-down duration, has exceeded the second defined time threshold.

In step 1221, in response to determining that the cool-down duration has not yet reached or exceeded the second defined time threshold, the control circuit 16/106/206 may continue to wait in the cool-down mode 608 until it detects another nonzero drive signal in step 1221. For instance, in the period between $t_5$ and $t_6$ in FIG. 9, the cool-down duration does not exceed the second defined time threshold. Thus, the control circuit 16/106/206 waits in the cool-down mode 608. When another nonzero drive signal is detected, the control circuit 16/106/206 may then return to step 1207 to apply the detected nonzero drive signal in the amplitude-limited mode 606. If, in step 1221, the cool-down duration does exceed the second defined time threshold, the control circuit may return to the start/idle mode 602, after which a subsequent nonzero drive signal (e.g., 815) will be applied in the boost mode 604 again. For instance, in the cool-down period that begins with time t7, the control circuit 16/106/206 may determine at time t8 that the cool-down duration has exceeded the second defined time threshold, and then transition to the start/idle mode 602, after which the fourth nonzero drive signal in FIG. 9 is applied in the boost mode.

Returning to FIG. 15A, in step 1219, in response to determining that the first duration has not exceeded the first defined time threshold, the control circuit may continue to wait for any subsequent nonzero drive signal in the boost cool-down mode 607, until it detects another nonzero drive signal (e.g., 813) in step 1219. Because the first duration has not yet exceeded the first defined time threshold, at least a portion of the subsequent drive signal 813 may also be applied in the boost mode 604.

Figure 16:
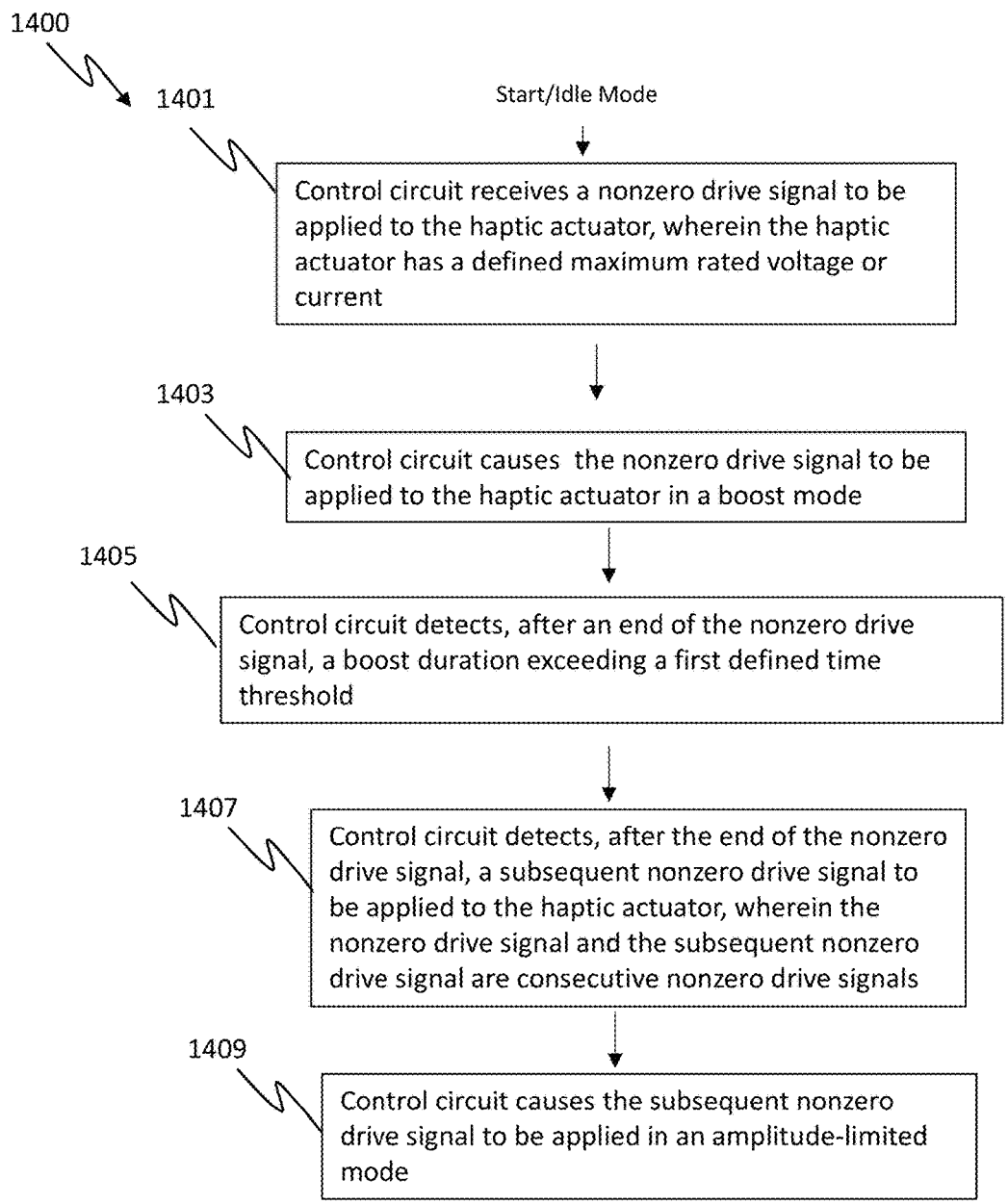

FIG. 16 illustrates a method 1400 in which a boost duration exceeds a first defined time threshold, such as the boost timeout threshold, during a cool-down period between two nonzero drive signals, rather than while a nonzero drive signal is being applied to a haptic actuator. In an embodiment, the method begins in step 1401, in which the control circuit 16/106/206 receives a nonzero drive signal to be applied to the haptic actuator 18/108/208, wherein the haptic actuator has a defined rated maximum voltage or current. For instance, step 1401 may involve the control circuit receiving the first nonzero drive signal or the second nonzero drive signal in FIG. 9. In an embodiment, the nonzero drive signal may be received from an output of a signal generator. In an embodiment, the step 1401 may involve detecting a beginning of the nonzero drive signal.

In step 1403, the control circuit 16/106/206 causes the nonzero drive signal to be applied to the haptic actuator 18/108/208 in the boost mode 604, in which the nonzero drive signal is scaled to a boosted voltage range or boosted current range, wherein an absolute value of a minimum value or maximum value of the boosted voltage range or boosted current range exceeds the defined rated maximum voltage or defined rated maximum current of the haptic actuator 18/108/208. For instance, step 1403 may involve the control circuit 16/106/206 applying the first nonzero drive signal and the second nonzero drive signal of FIG. 9 in the boost mode 604. Thus, like in step 903, the nonzero drive signal may be one of one or more consecutive nonzero drive signals that are applied in the boost mode. The control circuit 16/106/206 may be concurrently monitoring a boost duration, which may be a duration since a start time of the boost mode 604, to detect whether the boost duration exceeds a first defined time threshold, such as a boost timeout threshold. In an embodiment, the start time of the boost mode may refer to the most recent start time of the boost mode 604. In the context of FIG. 9, when the first nonzero drive signal and the second nonzero drive signal are being applied in the boost mode 604, the most recent start time of the boost mode may be $t_1$. When the fourth nonzero drive signal is later applied in the boost mode 604, the most recent start time of the boost mode may be $t_9$.

In step 1405, the control circuit 16/106/206 detects, after an end of the nonzero drive signal, a boost duration exceeding a first defined time threshold. In the context of FIG. 9, for instance, although the control circuit 16/106/206 monitors the boost duration while the first nonzero drive signal and the second nonzero drive signal are being applied in the boost mode 604, the boost duration does not exceed the boost timeout threshold until the first nonzero drive signal and the second nonzero drive signal has ended. In FIG. 9, the second nonzero drive signal ends at $t_4$. After time $t_4$, the control circuit 16/106/206 detects at time $t_5$ the boost duration exceeding the boost timeout threshold.

In step 1407, the control circuit 16/106/206 detects, after the end of the nonzero drive signal, a subsequent nonzero drive signal to be applied to the haptic actuator 18/108/208, wherein the nonzero drive signal and the subsequent nonzero drive signal are consecutive nonzero drive signals. For instance, the subsequent nonzero drive signal may be the third nonzero drive signal in FIG. 9, and is detected after an end of the second nonzero drive signal, wherein the second nonzero drive signal and the third nonzero drive signal are consecutive nonzero drive signals.

In step 1409, the control circuit 16/106/206 causes the subsequent nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator 18/108/208. For instance, upon detecting the third nonzero drive signal in FIG. 9, the control circuit 16/106/206 causes the amplitude modification circuit/module 104/204 to apply the third nonzero drive signal in the amplitude-limited mode.

In an embodiment, the subsequent nonzero drive signal is applied in the amplitude-limited mode only in response to a determination that a cool-down duration, which is a duration between the end of the nonzero drive signal and a beginning of the subsequent nonzero drive signal, is less than a second defined time threshold. For instance, the third nonzero drive signal in FIG. 9 is applied in the amplitude-limited mode only in response to a determination that a duration between $t_4$ and $t_6$ is less than (or, more generally, does not exceed) a second defined time threshold, such as a cooling time threshold. If the cooling time threshold is exceeded, then the control circuit 16/106/206 may have already transitioned to the start/idle mode 602, which would have allowed the third nonzero drive signal to be applied in the boost mode 604. In an embodiment, method 1400 may incorporate features discussed above with respect to method 900, 900A, 1000, 1100, or 1200. For instance, the method 1400 may incorporate the steps involved in transitioning between the amplitude-limited mode 606 and the cool-down mode 608, and transitioning from the cool-down mode 608 to the start/idle mode 602.

As discussed above, some embodiments herein relate to determining whether to apply a nonzero drive signal in a boost mode or in an amplitude-limited mode (or, more generally, an amplitude-limited mode) based on tracking an accumulated boost time, an accumulated heating time, and an accumulated cooling time (also referred to as a cumulative boost time, a cumulative heating time, and a cumulative cooling time, respectively). The nonzero drive signal may be defined by a continuous signal, such as an analog signal, or may be defined by a plurality of discrete signal values, which are also referred to as discrete samples or discrete signal samples.

In an embodiment, the accumulated boost time may track, e.g., how long one or more nonzero drive signals have been applied in a boost mode since a start time of the boost mode. More specifically, the accumulated boost time may be a cumulative amount of time that the control circuit has spent applying one or more nonzero drive signals while in the boost mode, and may be measured from a most recent reset of the accumulated boost time, or after the most recent reset thereof. In the state machines discussed above, such as with respect to FIGS. 8 and 11, the boost duration may continue to increment or otherwise continue counting even after a nonzero drive signal has ended. For instance, after the control circuit 16/106/206 transitions from the boost mode 604 to the boost cool-down mode 607, the boost duration may continue to increase. Thus, as illustrated in FIG. 9, the boost duration may be able to exceed a first defined time threshold during a cool-down period between $t_4$ and $t_6$. The accumulated boost time, on the other hand, may change value only while a nonzero drive signal is being applied. Thus, when a nonzero drive signal ends and the boost timeout threshold has not been exceeded by the accumulated boost time, the accumulated boost time may be paused at its current value until a subsequent nonzero drive signal is received. In an embodiment, the methods discussed below may replace the use of the accumulated boost time with the use of the boost duration.

In an embodiment, when the accumulated boost time reaches or exceeds a first defined time threshold, the control circuit 16/106/206 may switch from applying nonzero drive signals in the boost mode 604 to applying nonzero drive signals in the amplitude-limited mode. More specifically, the accumulated heating time may be either i) a cumulative amount of time in which the one or more nonzero drive signals in the boost mode have being applied to the haptic actuator at voltages or currents that exceed, in absolute value, the defined rated maximum voltage or current, or ii) a second time that is determined by scaling the cumulative amount of time in which the one or more drive signals in the boost mode have been applied at voltages or currents that exceed in absolute value the defined rated maximum voltage or current.

In an embodiment, the accumulated heating time may be used to set a minimum amount of time that the haptic actuator has to cool before any more nonzero drive signals can be applied in the boost mode again. In other words, the accumulated heating time may be used to determine or otherwise define a cooling time threshold (which may also be referred to as a second time threshold). Thus, the cooling time threshold may be a determined cooling time threshold (or, more generally, a determined second time threshold) that is defined in a dynamic manner. The control circuit may cause nonzero drive signals to be applied in the amplitude-limited mode until the accumulated cooling time exceeds the cooling time threshold. When the accumulated cooling time does exceed the cooling time threshold, the control circuit may reset the accumulated cooling time, the accumulated heating time, and the accumulated boost time to, e.g., zero.

Figure 17:
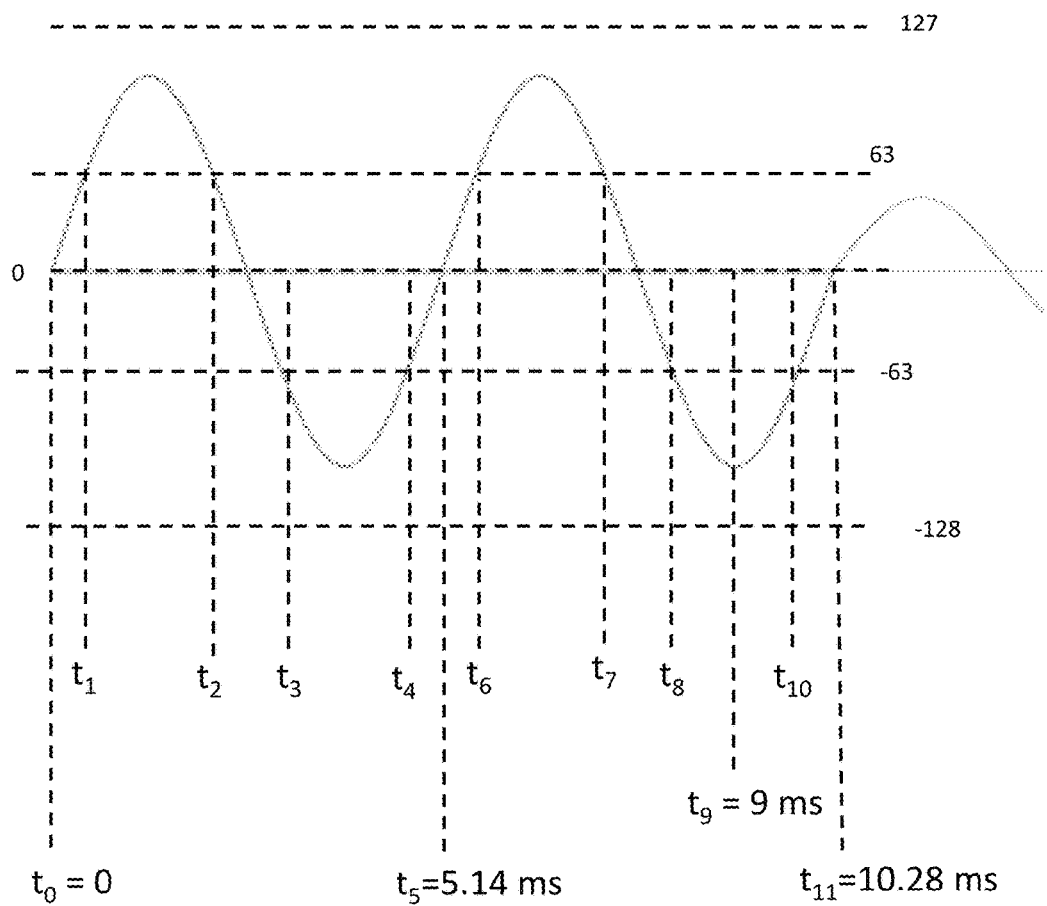
FIG. 17 illustrate an accumulated boost time and accumulated heating time for a nonzero drive signal that is applied in a boost mode, according to an embodiment hereof.

FIG. 17 generally illustrates an accumulated boost time and accumulated heating time for a sinusoidal nonzero drive signal being applied in a boost mode. More specifically, FIG. 17 depicts a sinusoidal nonzero drive signal after it has been boosted in a boost mode. As discussed above, the boost mode may refer to a mode in which signal values of a nonzero drive signal are scaled or otherwise mapped to a boosted voltage range, in which an absolute value of a maximum or minimum of the boosted voltage range exceeds a defined rated maximum voltage of a haptic actuator 18/108/208. In FIG. 3, the nonzero drive signal may have signal values that are, e.g., 8-bit digital values that are in a range of −128 to 127 (in two's complement format), wherein the digital values are dimensionless values. In one example, the haptic actuator 18/108/208 may have a defined rated maximum voltage of, e.g., 5 V. The boosted mode may, in one example map the range of digital values for the nonzero drive signal, which is from −128 to 127, to a boosted voltage range of about −10 V to 10 V. The mapping may be performed by, e.g., multiplying the digital values by 10/128 V. In this example, the digital value of 63 may be mapped to 5 V, and the digital value of −63 may be mapped to −5 V.

FIG. 17 further depicts the nonzero drive signal being driven in the boost mode from $t_0$ to $t_{11}$. In an embodiment, an accumulated boost time may track how long a nonzero drive signal (or multiple nonzero drive signals) has been applied in the boost mode. In the example of FIG. 17, the accumulated boost time may start from zero, and may increase to $t_{11}$=10.28 ms.

In an embodiment, when the accumulated boost time reaches a first defined time threshold (e.g., a boost timeout threshold of 9 ms), a control circuit 16/106/206 may begin to monitor for an earliest opportunity to exit the boost mode. The earliest opportunity may be the nonzero drive signal reaching a zero crossing point, or the accumulated boost time reaching a defined prolonged total boost time threshold, whichever happens earlier. For instance, at time $t_9$, the control circuit may begin to monitor for one of the two conditions discussed above. In an embodiment, the defined prolonged total boost time threshold may more generally be a fourth defined time threshold, which may be equal to the first defined time threshold (e.g., the boost timeout threshold) plus the third defined time threshold (e.g., the extended boost timeout threshold). In some instances, the defined prolonged total boost time threshold may more generally be the first defined time threshold plus a defined extended duration (e.g., 9 ms+3 ms extended duration=12 ms). Thus, the defined prolonged total boost time threshold may be equal to the boost timeout threshold plus a defined extended duration. In the example of FIG. 17, the earliest opportunity to exit the boost mode occurs when the nonzero drive signal reaches a zero crossing point at $t_{11}$. In another embodiment, the boost mode is exited when the accumulated boost time reaches the first defined threshold at $t_9$ or reaches the defined prolonged total boost time threshold, regardless of whether it has reached a zero crossing point.

In an embodiment, after the zero crossing point at $t_{11}$ or after the accumulated boost time reaches the defined prolonged total boost time threshold, a remaining portion of the nonzero drive signal may be applied in an amplitude-limited mode in which signal values mapped to an amplitude-limited voltage range, wherein an absolute value of a minimum of the range and an absolute value of the maximum of the range do not exceed the defined rated maximum voltage. For instance, the amplitude-limited mode may map the range of digital values of the nonzero drive signal, which is from −128 to 127, to an amplitude-limited voltage range of −5 V to 5 V, or of −4 V to 4 V.

In an embodiment, an accumulated heating time may track a total amount of time in which boosted signal values of a nonzero drive signal (or of multiple nonzero drive signals) have respective absolute values that exceed the defined rated maximum voltage. The boosted signal values may also be referred to as scaled signal values or mapped signal values. For instance, in FIG. 17 the nonzero drive signal may be scaled to be voltage values that exceed 5 V in absolute value from $t_1$ to $t_2$, then from $t_3$ to $t_4$, then from $t_6$ to $t_7$, and then from $t_8$ to $t_{10}$. Thus, in this example, the accumulated heating time may be based on a sum of $(t_2-t_1)+(t_4-t_3)+(t_7-t_6)+(t_{10}-t_8)$. The accumulated heating time may be equal to this sum, or may be a value that adjusts this sum. For instance, the accumulated heating time may be a scaled version (e.g., multiplied version) of this sum. In a more specific example, the accumulated heating time may be equal to this sum multiplied by $90°/(90°-\arcsin(V_{rated}/V_{max}))$. $V_{rated}$ may be the defined rated maximum voltage of the haptic actuator 18/108/208, while $V_{max}$ may be the absolute value of the maximum or minimum of the boosted voltage range, whichever is greater. In this example, $V_{rated}$ is 5 V, while $V_{max}$ is 10 V. In the example of FIG. 17, this multiple is equal to $90°/(90°-30°)=1.5$. The accumulated heating time in FIG. 17 may be less than the accumulated boost time, even with the scaling of 1.5. This may be because while the boost mode is mapping 127, which is the maximum value that can be represented by an 8-bit value in two's complement format, to the maximum 10 V of the boosted voltage range, the signal values of the nonzero drive signal in FIG. 17 do not actually reach 127 (rather, the maximum of the signal values is about 105). In another example, if the signal values of the nonzero drive signal do reach 127, or more generally span the full range of −128 to 127, the scaling discussed above may cause the accumulated heating time to equal to the accumulated boost time.

In any of the embodiments herein, the accumulated heating time may be replaced or supplemented with a more general measurement, which may be referred to as an accumulated heating measurement. The accumulated heating measurement may be indicative of an amount of heating of the haptic actuator. The accumulated heating measurement includes the accumulated heating time discussed above, or includes other measurable quantities, such as an area (e.g., an integral) under the boosted nonzero drive signal for the duration(s) in which its boosted signal values exceed the defined rated maximum voltage. For instance, the accumulated heating measurement may be an integral of the nonzero drive signal in FIG. 17 from $t_1$ to $t_2$, then from $t_3$ to $t_4$, then from $t_6$ to $t_7$, then from $t_8$ to $t_9$.

Figure 18:
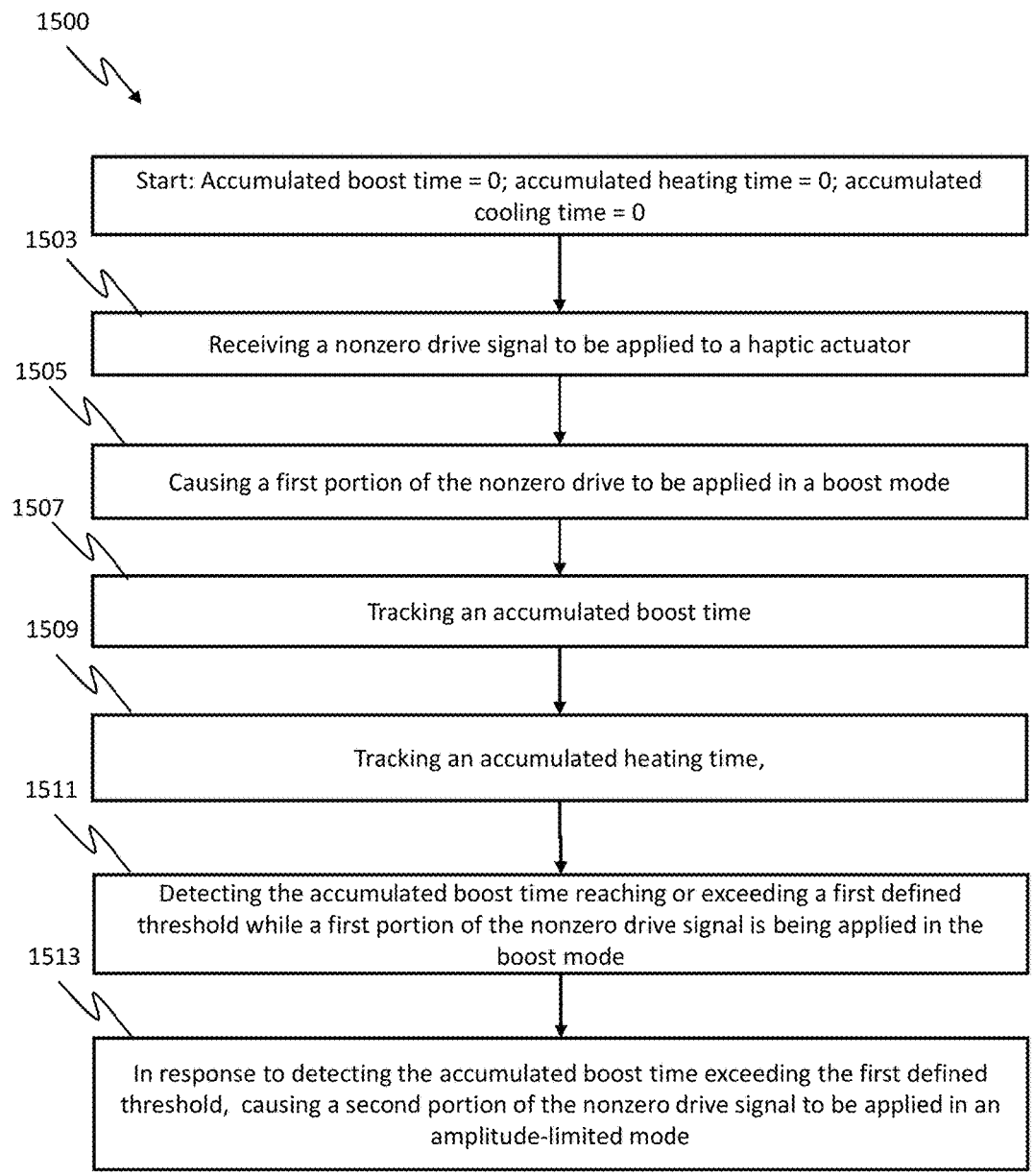
FIGS. 18-20 illustrate methods for applying various nonzero drive signals based on an accumulated boost time, an accumulated heating time, and/or an accumulated cooling time, according to embodiments hereof.

FIG. 18 illustrates a flow diagram of an example method 1500 for applying one or more nonzero drive signals. The method may be performed by, e.g., the control circuit 16/106/206. In the example method 1500, the accumulated boost time, accumulated heating time, and accumulated cooling time start at a reset value of zero. In another embodiment, the accumulated boost time, accumulated heating time, and accumulated cooling time may have respective reset values other than zero (the respective reset values may be the same, or may be different).

In an embodiment, the method 1500 may begin at step 1503, in which the control circuit 16/106/206 receives a nonzero drive signal to be applied to a haptic actuator 18/108/208, wherein the haptic actuator has a defined rated maximum voltage or a defined rated maximum current. In an embodiment, the nonzero drive signal may be received from a signal generator 102/202. In one example, the nonzero drive signal received in step 1503 may be the first nonzero drive signal 1801 of FIG. 21A, wherein the nonzero drive signal 1801 is applied as voltage signal 1811. In another example, the nonzero drive signal received in step 1503 may be the first nonzero drive signal 1901 in FIG. 21B, wherein the first nonzero drive signal 1901 is applied as voltage signal 1911.

In step 1505, the control circuit 16/106/206 may cause a first portion of the nonzero drive signal to be applied in a boost mode, in which signal values of the nonzero drive signal are scaled to a boosted voltage range or boosted current range, wherein an absolute value of a minimum value or maximum value of the boosted voltage range or boosted current range exceeds the defined rated maximum voltage or current of the haptic actuator, and wherein the nonzero drive signal is one of one or more nonzero drive signals that are applied in the boost mode. For instance, the control circuit may control an amplifier of the signal modification circuit/module 104/204 to apply the nonzero drive signal in the boost mode. In one example, step 1505 may include applying a first portion of the nonzero drive signal 1801 in the boost mode as portion 1811a of voltage signal 1801, or applying a first portion 1901a of nonzero drive signal 1901 in the boost mode as portion 1911 of voltage signal 1911. In an embodiment, the nonzero drive signal may be a latest one (i.e., latest in time) of a plurality of consecutive nonzero drive signals that were or are to be applied in the boost mode. For instance, an earlier nonzero drive signal may precede nonzero drive signal 1801, and may have also been applied in the boost mode. The plurality of consecutive nonzero drive signals may be all of the nonzero drive signals that were or are to be applied in the boost mode after the most recent reset of the accumulated boost time.

In step 1507, the control circuit 16/106/206 may track an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof. The tracking may be done on a continuous or near-continuous basis. For instance, step 1507 may include updating the accumulated boost time whenever a signal value or set of signal values are applied in the boost mode. With reference to the examples of FIGS. 21A and 21B, the accumulated boost time may increase by $\Delta t_b$ at the end of the boost mode.

The most recent reset of the accumulated boost time may have occurred at or before a beginning of the nonzero drive signal 1801 or 1901. For instance, with respect to FIG. 17, the accumulated boost time may have been reset at, e.g., 20 ms before $t_0$. Thus, the accumulated boost time may be measured from the most recent reset, or after the reset. If there is no earlier, intervening nonzero drive signal during that 20 ms, the accumulated boost time stays at its reset value during that 20 ms period. Then, when the nonzero drive signal is received at $t_0$, the accumulated boost time may begin to increase. Alternatively, if there was an earlier, intervening nonzero drive signal during that 20 ms period, the accumulated boost time may have begun increasing while the earlier, intervening nonzero drive signal was applied in the boost mode.

In step 1509, the control circuit 16/106/206 may track an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or current, or ii) a second time that is determined by scaling the cumulative amount of time in which the one or more drive signals in the boost mode have been applied at voltages or currents that exceed in absolute value the defined rated maximum voltage or current. The accumulated heating time may also be performed on a continuous or near-continuous basis. For instance, whenever a signal value or set of signal values are applied in the boost mode, as boosted or scaled signal values, step 1509 may check whether an absolute value of the boosted or scaled signal values exceed the defined rated maximum voltage. If the boosted signal values do exceed the defined rated maximum voltage in absolute value, the control circuit 16/106/206 may increase the accumulated heating time by a time period represented by the signal value or set of signal values.

In step 1511, the control circuit 16/106/206 detects the accumulated boost time reaching or exceeding a first defined time threshold. The control circuit may monitor the accumulated boost time to determine whether it has reached or exceeded a first defined time threshold. In the example method 1500, the first defined time threshold may be reached before an end of the first nonzero drive signal. With respect to the examples depicted in FIGS. 21A and 21B, the accumulated boost time may reach the first defined threshold (e.g., 9 ms) at or shortly before $t_b$. For instance, $t_b$ is equal to the first defined threshold if the nonzero drive signal 1801/1901 is at a zero crossing point at the first defined threshold. If, at the first defined threshold, the nonzero drive signal 1801/1901 is not at a zero crossing point, then $t_b$ may correspond to the nonzero drive signal 1801/1901 reaching the zero crossing point, or may equal a defined prolonged total boost time threshold (e.g., 12 ms).

Figure 21A:
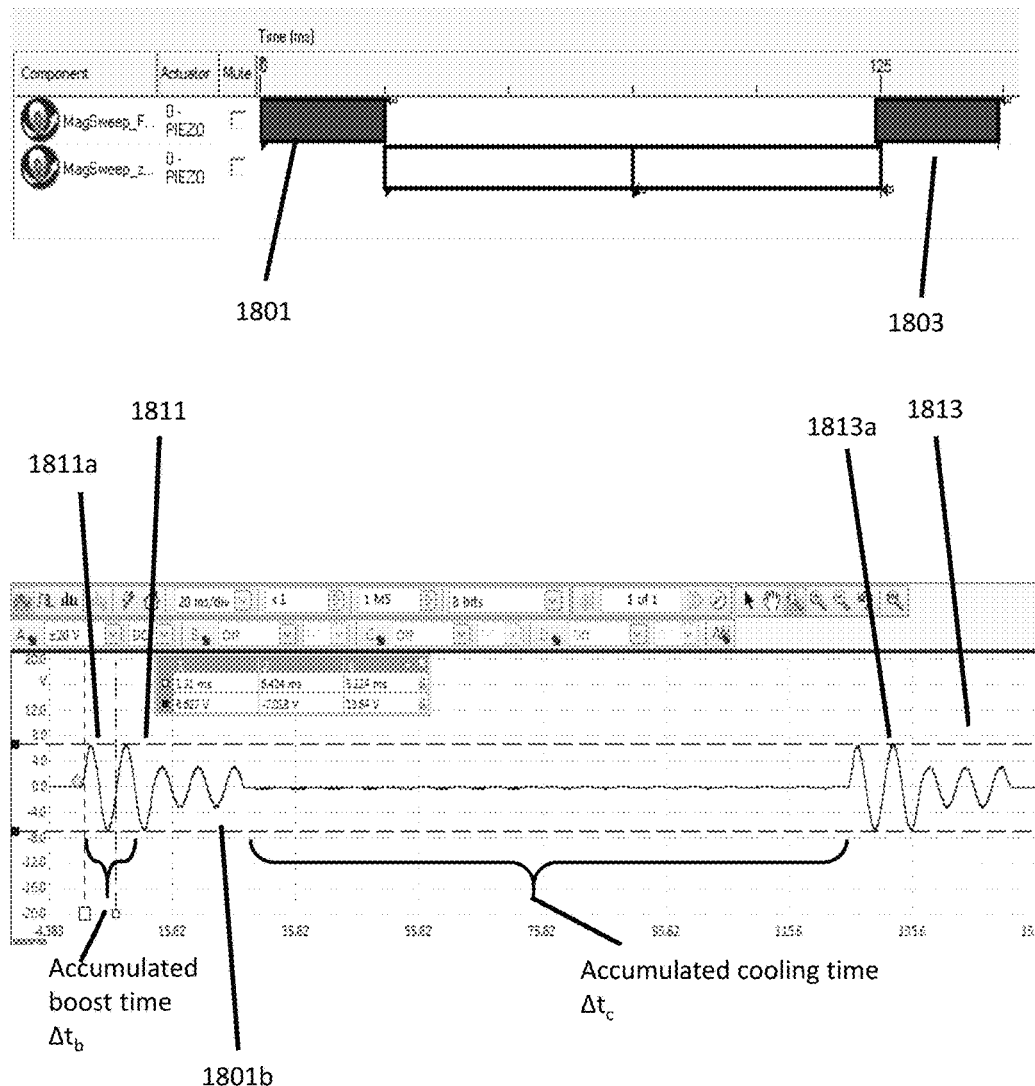
FIGS. 21A-21C illustrate applying various nonzero drive signals in a boost mode or an amplitude-limited mode, according to embodiments hereof.
Figure 21B:
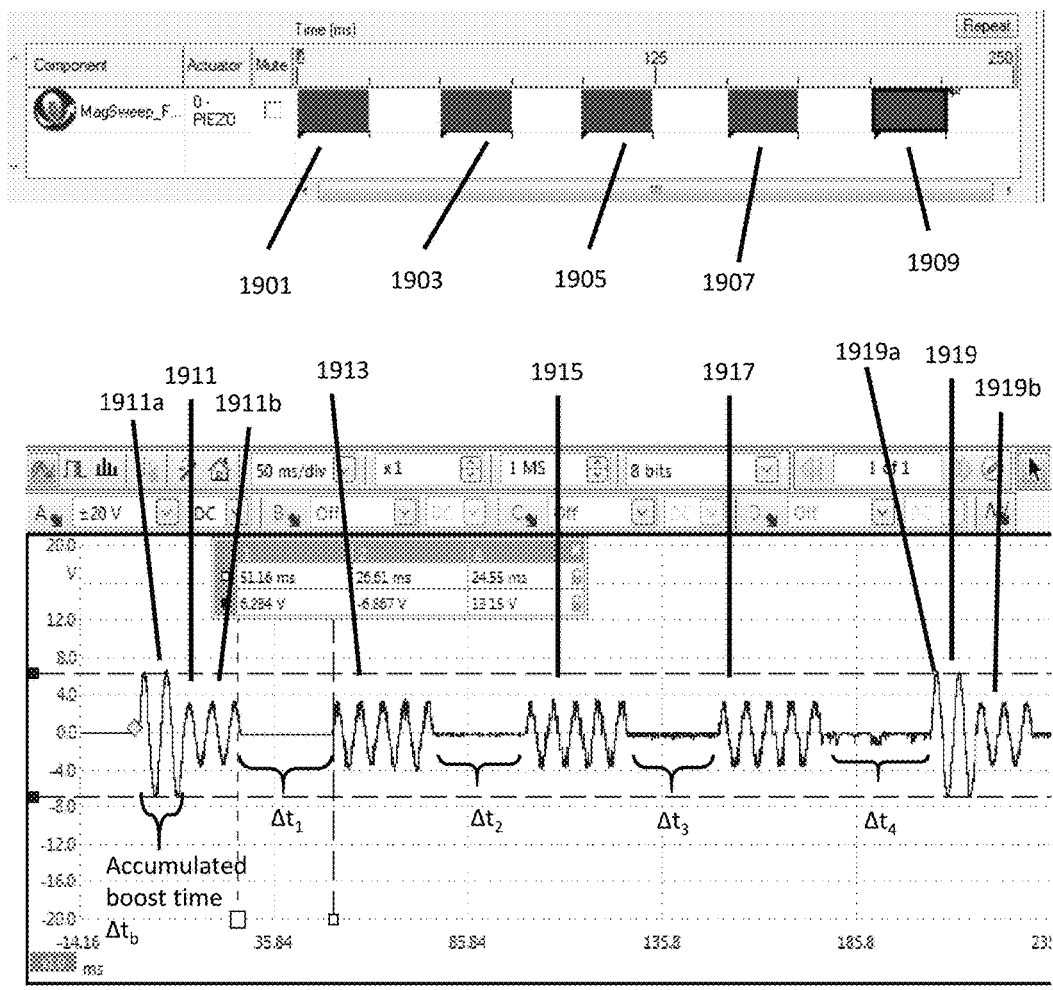

In step 1513, in response to detecting the accumulated boost time reaching or exceeding the first defined time threshold, the control circuit 16/106/206 causes a second portion of the nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or current of the haptic actuator. For example, in FIG. 21A, the second portion of nonzero drive signal 1801 may be applied as portion 1801b of voltage signal 1801. In FIG. 21B, the second portion of nonzero drive signal 1901 may be applied as portion 1901b of voltage signal 1901.

In an embodiment, the nonzero drive signal may end after the second portion of the nonzero drive signal is applied. More specifically, an end of the second portion may be an end of the nonzero drive signal. After the end of the nonzero drive signal, the control circuit 16/106/206 may experience a period in which it does not detect or otherwise receive any nonzero drive signal from the signal generator 102/202. In some cases, this period may be referred to as a cool-down period or cooling period, or as an idle period. In this period, the output of the signal generator 102/202 may be considered to be undefined (e.g., the signal generator 102/202 may set a flag indicating that it is currently not outputting any valid signal values), or may be zero, or may be value that is less than a defined noise threshold in absolute value.

Figure 19:
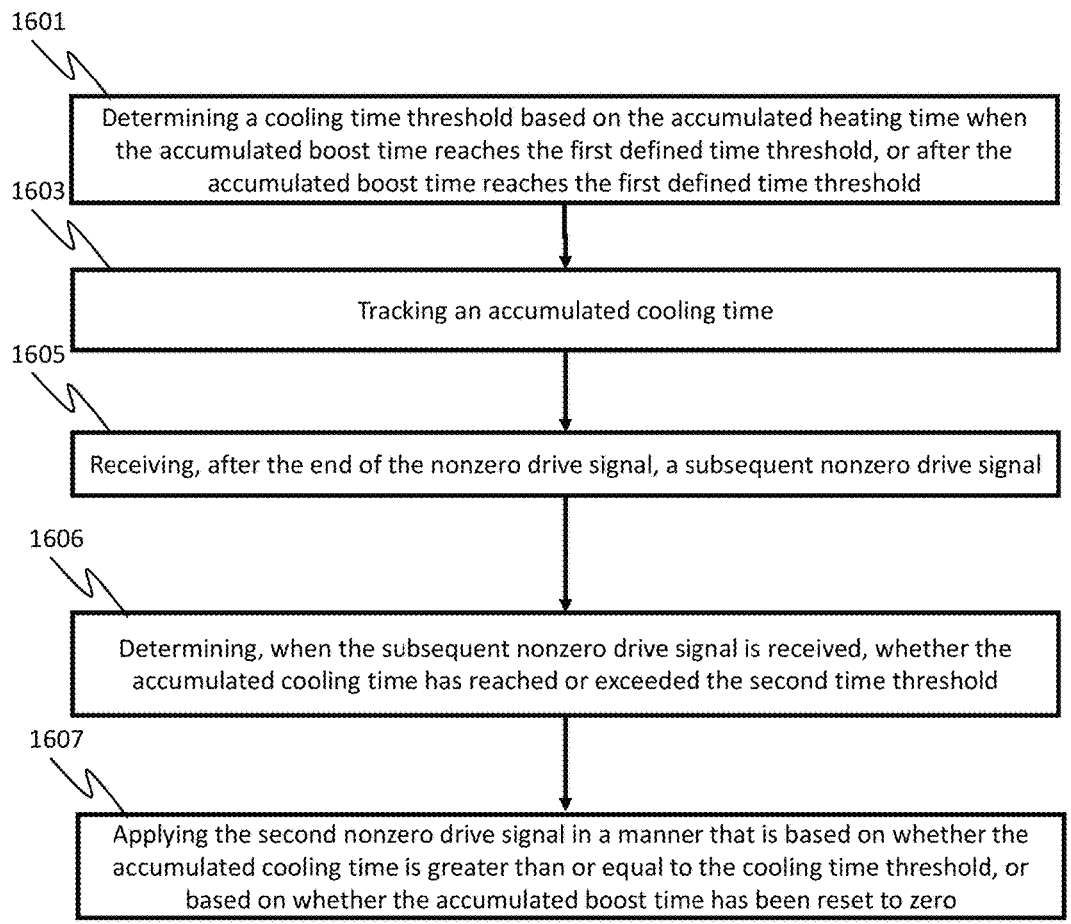

FIG. 19 illustrates steps involving tracking an amount of time in which the haptic actuator (e.g., 18/108/208) cools. More specifically, in step 1601, the control circuit 16/106/206 may determine a second time threshold, such as a cooling time threshold, based on the accumulated heating time. The cooling time threshold may later be used to determine if the haptic actuator 18/108/208 has been allowed to sufficiently cool to be able to use the boost mode again. In an embodiment, the cooling time threshold may be calculated or otherwise determined as a multiple of the current accumulated heating time (e.g. 7×current accumulated heating time). If the accumulated heating time changes over time, the resting time threshold may also change.

In an embodiment, the cooling time threshold may be calculated whenever the accumulated heating time is updated, or after a most recent update of the accumulated heating time. For instance, with reference to FIG. 17, the cooling time threshold may be calculated at or after time $t_{10}$. In a more specific example, the cooling time threshold may be calculated at an end of the nonzero drive signal, because the accumulated heating time is updated before (or at) the end of the nonzero drive signal. With reference to FIGS. 21A and 21B, the cooling time threshold may be calculated at (or before) an end of nonzero drive signal 1801 or an end of nonzero drive signal 1901.

In an embodiment, the cooling time threshold may be calculated based on the accumulated heating time when (or after) the accumulated boost time reaches the first defined threshold. With reference to FIG. 3 again, the cooling time threshold in this embodiment may be calculated at or after $t_9$. Although the accumulated heating time used to make this calculation may still increase from $t_9$ to $t_{10}$ as the control circuit 16/106/206 waits for a zero crossing point, the difference between calculating the cooling time threshold at $t_9$ versus at $t_{10}$ may be sufficiently small to not affect boost protection of the haptic actuator 18/108/208.

In step 1603, the control circuit 16/106/206 may track an accumulated cooling time, wherein the accumulated cooling time is a cumulative amount of time in which the control circuit receives no nonzero drive signal to be applied to the haptic actuator, and is measured from a most recent reset of the accumulated cooling time, or after the most recent reset thereof. With reference to FIG. 21A, the accumulated cooling time may be increased in step 1603 from zero (its reset value) to $\Delta t_c$. With reference to FIG. 7B, the accumulated cooling time may be increased in step 1603 from zero to $\Delta t_1$. In FIG. 7B, the accumulated cooling time may later increase to add $\Delta t_2$, $\Delta t_3$, etc., until it is reset. In an embodiment, after a particular nonzero drive signal ends, the accumulated cooling time is updated only at a beginning of a subsequent consecutive nonzero drive signal. In an embodiment, the accumulated cooling time is periodically updated at regular intervals (e.g., every 1 ms, the control circuit 16/106/206 determines if a nonzero drive signal has been received, and increments the accumulated cooling time by 1 ms if no nonzero drive signal has been received).

Figure 21C:
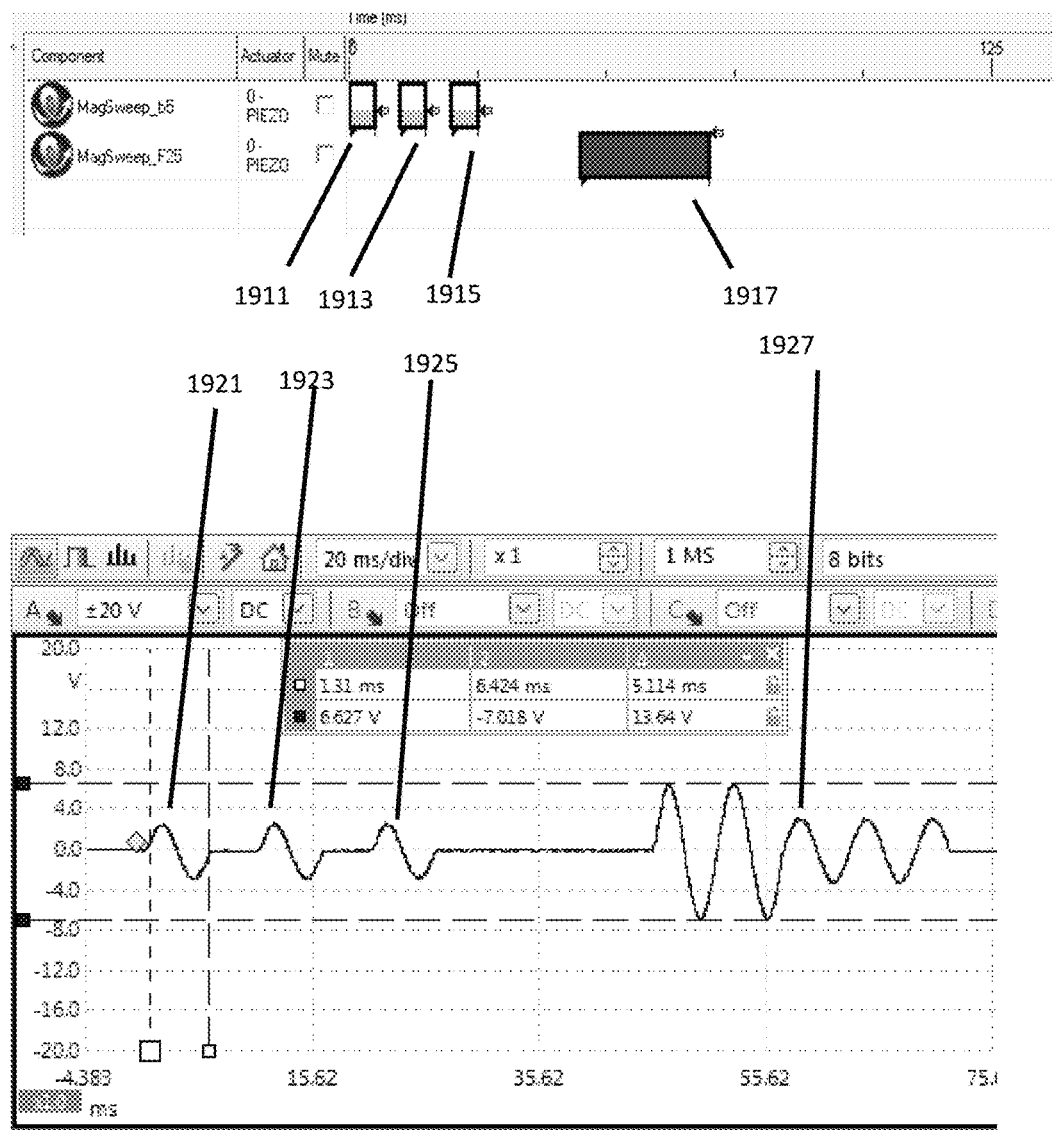

In an embodiment, step 1603 is not performed unless the accumulated heating time is more than its reset value (e.g., more than zero). For instance, the accumulated cooling time begins to be tracked only after the accumulated heating time increases from its reset value (which may be referred to as a reset heating value) to a higher value, such that the accumulated cooling time is not tracked if the accumulated heating time stays at the reset heating value (e.g., zero). For instance, with reference to FIG. 21C, the nonzero drive signals 1911, 1913, 1915 may be applied in a boost mode as voltage signals 1921, 1923, 1925. However, the signal values of the nonzero drive signals 1911-1915 may be small enough such that, even after being scaled in the boost mode to voltage signals 1921-1925, are still less than the defined rated maximum voltage of a haptic actuator 18/108/208. Thus, even though the nonzero drive signals 1911, 1913, 1915 are applied in a boost mode, the accumulated heating time remains zero at an end of the nonzero drive signal 1915. In this example, the accumulated cooling time stays the same after each of the nonzero drive signals 1911, 1913, 1915. Thus, at a beginning of the nonzero drive signal 1917 (which is applied as voltage signal 1927), the accumulated cooling time is still zero. In this situation, the determination of the cooling time threshold may still be performed in step 1601, or may be omitted. If step 1601 is omitted, the accumulated boost time may be set to be equal to the accumulated heating time, at a beginning of each of nonzero drive signals 1911, 1913, 1915, and 1917. This adjustment may result in a reset of the accumulated boost time in this situation to zero. The adjustment of the accumulated boost time based on the accumulated heating time is discussed more generally below.

In step 1605, the control circuit 16/106/206 receives, after the end of the nonzero drive signal, a subsequent nonzero drive signal. For instance, step 1605 may involve receiving nonzero drive signal 1803 or nonzero drive signal 1903 in FIG. 21A or 21B.

In step 1606, the control circuit 16/106/206 determines, when the subsequent nonzero drive signal is received, whether the accumulated cooling time has reached or exceeded the cooling time threshold.

In step 1607, the control circuit 16/106/206 applies the subsequent nonzero drive signal in a manner that is based on whether the accumulated cooling time has reached or exceeded the cooling time threshold. The control circuit may monitor the accumulated cooling time to determine whether it has reached or exceeded the cooling time threshold. In an embodiment, this determination may also or alternatively be based on whether the accumulated boost time has been reset to a reset value (or, more generally, whether the accumulated boost time is less than the first defined threshold). Step 1607 may be based on a context that the accumulated boost time has already reached the first defined threshold (which was detected in step 1513). Thus, step 1607 may determine whether the accumulated boost time has been reset to zero, rather than the more general case of whether the accumulated boost time is less than the first defined threshold. A later embodiment discusses a context in which the accumulated boost time has not reached the first defined threshold when a second nonzero drive signal is received. In that context, the control circuit 16/106/206 makes a more general determination of whether the accumulated boost time is less than the first defined threshold.

In an embodiment, the accumulated cooling time is determined in step 1607 to have not yet reached the second time threshold when the subsequent nonzero drive signal is received, and wherein the subsequent nonzero drive signal is applied in the amplitude-limited mode.

Figure 20:
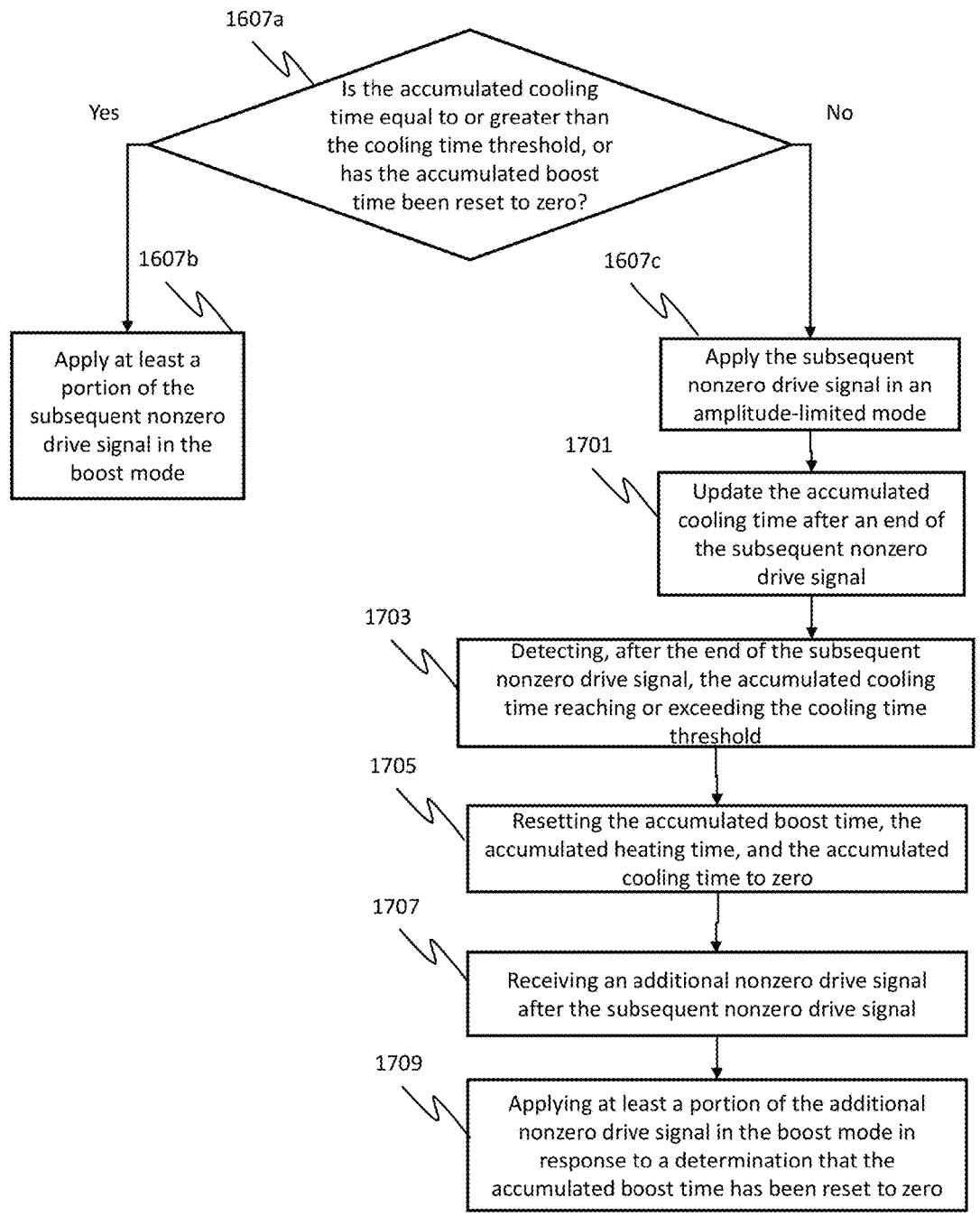

In an embodiment, the accumulated cooling time is determined to have reached or exceeded the second time threshold when the subsequent nonzero drive signal is received, and wherein at least a portion of the subsequent nonzero drive signal is applied in the boost mode. The accumulated boost time, accumulated heating time, and the accumulated cooling time may be reset in response to the accumulated cooling time has reaching or exceeding the second time threshold. For instance, FIG. 20 illustrates example substeps 1607a-1607c for performing step 1607 of FIG. 19. More specifically, in step 1607a, the control circuit 16/106/206 determines whether the accumulated cooling time is equal to or greater than the cooling time threshold. Alternatively or additionally, the control circuit 16/106/206 may directly determine whether the accumulated boost time has been reset to zero.

In step 1607b, in response to a determination that the accumulated cooling time is equal to or greater than the cooling time threshold, or that the accumulated boost time has been reset to zero, the control circuit 16/106/206 applies at least a portion of the subsequent nonzero drive signal in the boost mode. With reference to FIG. 21A, the accumulated cooling time may reach $\Delta t_c$ (e.g., 114 ms), which is greater than the cooling time threshold (e.g., 84 ms), and which may cause the accumulated cooling time to be reset. The reset may occur, for instance, when the subsequent nonzero drive signal 803 is received, or, alternatively, as soon as the accumulated cooling time reaches the cooling time threshold (if the accumulated cooling time is being updated at regular intervals). In step 1607b, a portion 1803a of the subsequent nonzero drive signal 1803 may then be applied in the boost mode as portion 1813a of voltage signal 1813.

In step 1607c, in response to a determination that the accumulated cooling time is less than the cooling time threshold, or that the accumulated boost time has exceeded the first defined time threshold but has not yet been reset, the control circuit 16/106/206 applies all of the subsequent nonzero drive signal in the amplitude-limited mode. With reference to FIG. 21B, if the subsequent nonzero drive signal is nonzero drive signal 1903, the accumulated cooling time may be at $\Delta t_1$ (e.g., 24.55 ms) when the subsequent nonzero drive signal is received. This value is less than a cooling time threshold (e.g., 84 ms). Thus, the subsequent nonzero drive signal is applied in the amplitude-limited mode.

FIG. 20 illustrates additional steps that may be performed by the control circuit 16/106/206. In step 1701, the control circuit 16/106/206 updates the accumulated cooling time after an end of the subsequent nonzero drive signal. With reference to FIG. 21B, this may be done, e.g., at a beginning of a third nonzero drive signal 1905, at a beginning of a fourth nonzero drive signal 1907, and at a beginning of a fifth nonzero drive signal 1909. At the beginning of the fifth nonzero drive signal 1909, the accumulated cooling time may be $\Delta t_1 + \Delta t_2 + \Delta t_3 + \Delta t_4$.

In step 1703, the control circuit 16/106/206 may detect, after the end of the second nonzero drive signal, the accumulated cooling time reaching or exceeding the cooling time threshold. With reference to FIG. 21B, this detection may occur, e.g., when a beginning of the nonzero drive signal 1909 is received. In this example, the control circuit 16/106/206 may determine, at a beginning of nonzero drive signal 1905, that accumulated cooling time $\Delta t_1 + \Delta t_2$ has not reached the cooling time threshold. It may further determine, at a beginning of nonzero drive signal 1907, that accumulated cooling time $\Delta t_1 + \Delta t_2 + \Delta t_3$ has not reached the cooling time threshold. Thus, the nonzero drive signals 1905 and 1907 may be applied in the amplitude-limited mode as voltage signals 1915 and 1917.

In step 1705, in response to detecting the accumulated cooling time reaching or exceeding the cooling time threshold, the control circuit 16/106/206 may reset the accumulated boost time, accumulated heating time, and accumulated cooling time to zero or some other reset value. For instance, with reference to FIG. 21B, this may occur when the control circuit 16/106/206 has received a beginning of the nonzero drive signal 1909, when the accumulated cooling time $\Delta t_1 + \Delta t_2 + \Delta t_3 + \Delta t_4$ has reached or exceeded the cooling time threshold. The resetting is performed before the nonzero drive signal 1909 is applied to the haptic actuator.

In step 1707, the control circuit 16/106/206 receives an additional nonzero drive signal after the subsequent nonzero drive signal. With reference to FIG. 21B, the additional nonzero drive signal may be nonzero drive signal 1909.

In step 1709, the control circuit 16/106/206 may apply at least a portion of the additional nonzero drive signal in the boost mode in response to a determination that the accumulated boost time has been reset to zero (or, more generally, that the accumulated boost time is less than the first defined threshold). With reference to FIG. 21B, a first portion of the nonzero drive signal 1909 may be applied in the boost mode as portion 1919a of voltage signal 1919. In an embodiment, another portion 1909b of the nonzero drive signal 1909 may be applied in the amplitude-limited mode as portion 1919b of voltage signal 1919 (e.g., after the accumulated boost time reaches the first defined time threshold).

In FIGS. 18 through 21B, after the accumulated boost time reaches or crosses the first defined threshold during signal 1801/1901, no subsequent nonzero drive signal is applied in the boost mode until the accumulated cooling time reaches or exceeds the cooling time threshold. In another embodiment, the accumulated boost time may be set (e.g., at an end of each nonzero drive signal, or at a start of each subsequent nonzero drive signal) to be equal to the accumulated heating time, or equal to the accumulated heating time minus a fraction (e.g., ⅐) of the accumulated cooling time. For instance, this step may be done at any time after step 1513 and before step 1607. In some instances, the accumulated heating time may be less than the first defined threshold, or the accumulated heating time minus the fraction of the accumulated cooling time may be less than the first defined threshold. As a result, setting the accumulated boost time to be equal to the accumulated heating time, or equal to the accumulated heating time minus a fraction of the accumulated cooling time may bring the accumulated boost time under the first defined threshold again. As a result, one or more subsequent nonzero drive signals may be applied in the boost mode for at least a portion of the respective nonzero drive signal even if the accumulated cooling time has not reached the cooling time threshold. In an embodiment, after the accumulated boost time has been set in the manner described above, the accumulated heating time and/or the accumulated cooling time may be reset to zero. In an embodiment, after the accumulated boost time has been set in the manner described above, the accumulated heating time and/or the accumulated cooling time are not reset.

Figure 22A:
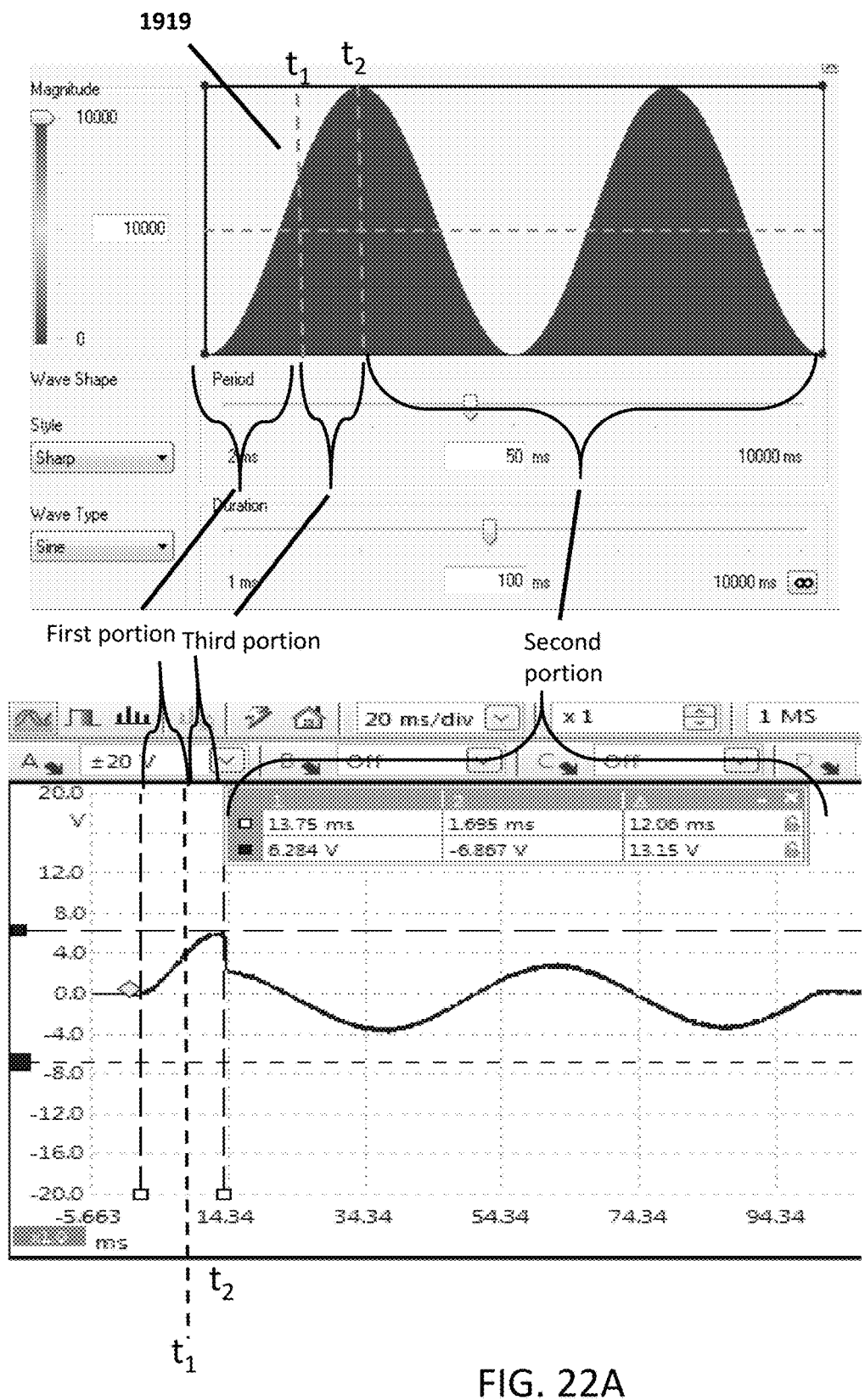
FIGS. 22A and 22B illustrate applying a nonzero drive signal until a zero crossing point is reached, or until a defined prolonged total boost time threshold has been reached, according to embodiments hereof.
Figure 22B:
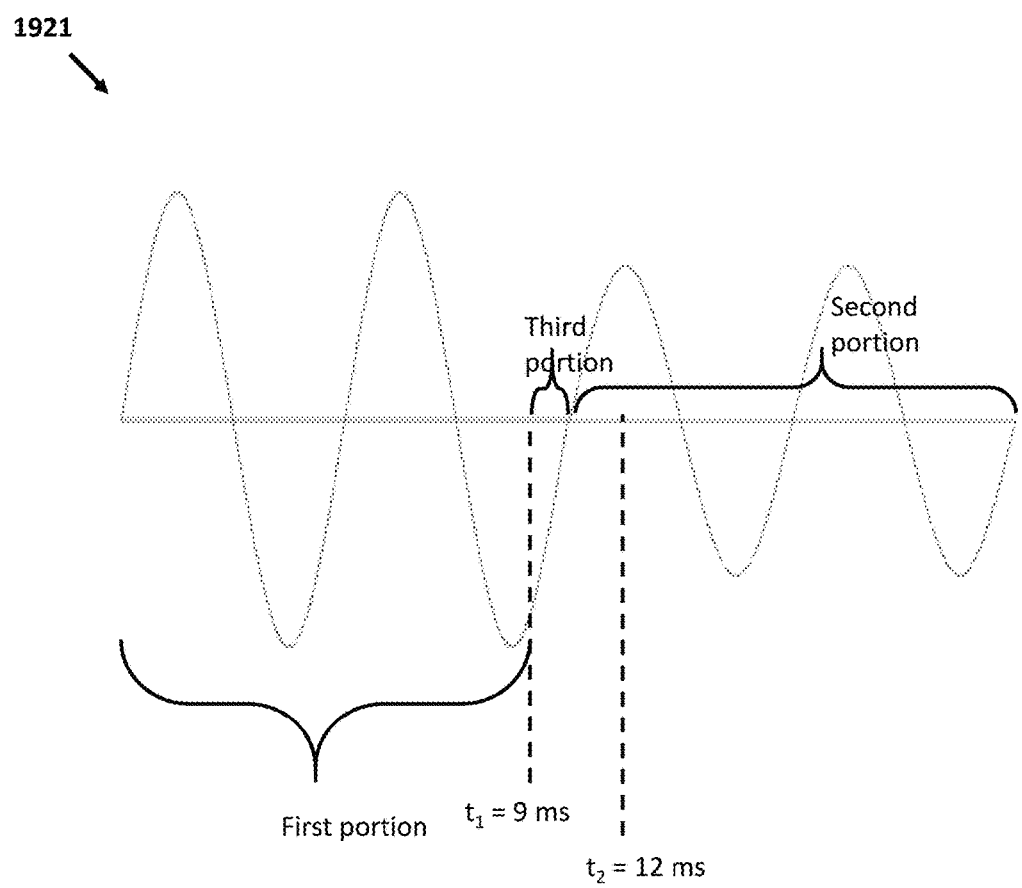

FIGS. 22A and 22B illustrate exiting of a boost mode for a nonzero drive signal. FIG. 22A depicts a situation in which an accumulated boost time reaches a first defined time threshold at time $t_1$. After the first defined time threshold is reached, the control circuit 16/106/206 may wait for a zero crossing point or for a defined prolonged total boost time threshold to be reached, whichever comes earlier. In FIG. 22A, the accumulated boost time reaches the defined prolonged total boost time threshold at time $t_2$, before a zero crossing point is reached. The nonzero drive signal 1919 is then applied in the amplitude-limited mode from time $t_2$ going forward. In this instance, a first portion of a nonzero drive signal is applied in the boost mode, which is the portion of the nonzero drive signal between a beginning thereof and $t=t_1$. A second portion of the nonzero drive signal is applied in an amplitude-limited mode, wherein the second portion is a portion that is from $t_2$ to an end of the nonzero drive signal. If $t_1$ is not at a zero crossing point, the nonzero drive signal may have a third portion that continues to be applied with a boosted voltage range. The third portion is the portion between $t_1$ and $t_2$.

In FIG. 22B, the nonzero drive signal 1921 may be similar to nonzero drive signal in FIG. 22A, except that it may first reach a zero crossing point. A first portion of the nonzero drive signal may be applied in the boost mode as the first portion of the voltage signal 1921, while a second portion is applied in the amplitude-limited mode as the second portion of the voltage signal 1921. After the first portion of the nonzero drive signal is applied, a third portion of the nonzero drive signal may be applied before transitioning to applying the second portion in the amplitude-limited mode. In this instance, the third portion of the nonzero drive signal may be a portion that is from $t_1$ to an earliest zero crossing point that follows $t_1$, and may be applied with a boosted voltage range.

Figure 23:
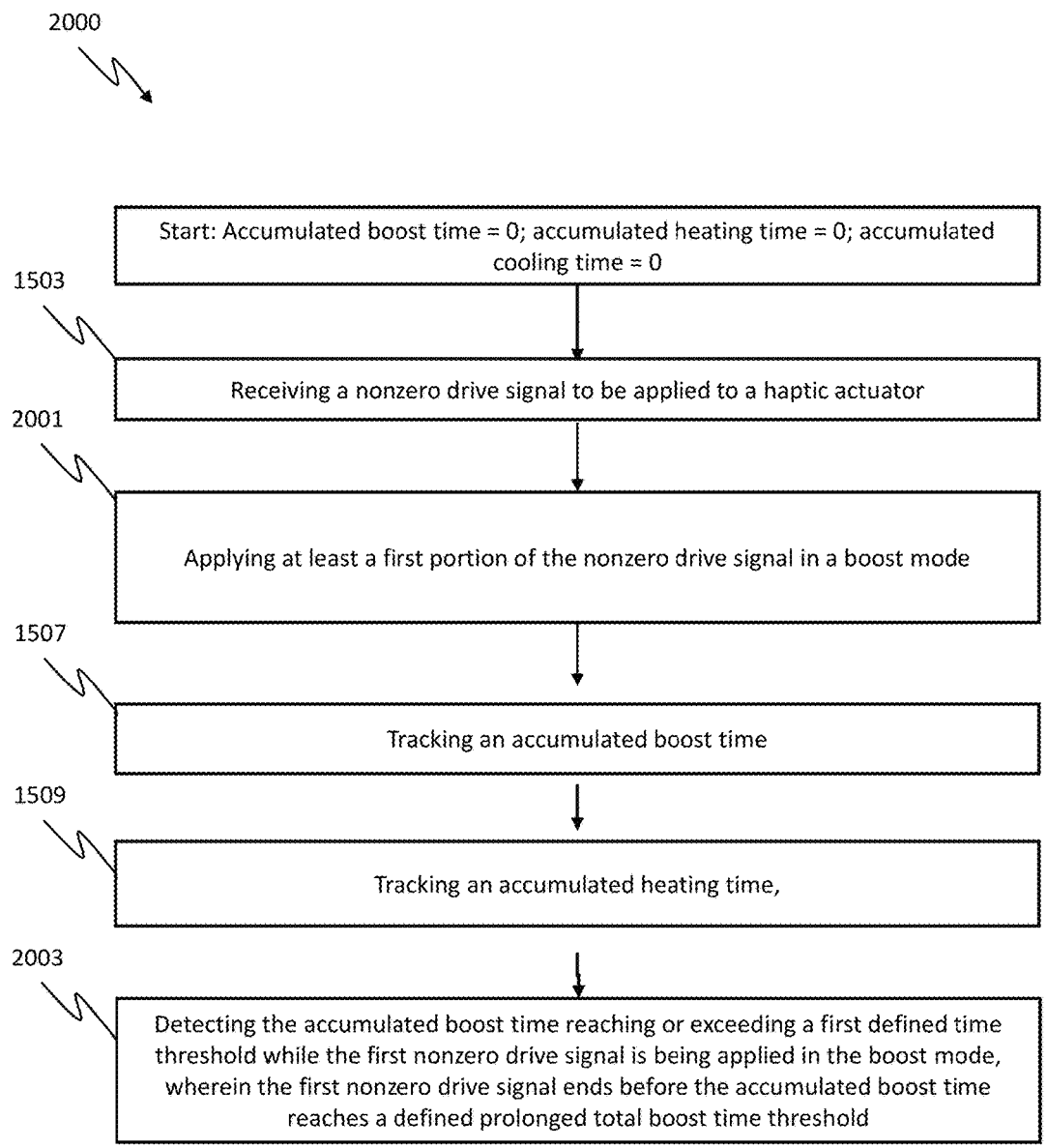
FIG. 23 illustrates a method for applying a nonzero drive signal in a boost mode, according to an embodiment hereof.
Figure 24A:
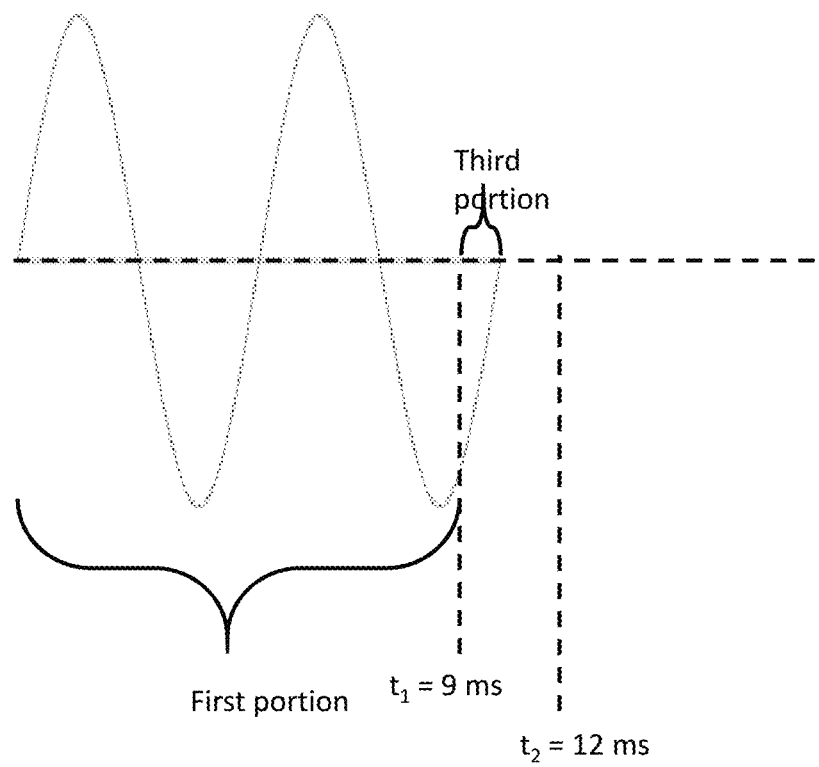
FIG. 24A illustrates a nonzero drive signal that is applied in the boost mode, according to an embodiment hereof.

FIG. 23 illustrates a method 2000 that covers a situation in which all of a first nonzero drive signal is applied in the boost mode, and in which no portion is applied in an amplitude-limited mode, even when the accumulated boost time reaches the first defined threshold. The method 2000 covers a situation depicted in FIG. 24A, in which a nonzero drive signal reaches the first defined threshold at time $t_1$, but ends shortly thereafter. Thus, there is no remaining portion to apply in the amplitude-limited mode. Method 2000 also includes steps 1503, 1507, and 1509 from FIG. 18. The method also includes steps 2001 and 2003.

In step 2001, the control circuit 16/106/206 applies at least a first portion of the nonzero drive signal in a boost mode. In step 2003, the accumulated boost time reaches or exceeds the first defined time threshold while the nonzero drive signal is being applied in the boost mode, wherein the first nonzero drive signal ends before the accumulated boost time reaches a defined prolonged total boost time threshold.

Figure 24B:
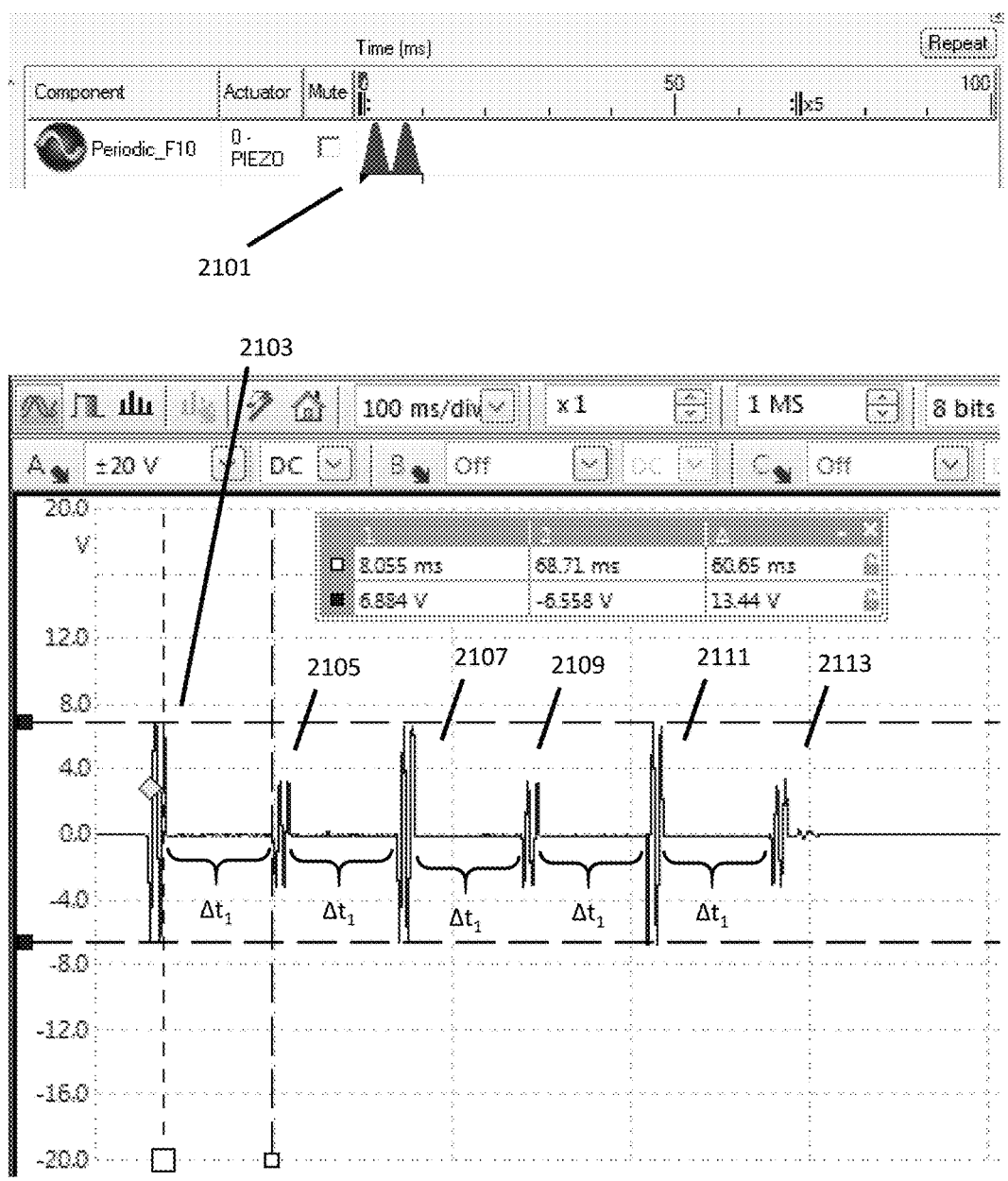
FIG. 24B illustrates nonzero drive signals that are applied in the boost mode or the amplitude-limited mode, according to an embodiment hereof.

FIG. 24B illustrates a nonzero drive signal 2101 that may be repeated every 60.65 ms. In other words, the nonzero drive signal 2101 may be used as a template to create nonzero drive signals that are then applied as voltage signals 2103, 2105, 2107, 2109, 2111, and 2113. In an embodiment, the voltage signal 2103 be a nonzero drive signal that is applied in a boost mode. While the voltage signal 2103 is applied in the boost mode, the accumulated boost time may reach the first defined time threshold. In an embodiment, the nonzero drive signal may be like that in FIG. 24A, in which the first defined time threshold may be 9 ms, and the defined prolonged total boost time threshold may be 12 ms. Because the nonzero drive signal in FIG. 24A ends before t=12 ms, all of the nonzero drive signal is applied in the boost mode, and none of the nonzero drive signal is applied in the amplitude-limited mode.

In an embodiment, after the first nonzero voltage signal in FIG. 24B is applied as voltage signal 2103 in the boost mode, a cooling time threshold may be calculated (e.g., 63 ms). When a beginning of a second nonzero drive signal is received, the accumulated cooling time (e.g., 60.65 ms) is less than the cooling time threshold. Thus, no reset of the accumulated boost time, accumulated heating time, and accumulated cooling time is performed. Thus, at a start of the second nonzero drive signal, the accumulated boost time is determined to be still at or higher than the first defined time threshold. Based on such a determination, all of second nonzero drive signal is applied in an amplitude-limited mode as voltage signal 2105. In an embodiment, after an end of the second nonzero drive signal, the cooling time threshold is not updated, because the accumulated heating time has not changed since the first nonzero drive signal ended.

In an embodiment, when a beginning of the third nonzero drive signal in FIG. 24B is received, the accumulated cooling time may be 121.3 ms, which exceeds the cooling time threshold. As a result, the accumulated cooling time, accumulated heating time, and accumulated boost time are reset to zero. Because the accumulated boost time is now zero (and thus less than the first defined time threshold), the third nonzero drive signal may be applied in the boost mode as voltage signal 2107. The above steps may repeat for the fourth, fifth, and sixth nonzero drive signals in order to apply them as voltage signals 2109, 2111, and 2113, respectively.

Figure 25:
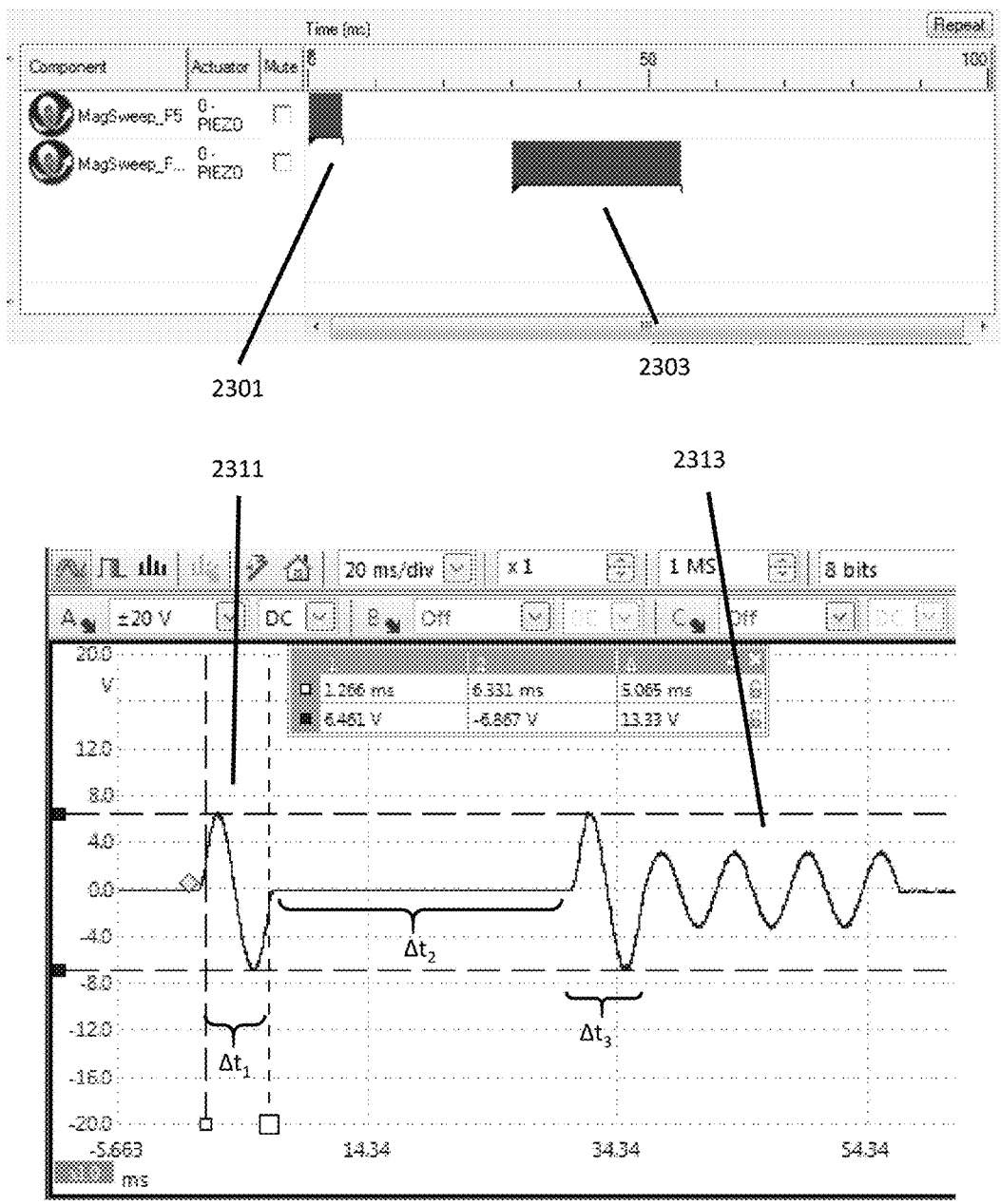
FIGS. 25 and 26 illustrate nonzero drive signals that are applied in the boost mode or the amplitude-limited mode, according to an embodiment hereof.
Figure 26:
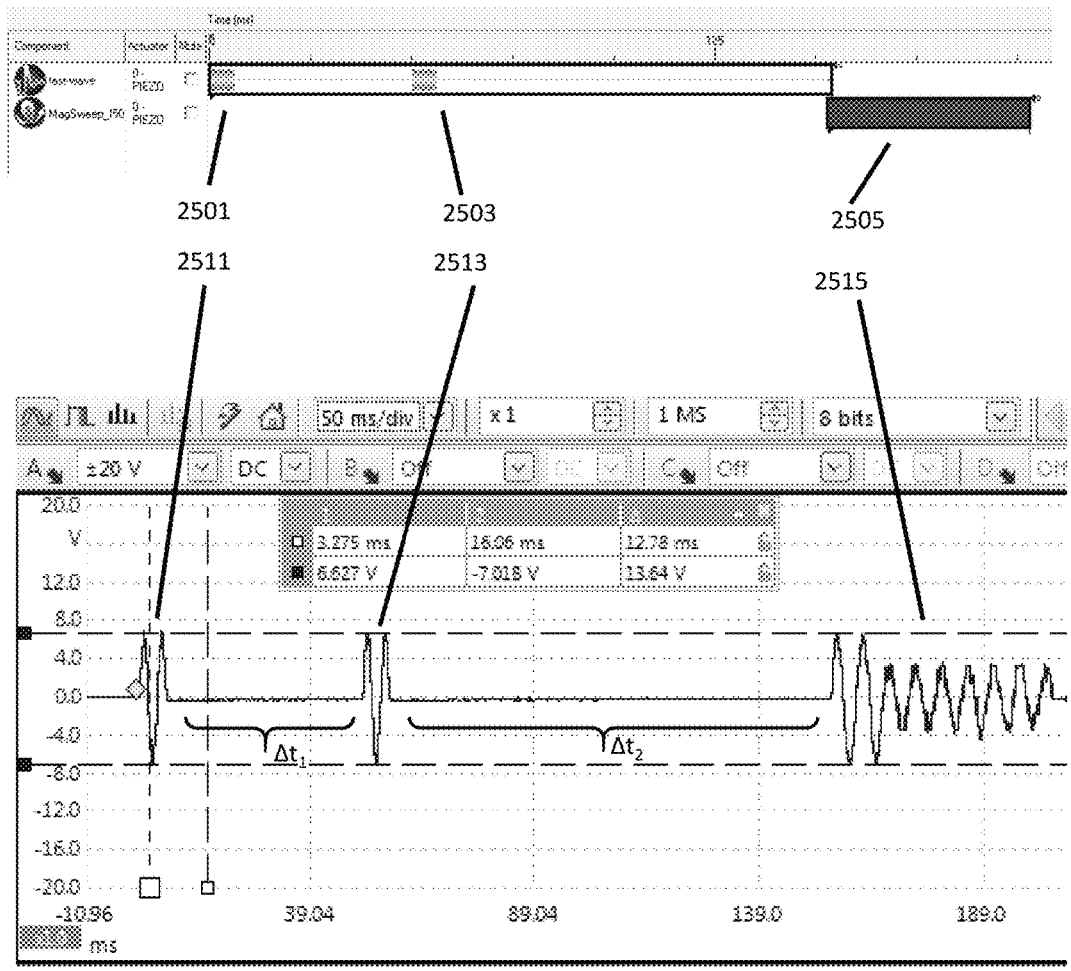

In an embodiment, as stated above, a nonzero drive signal may finish before the accumulated boost time can reach the first defined time threshold. In such an embodiment, multiple nonzero drive signals can be applied in the boost mode, and the accumulated boost mode may be tracked across multiple nonzero drive signals. In some instances, it may be adjusted based on the accumulated heating time. For instance, with reference to FIG. 25, the nonzero drive signal 2301 may be applied in the boost mode as voltage signal 2311. When the nonzero drive signal 2301 ends, the accumulated boost time may be $\Delta t_1$ (e.g., 5 ms), which may be less than the first defined time threshold (e.g., 9 ms). Thus, at least a portion of the nonzero voltage signal 2303 may be applied in the boost mode, as voltage signal 2313. The nonzero drive signal 2303 may be applied in the boost mode for a duration of $\Delta t_3$, or 4 ms, until the threshold of 9 ms is reached. At that point the accumulated boost time is $\Delta t_1 + \Delta t_3$. The boost mode may then be exited at an earliest zero crossing point, or until the accumulated boost time reaches the defined prolonged total boost time threshold.

As stated above, the accumulated boost time may be adjusted at a beginning of a nonzero drive signal. For instance, the accumulated boost time may be set to be equal to the accumulated heating, after which the nonzero drive signal is applied in a boost mode. In an embodiment, the accumulated boost time is set to be equal to the accumulated heating time minus a fraction (e.g., 1/7) of the accumulated cooling time.

In an embodiment, at least a portion of a nonzero drive signal may be applied in the boost mode because the accumulated cooling time has reached or exceeded a second defined time threshold. For instance, FIG. 16 illustrates a first nonzero drive signal 2501 being applied in a boost mode as voltage signal 2511, and being followed by a cool-down period of $\Delta t_1$. At a beginning of receiving a second nonzero drive signal 2503, $\Delta t_1$ may be, e.g. 40 ms, which exceeds a cooling time threshold (e.g., 7×accumulated heating time of 5 ms=35 m). Thus, the second nonzero drive signal 2503 is applied in the boost mode as voltage signal 2513. Similarly, at a beginning of a third nonzero drive signal 2505, the accumulated cooling time is $\Delta t_2$, which is also greater than the cooling time threshold (which may also equal 35 ms), thus triggering another reset of the accumulated times, allowing the nonzero drive signal 2505 to be applied in the boost mode as voltage signal 2515.

Figure 27A:
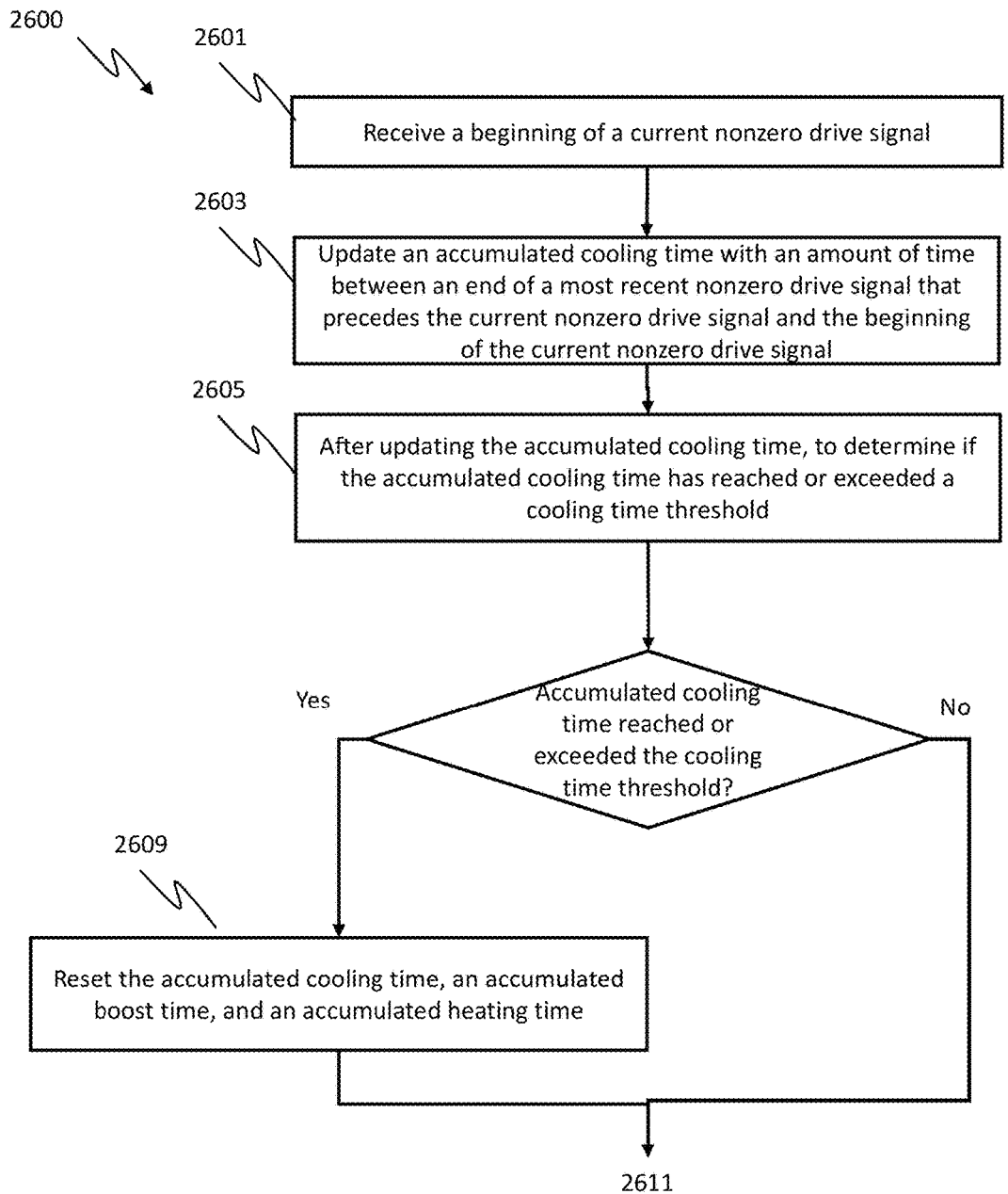
FIGS. 27A and 27B illustrate a method for applying a nonzero drive signal based on an accumulated boost time, an accumulated heating time, and/or an accumulated cooling time, according to an embodiment hereof.
Figure 27B:
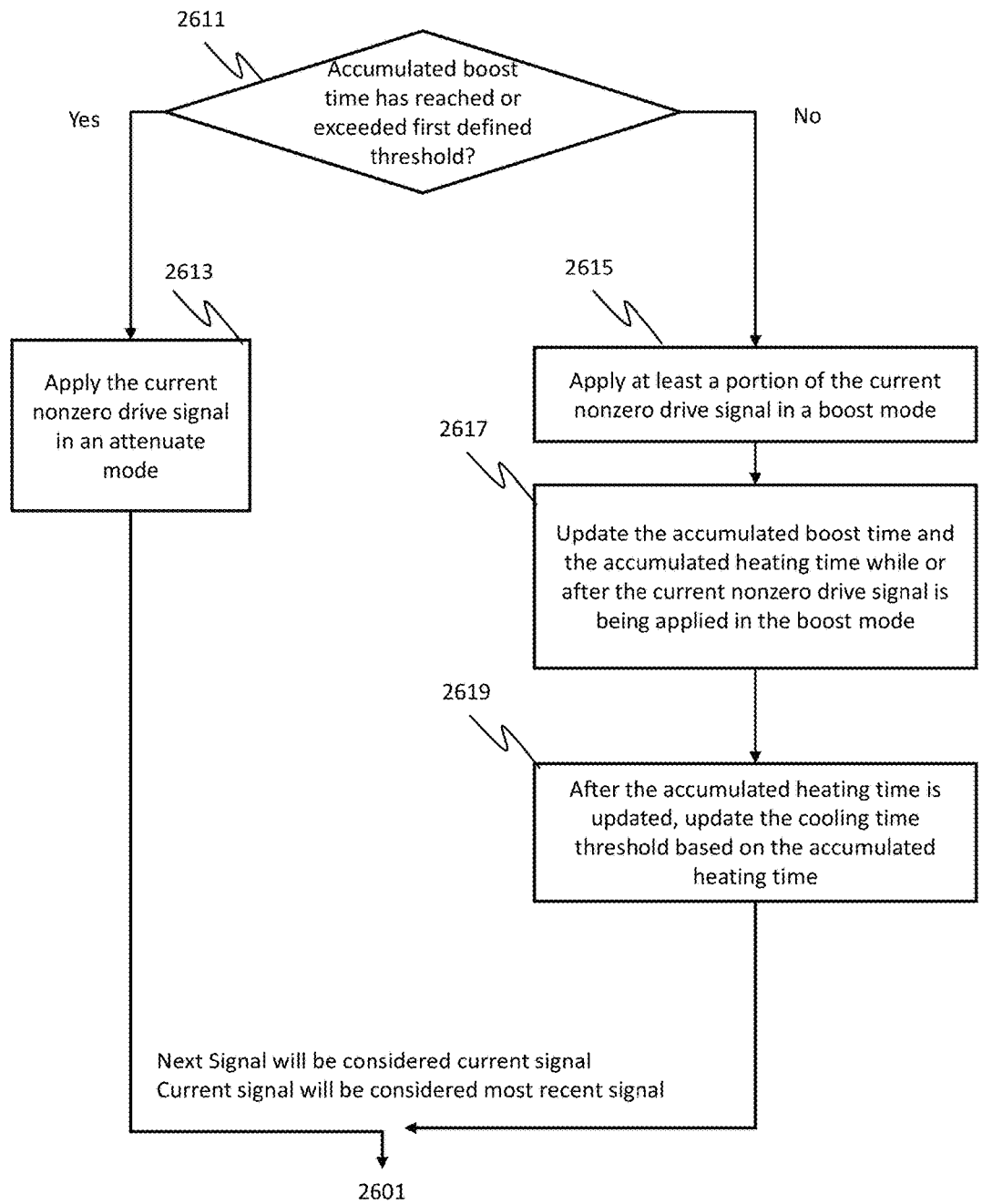

FIGS. 27A and 27B provides a flow diagram that illustrates a method 2600 of applying nonzero drive signals in an iterative manner. In step 2601, a control circuit 16/106/206 receives a beginning of a current nonzero drive signal. With reference to, e.g., FIG. 21A or 21B, the current nonzero drive signal is nonzero drive signal 1803 or 1903 at a particular instance in time.

In step 2603, the control circuit updates an accumulated cooling time with an amount of time between an end time of a most recent nonzero drive signal that precedes the current nonzero drive signal (also referred to as a most recent preceding nonzero drive signal) and the beginning of the current nonzero drive signal. With reference to FIG. 21A, this step may involve adding $\Delta t_c$ to the accumulated cooling time. With reference to FIG. 21B, this step may involve adding $\Delta t_1$ to the accumulated cooling time.

In step 2605, after updating the accumulated cooling time, the control circuit 16/106/206 determines if the accumulated cooling time has reached or exceeded a cooling time threshold. In step 2609, in response to a determination that the accumulated cooling time has reached or exceeded the cooling time threshold, the control circuit 16/106/206 resets the accumulated cooling time, the accumulated boost time, and the accumulated heating time.

In step 2611, the control circuit 16/106/206 determines if the accumulated boost time has reached or exceeded a first defined time threshold.

In step 2613, in response to a determination that the accumulated boost time has reached or does exceed the first defined time threshold, the control circuit 16/106/206 applies the current nonzero drive signal in an amplitude-limited mode. With reference to FIG. 21B, the current nonzero drive signal 1903 is applied in the amplitude-limited mode because the accumulated boost time is equal to or greater than the first defined time threshold.

In step 2615, in response to a determination that the accumulated boost time is less than the first defined time threshold, the control circuit 16/106/206 applies at least a portion of the current nonzero drive signal in a boost mode. With reference to FIG. 21A, the current nonzero drive signal 1803 is applied in the boost mode because the accumulated boost time has been reset to zero, and is thus less than the first defined time threshold.

In step 2617, the control circuit 16/106/206 updates the accumulated boost time and the accumulated heating time while or after the current nonzero drive signal is being applied in the boost mode.

In step 2619, after the accumulated heating time has been updated, the control circuit 16/106/206 updates the cooling time threshold based on the accumulated heating time. In an embodiment, the accumulated boost time may also be set to be equal to the accumulated heating time (or the accumulated heating time minus a fraction of the accumulated cooling time). This may be done in step 2619, or after step 2619. In some cases, if the accumulated boost time is set to be equal to the accumulated heating time (or the accumulated heating time minus a fraction of the accumulated cooling time), the accumulated heating time and/or the accumulated cooling time may afterwards be reset to zero (or some other reset value). As discussed above, after a nonzero drive signal (e.g., the current nonzero drive signal) is applied in the boost mode, the accumulated heating time may be less than the accumulated boost time in some instances. In such instances, if the accumulated boost time had reached (or exceeded) the first defined time threshold, setting the accumulated boost time to be equal to the accumulated heating time (or the accumulated heating time minus a fraction of the accumulated cooling time) may bring the accumulated boost time under the first defined threshold again. This may allow the next nonzero drive signal to be applied in the boost mode for at least a portion thereof (e.g., until an earliest zero crossing is reached).

After step 2619 the method may return to step 2601, and the current nonzero drive signal (e.g., 1803 or 1903) may now be designated as a most recent preceding nonzero drive signal. When a next successive nonzero drive signal (e.g., 1905 in FIG. 21B) is received at a later time, it may be designated at that time as the current nonzero drive signal.

In an embodiment, the accumulated boost time and the accumulated heating time are measured from an earliest nonzero drive signal (e.g., 1801 or 1901) that is i) after a most recent reset of the accumulated boost time and the accumulated heating time and ii) applied in the boost mode. In an embodiment, the accumulated cooling time is measured from an end of the earliest nonzero drive signal (e.g., 1801 or 1901) that follows the most recent reset of the accumulated boost time and the accumulated heating time.

Figure 28A:
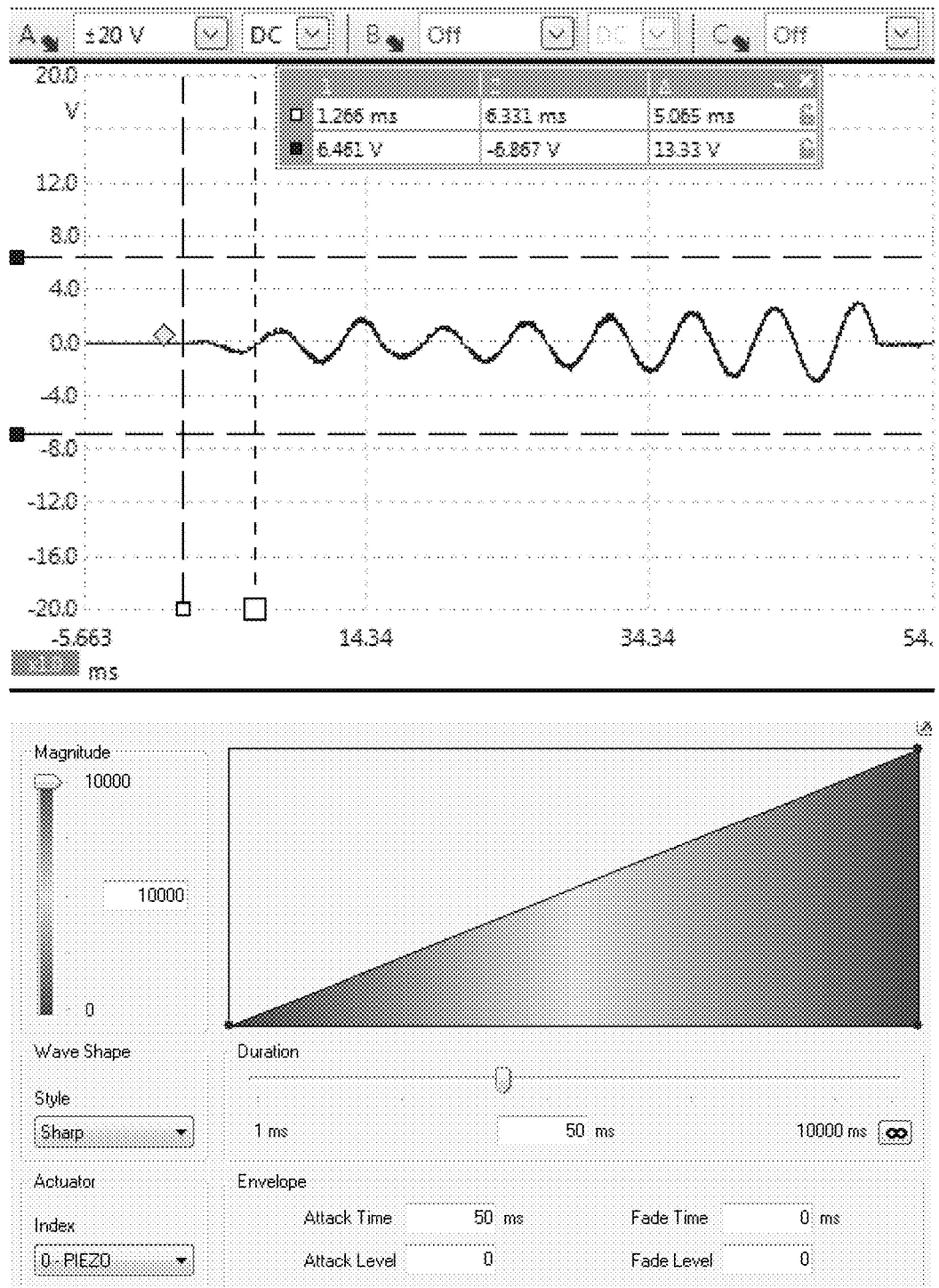
FIGS. 28A and 28B illustrate nonzero drive signals having a ramp-up portion and/or a ramp-down portion, according to embodiments hereof.
Figure 28B:
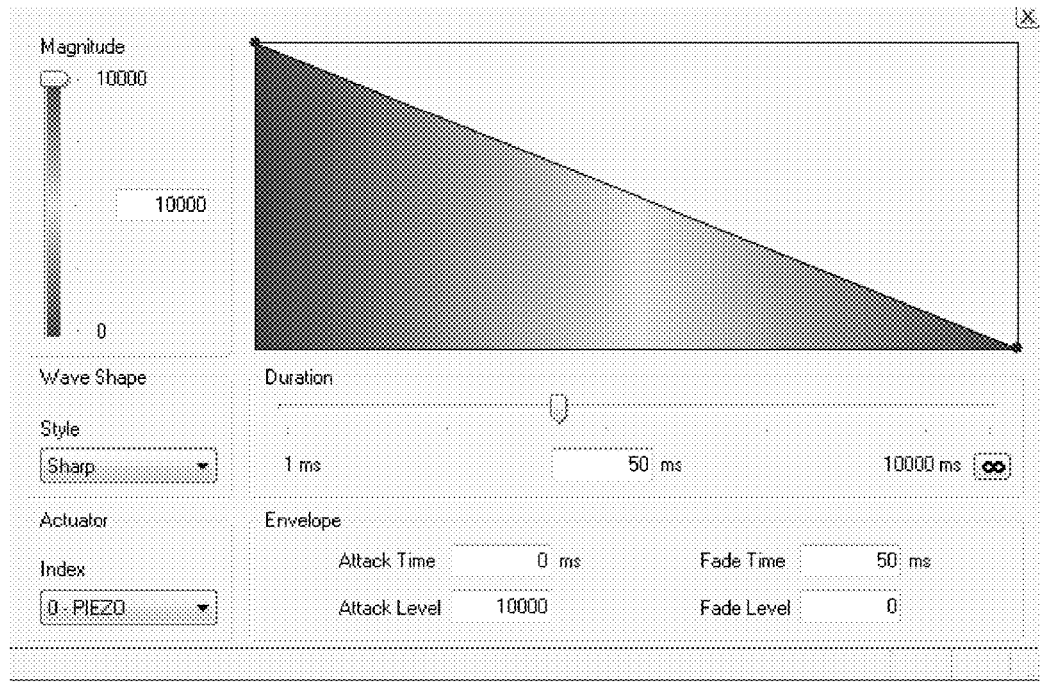

FIG. 28A illustrates a ramp-up portion of a nonzero drive signal. In an embodiment, a ramp-up portion is also boosted if the accumulated boost time is less than the first defined threshold. FIG. 28B illustrates a ramp-down portion of a nonzero drive signal. In an embodiment, the ramp-down portion may be boosted if the accumulated boost time is less than the first defined time threshold.

In an embodiment, the step of tracking the accumulated boost time may be omitted. Such an embodiment may track the accumulated heating time, and detect whether the accumulated heating time exceeds the first defined time threshold. If the accumulated heating time has not exceeded the first defined time threshold, the control circuit 16/106/206 may apply a nonzero drive signal in the boost mode. If the accumulated heating time has exceeded or reached the first defined time threshold, the control circuit 16/106/206 may apply the nonzero drive signal in the amplitude-limited mode. Such an embodiment may still use the accumulated heating time to determine the second time threshold (e.g., cooling time threshold), or may define the second time threshold as always being a multiple of the first defined time threshold (e.g., 7 times the first defined time threshold).

Additional discussion of various embodiments of the present disclosure is provided below.

Embodiment 1 relates to a method of applying one or more nonzero drive signals to a haptic actuator. The method comprises receiving, by a control circuit, a nonzero drive signal to be used by the haptic actuator to generate a haptic effect, wherein the haptic actuator has a defined rated maximum voltage or a defined maximum rated current. The method further comprises causing, by the control circuit, a first portion of the nonzero drive signal to be applied to the haptic actuator in a boost mode, in which the first portion of the nonzero drive signal is scaled to a boosted voltage range or boosted current range, wherein an absolute value of a minimum value or maximum value of the boosted voltage range or boosted current range exceeds the defined rated maximum voltage or the defined rated maximum current of the haptic actuator. The control circuit detects a boost duration exceeding a first defined time threshold, wherein the boost duration is a duration since a start time of the boost mode. In response to detecting the boost duration exceeding the first defined time threshold, the control circuit causes a second portion of the nonzero drive signal to be applied to the haptic actuator in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

Embodiment 2 includes the method of embodiment 1, wherein detecting the nonzero drive signal comprises detecting a beginning of the nonzero drive signal, and wherein the start time of the boost mode is the beginning of the nonzero drive signal.

Embodiment 3 includes the method of embodiment 1 or 2, further comprising determining that a cool-down duration, which is a duration from an end of a previous nonzero drive signal to the beginning of the nonzero drive signal, exceeds a second defined time threshold, wherein the previous nonzero drive signal and the nonzero drive signal are consecutive nonzero drive signals.

Embodiment 4 includes the method of embodiment 1, wherein the nonzero drive signal is a latest one of a plurality of consecutive nonzero drive signals that are applied in the boost mode, wherein the start time of the boost mode is a beginning of an earliest one of the plurality of consecutive nonzero drive signals, and wherein each nonzero drive signal of the plurality of consecutive nonzero drive signals is applied in the boost mode only in response to a determination that a duration from the start time of the boost mode to the beginning of the respective nonzero drive signal has not exceeded the first defined time threshold.

Embodiment 5 includes the method of any one of embodiments 1-4, wherein the nonzero drive signal is detected from an output of a signal generator in communication with the control circuit.

Embodiment 6 includes method of any one of embodiments 1-5, further comprising: detecting, after an end of the nonzero drive signal, a subsequent nonzero drive signal to be applied to the haptic actuator; determining that a cool-down duration, which is a duration between a beginning of the subsequent nonzero drive signal and an end of a previous consecutive nonzero drive signal, does not exceed a second defined time threshold, wherein the previous nonzero drive signal and the subsequent nonzero drive signal are consecutive nonzero drive signals; and in response to determining that the cool-down duration does not exceed the second defined time threshold, causing all of the subsequent nonzero drive signal to be applied in the amplitude-limited mode.

Embodiment 7 includes the method of any one of embodiments 1-5, further comprising: detecting, after an end of the nonzero drive signal, a subsequent nonzero drive signal to be applied to the haptic actuator; determining that a cool-down duration, which is a duration between a beginning of the subsequent nonzero drive signal and an end of a previous consecutive nonzero drive signal, exceeds a second defined time threshold, wherein the previous nonzero drive signal and the subsequent nonzero drive signal are consecutive nonzero drive signals; and in response to determining that the cool-down duration exceeds the second defined time threshold, causing at least a portion of the subsequent nonzero drive signal to be applied in the boost mode.

Embodiment 8 includes the method of embodiment 7, further comprising: updating the start time of the boost mode to be the beginning of the subsequent nonzero drive signal, such that the start time is an updated start time of the boost mode, wherein the subsequent nonzero drive signal is applied in the boost mode until an end of the subsequent nonzero drive signal, or until a second boost duration exceeds the first defined time threshold, the second boost duration being a duration since the updated start time of the boost mode.

Embodiment 9 includes the method of any one of embodiments 1-7, wherein the nonzero drive signal is a periodic signal alternating between positive and negative polarity, the method further comprising: when the boost duration exceeds the first defined time threshold, determining that the nonzero drive signal is currently not at a zero crossing point; in response to a determination that the nonzero drive signal is not at the zero crossing point, applying the nonzero drive signal in an extended boost mode in which the nonzero drive signal continues to be scaled to the boosted voltage range or boosted current range; while the nonzero drive signal is being applied in the extended boost mode, detecting at least one of: i) the nonzero drive signal reaching the zero crossing point, or ii) an extended boost mode duration exceeding an third defined time threshold, wherein the extended boost mode duration is a duration since detecting the boost duration exceeding the first defined threshold, wherein, in response to detecting the at least one of the nonzero drive signal reaching the zero crossing point or the extended boost mode duration exceeding the third defined time threshold, the second portion of the nonzero drive signal begins to be applied in the amplitude-limited mode.

Embodiment 10 relates to a method of applying one or more nonzero drive signals to a haptic actuator, the method comprising: receiving, by a control circuit, a nonzero drive signal to be applied to the haptic actuator, wherein the haptic actuator has a defined rated maximum voltage or a defined rated maximum current. The control circuit further causes the nonzero drive signal to be applied to the haptic actuator in a boost mode, in which the nonzero drive signal is scaled to a boosted voltage range or boosted current range, wherein an absolute value of a minimum value or maximum value of the boosted voltage range or boosted current range exceeds the defined rated maximum voltage or defined rated maximum current of the haptic actuator. The method further comprises detecting, after an end of the nonzero drive signal, a boost duration exceeding a first defined time threshold, wherein the boost duration is a duration since a start time of the boost mode; and detecting, after the end of the nonzero drive signal, a subsequent nonzero drive signal to be applied to the haptic actuator, wherein the nonzero drive signal and the subsequent nonzero drive signal are consecutive nonzero drive signals. The control circuit further causes the subsequent nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

Further, embodiment 10 can be combined with any one of the features recited in embodiments 2-5 and 9.

Embodiment 11 includes the method of embodiment 10, wherein the subsequent nonzero drive signal is applied in the amplitude-limited mode only in response to a determination that a cool-down duration, which is a duration between the end of the nonzero drive signal and a beginning of the subsequent nonzero drive signal, is less than a second defined time threshold.

Embodiment 12 relates to a method of applying one or more nonzero drive signals to a haptic actuator, the method comprising: receiving, by a control circuit, a nonzero drive signal to be applied to a haptic actuator, wherein the haptic actuator has a defined rated maximum voltage or a defined rated maximum current. The control circuit causes the nonzero drive signal to be applied in a boost mode, in which signal values of the nonzero drive signal are scaled to a boosted voltage range or a boosted current range, wherein an absolute value of a minimum value or maximum value of the boosted voltage range or boosted current range exceeds the defined rated maximum voltage or defined rated maximum current of the haptic actuator, and wherein the nonzero drive signal is one of one or more nonzero drive signals that are applied in the boost mode. The method further comprises tracking an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof. The method further comprises tracking an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or defined rated maximum current, or ii) a second time that is determined by scaling the cumulative amount of time in which the one or more drive signals in the boost mode have been applied at voltages or currents that exceed in absolute value the defined rated maximum voltage or defined rated maximum current. The control circuit further detects the accumulated boost time exceeding a first defined time threshold while a first portion of the nonzero drive signal is being applied in the boost mode. In response to detecting the accumulated boost time exceeding the first defined time threshold, the control circuit causes a second portion of the nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

Embodiment 13 includes the method of embodiment 12, further comprising: determining a second time threshold based on the accumulated heating time; tracking an accumulated cooling time, wherein the accumulated cooling time is a cumulative amount of time in which the control circuit receives no nonzero drive signal to be applied to the haptic actuator, and is measured from a most recent reset of the accumulated cooling time, or after the most recent reset thereof; receiving a subsequent nonzero drive signal after an end of the nonzero drive signal; determining, when the subsequent nonzero drive signal is received, whether the accumulated cooling time has reached or exceeded the determined second time threshold that was determined; and applying the subsequent nonzero drive signal to the haptic actuator in a manner that is based on whether the accumulated cooling time has reached or exceeded the determined second time threshold.

Embodiment 14 includes the method of embodiment 13, wherein the accumulated cooling time is determined to have not yet reached the determined second time threshold when the subsequent nonzero drive signal is received, and wherein the subsequent nonzero drive signal is applied in the amplitude-limited mode.

Embodiment 15 includes the method of embodiment 13, wherein the accumulated cooling time is determined to have reached or exceeded the determined second time threshold when the subsequent nonzero drive signal is received, and wherein at least a portion of the subsequent nonzero drive signal is applied in the boost mode, wherein the method further comprises resetting the accumulated boost time, the accumulated heating time, and the accumulated cooling time in response to the accumulated cooling time reaching or exceeding the determined second time threshold, and wherein determining whether the accumulated cooling time has reached or exceeded the determined second time threshold comprises determining whether the accumulated boost time, the accumulated heating time, and the accumulated cooling time have been reset.

Embodiment 16 includes the method of any one of embodiments 13-15, wherein the accumulated cooling time is tracked only after the accumulated heating time increases from a reset heating value to a higher value, such that the accumulated cooling time is not tracked if the accumulated heating time is at the reset heating value.

Embodiment 17 includes the method of any one of embodiments 13-16, wherein the determined second time threshold is determined as a multiple of the accumulated heating time.

Embodiment 18 includes the method of any one of embodiments 13-17, wherein tracking the accumulated heating time comprises updating the accumulated heating time at or before an end of each of the one or more nonzero drive signals, and the determined second time threshold is also updated based on the accumulated heating time after the accumulated heating time is updated.

Embodiment 19 includes the method of any one of embodiments 13-18, further comprising determining, at a beginning of each of the one or more nonzero drive signals, that the accumulated cooling time is less than the second time threshold, and that the accumulated boost time is less than the first defined time threshold; and setting, in response to determining that the accumulated boost time is less than the first defined time threshold, the accumulated boost time to be equal to the accumulated heating time, wherein the accumulated boost time is set before the respective nonzero drive signal of the one or more nonzero drive signals is applied in the boost mode.

Embodiment 20 includes the method of any one of embodiments 13-18, further comprising: determining, at a beginning of each of the one or more nonzero drive signals, that the accumulated cooling time is less than the determined second time threshold, and that the accumulated boost time is less than the first defined time threshold; and setting, in response to determining that that the accumulated cooling time is less than the determined second time threshold and that the accumulated boost time is less than the first time defined time threshold, the accumulated boost time to be equal to the accumulated heating time minus a fraction of the accumulated cooling time, and then resetting the accumulated heating time and the accumulated cooling time, wherein the setting of the accumulated boost time and the resetting of the accumulated heating time and accumulated cooling time are performed before the respective nonzero drive signal of the one or more nonzero drive signals is applied in the boost mode.

Embodiment 21 includes the method of any one of embodiments 12-20, wherein the accumulated heating time is the second time, and is determined by multiplying a factor to the cumulative amount of time in which the one or more nonzero drive signals in the boost mode have been applied at voltages or currents that exceed the defined rated maximum voltage or defined rated maximum current in absolute value, wherein the factor is determined based on an arcsine of a ratio between the defined rated maximum voltage or defined rated maximum current of the haptic actuator and the maximum value of the boosted voltage range or boosted current range.

Embodiment 22 includes the method of any one of embodiments 12-21, wherein the nonzero drive signal is a periodic signal alternating between positive and negative polarity, the method further comprising: when the accumulated boost time exceeds the first defined time threshold, determining that the nonzero drive signal is currently not at a zero crossing point; in response to a determination that the nonzero drive signal is not at the zero crossing point, continuing to apply the nonzero drive signal by scaling the nonzero drive signal to the boost voltage range or boost current range until an earlier occurrence of: i) the nonzero drive signal reaching the zero crossing point, or ii) the accumulated boost time exceeding a defined prolonged total boost time threshold, after which the second portion second portion of the nonzero drive signal is immediately applied in the amplitude-limited mode.

Embodiment 23 relates to a method of applying one or more nonzero drive signals to a haptic actuator, the method comprising: receiving, by a control circuit, a nonzero drive signal to be applied to a haptic actuator, wherein the haptic actuator has a defined rated maximum voltage or current. The control circuit causes the nonzero drive signal to be applied in a boost mode, in which signal values of the nonzero drive signal are scaled to a boosted voltage range or boosted current range, wherein an absolute value of a minimum value or maximum value of the boosted voltage range or boosted current range exceeds the defined rated maximum voltage or current of the haptic actuator, and wherein the nonzero drive signal is one of one or more nonzero drive signals that are applied in the boost mode. The method further comprises tracking an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof. The method further comprises tracking an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or current, or ii) a second time that is determined by scaling the cumulative amount of time in which the one or more drive signals in the boost mode have been applied at voltages or currents that exceed in absolute value the defined rated maximum voltage or current. The control circuit detects the accumulated boost time exceeding a first defined time threshold while the nonzero drive signal is being applied in the boost mode. The control circuit further receives, after an end of the nonzero drive signal, a subsequent nonzero drive signal. The method further comprises causing the subsequent nonzero drive signal to be applied in an amplitude-limited mode, in which the subsequent nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or current of the haptic actuator, wherein none of the nonzero drive signal is applied in the amplitude-limited mode.

Embodiment 23 may be combined with the features of any one of embodiments 13, 14, or 16-22.

Embodiment 24 includes the method of embodiment 23, further comprising: after the accumulated boost time exceeds the first defined time threshold, monitoring the accumulated boost time to detect whether the accumulated boost time exceeds a defined prolonged total boost time threshold, wherein the accumulated boost time does not exceed the defined prolonged total boost time threshold when the nonzero drive signal ends.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A method of applying one or more nonzero drive signals to a haptic actuator, the method comprising:
   receiving, by a control circuit, a nonzero drive signal to be used by the haptic actuator to generate a haptic effect, wherein the haptic actuator has a defined rated maximum voltage or a defined maximum rated current;
   causing, by the control circuit, a first portion of the nonzero drive signal to be applied to the haptic actuator in a boost mode, in which the first portion of the nonzero drive signal is scaled to a boosted voltage range or boosted current range, wherein an absolute value of a minimum value or maximum value of the boosted voltage range or boosted current range exceeds the defined rated maximum voltage or the defined rated maximum current of the haptic actuator;
   detecting a boost duration exceeding a first defined time threshold, wherein the boost duration is a duration since a start time of the boost mode; and
   in response to detecting the boost duration exceeding the first defined time threshold, causing a second portion of the nonzero drive signal to be applied to the haptic actuator in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

2. The method of claim 1, wherein detecting the nonzero drive signal comprises detecting a beginning of the nonzero drive signal, and wherein the start time of the boost mode is the beginning of the nonzero drive signal.

3. The method of claim 2, further comprising determining that a cool-down duration, which is a duration from an end of a previous nonzero drive signal to the beginning of the nonzero drive signal, exceeds a second defined time threshold, wherein the previous nonzero drive signal and the nonzero drive signal are consecutive nonzero drive signals.

4. The method of claim 1, wherein the nonzero drive signal is a latest one of a plurality of consecutive nonzero drive signals that are applied in the boost mode, wherein the start time of the boost mode is a beginning of an earliest one of the plurality of consecutive nonzero drive signals, and wherein each nonzero drive signal of the plurality of consecutive nonzero drive signals is applied in the boost mode only in response to a determination that a duration from the start time of the boost mode to the beginning of the respective nonzero drive signal has not exceeded the first defined time threshold.

5. The method of claim 1, wherein the nonzero drive signal is detected from an output of a signal generator in communication with the control circuit.

6. The method of claim 1, further comprising:
detecting, after an end of the nonzero drive signal, a subsequent nonzero drive signal to be applied to the haptic actuator;
determining that a cool-down duration, which is a duration between a beginning of the subsequent nonzero drive signal and an end of a previous consecutive nonzero drive signal, does not exceed a second defined time threshold, wherein the previous nonzero drive signal and the subsequent nonzero drive signal are consecutive nonzero drive signals; and
in response to determining that the cool-down duration does not exceed the second defined time threshold, causing all of the subsequent nonzero drive signal to be applied in the amplitude-limited mode.

7. The method of claim 1, further comprising:
detecting, after an end of the nonzero drive signal, a subsequent nonzero drive signal to be applied to the haptic actuator;
determining that a cool-down duration, which is a duration between a beginning of the subsequent nonzero drive signal and an end of a previous consecutive nonzero drive signal, exceeds a second defined time threshold, wherein the previous nonzero drive signal and the subsequent nonzero drive signal are consecutive nonzero drive signals; and
in response to determining that the cool-down duration exceeds the second defined time threshold, causing at least a portion of the subsequent nonzero drive signal to be applied in the boost mode.

8. The method of claim 7, further comprising:
updating the start time of the boost mode to be the beginning of the subsequent nonzero drive signal, such that the start time is an updated start time of the boost mode, wherein the subsequent nonzero drive signal is applied in the boost mode until an end of the subsequent nonzero drive signal, or until a second boost duration exceeds the first defined time threshold, the second boost duration being a duration since the updated start time of the boost mode.

9. The method of claim 1, wherein the nonzero drive signal is a periodic signal alternating between positive and negative polarity, the method further comprising: when the boost duration exceeds the first defined time threshold, determining that the nonzero drive signal is currently not at a zero crossing point;
in response to a determination that the nonzero drive signal is not at the zero crossing point, applying the nonzero drive signal in an extended boost mode in which the nonzero drive signal continues to be scaled to the boosted voltage range or boosted current range;
while the nonzero drive signal is being applied in the extended boost mode, detecting at least one of: i) the nonzero drive signal reaching the zero crossing point, or ii) an extended boost mode duration exceeding an third defined time threshold, wherein the extended boost mode duration is a duration since detecting the boost duration exceeding the first defined threshold,
wherein, in response to detecting the at least one of the nonzero drive signal reaching the zero crossing point or the extended boost mode duration exceeding the third defined time threshold, the second portion of the nonzero drive signal begins to be applied in the amplitude-limited mode.

10. A non-transitory computer-readable medium having instructions that, when executed by a control circuit, causes the control circuit
to receive a nonzero drive signal to be used by the haptic actuator to generate a haptic effect, wherein the haptic actuator has a defined rated maximum voltage or a defined maximum rated current;
to cause a first portion of the nonzero drive signal to be applied to the haptic actuator in a boost mode, in which the first portion of the nonzero drive signal is scaled to a boosted voltage range or boosted current range, wherein an absolute value of a minimum value or maximum value of the boosted voltage range or boosted current range exceeds the defined rated maximum voltage or the defined rated maximum current of the haptic actuator;
to detect a boost duration exceeding a first defined time threshold, wherein the boost duration is a duration since a start time of the boost mode; and
to cause, in response to detecting the boost duration exceeding the first defined time threshold, a second portion of the nonzero drive signal to be applied to the haptic actuator in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

11. A method of applying one or more nonzero drive signals to a haptic actuator, the method comprising:
receiving, by a control circuit, a nonzero drive signal to be applied to a haptic actuator, wherein the haptic actuator has a defined rated maximum voltage or a defined rated maximum current;
causing the nonzero drive signal to be applied in a boost mode, in which signal values of the nonzero drive signal are scaled to a boosted voltage range or a boosted current range, wherein an absolute value of a minimum value or maximum value of the boosted voltage range or boosted current range exceeds the defined rated maximum voltage or defined rated maximum current of the haptic actuator, and wherein the nonzero drive signal is one of one or more nonzero drive signals that are applied in the boost mode;

tracking an accumulated boost time, wherein the accumulated boost time is a cumulative amount of time that the control circuit has spent applying the one or more nonzero drive signals while in the boost mode, wherein the accumulated boost time is measured from a most recent reset of the accumulated boost time or after the most recent reset thereof;

tracking an accumulated heating time, wherein the accumulated heating time is: i) a cumulative amount of time in which the one or more nonzero drive signals in the boost mode have being applied to the haptic actuator at voltages or currents that exceed, in absolute value, the defined rated maximum voltage or defined rated maximum current, or ii) a second time that is determined by scaling the cumulative amount of time in which the one or more drive signals in the boost mode have been applied at voltages or currents that exceed in absolute value the defined rated maximum voltage or defined rated maximum current;

detecting the accumulated boost time exceeding a first defined time threshold while a first portion of the nonzero drive signal is being applied in the boost mode; and in response to detecting the accumulated boost time exceeding the first defined time threshold, causing a second portion of the nonzero drive signal to be applied in an amplitude-limited mode, in which the second portion of the nonzero drive signal is scaled to an amplitude-limited voltage range or amplitude-limited current range, wherein an absolute value of a minimum value or maximum value of the amplitude-limited voltage range or of the amplitude-limited current range does not exceed the defined rated maximum voltage or defined rated maximum current of the haptic actuator.

12. The method of claim 11, further comprising:
determining a second time threshold based on the accumulated heating time;
tracking an accumulated cooling time, wherein the accumulated cooling time is a cumulative amount of time in which the control circuit receives no nonzero drive signal to be applied to the haptic actuator, and is measured from a most recent reset of the accumulated cooling time, or after the most recent reset thereof;
receiving a subsequent nonzero drive signal after an end of the nonzero drive signal;
determining, when the subsequent nonzero drive signal is received, whether the accumulated cooling time has reached or exceeded the second time threshold that was determined; and
applying the subsequent nonzero drive signal to the haptic actuator in a manner that is based on whether the accumulated cooling time has reached or exceeded the second time threshold.

13. The method of claim 12, wherein the accumulated cooling time is determined to have not yet reached the second time threshold when the subsequent nonzero drive signal is received, and wherein the subsequent nonzero drive signal is applied in the amplitude-limited mode.

14. The method of claim 12, wherein the accumulated cooling time is determined to have reached or exceeded the second time threshold when the subsequent nonzero drive signal is received, and wherein at least a portion of the subsequent nonzero drive signal is applied in the boost mode, wherein the method further comprises resetting the accumulated boost time, the accumulated heating time, and the accumulated cooling time in response to the accumulated cooling time reaching or exceeding the second time threshold, and wherein determining whether the accumulated cooling time has reached or exceeded the second time threshold comprises determining whether the accumulated boost time, the accumulated heating time, and the accumulated cooling time have been reset.

15. The method of claim 12, wherein the accumulated cooling time is tracked only after the accumulated heating time increases from a reset heating value to a higher value, such that the accumulated cooling time is not tracked if the accumulated heating time is at the reset heating value.

16. The method of claim 12, wherein the second time threshold is determined as a multiple of the accumulated heating time.

17. The method of claim 12, wherein tracking the accumulated heating time comprises updating the accumulated heating time at or before an end of each of the one or more nonzero drive signals, and the second time threshold is also updated based on the accumulated heating time after the accumulated heating time is updated.

18. The method of claim 12, further comprising determining, at a beginning of each of the one or more nonzero drive signals, that the accumulated cooling time is less than the second time threshold, and that the accumulated boost time is less than the first defined time threshold; and
setting, in response to determining that the accumulated boost time is less than the first defined time threshold, the accumulated boost time to be equal to the accumulated heating time, wherein the accumulated boost time is set before the respective nonzero drive signal of the one or more nonzero drive signals is applied in the boost mode.

19. The method of claim 12, further comprising:
determining, at a beginning of each of the one or more nonzero drive signals, that the accumulated cooling time is less than the second time threshold, and that the accumulated boost time is less than the first defined time threshold; and
setting, in response to determining that that the accumulated cooling time is less than the second time threshold and that the accumulated boost time is less than the first time defined time threshold, the accumulated boost time to be equal to the accumulated heating time minus a fraction of the accumulated cooling time, and then resetting the accumulated heating time and the accumulated cooling time, wherein the setting of the accumulated boost time and the resetting of the accumulated heating time and accumulated cooling time are performed before the respective nonzero drive signal of the one or more nonzero drive signals is applied in the boost mode.

20. The method of claim 11, wherein the nonzero drive signal is a periodic signal alternating between positive and negative polarity, the method further comprising: when the accumulated boost time exceeds the first defined time threshold, determining that the nonzero drive signal is currently not at a zero crossing point;
in response to a determination that the nonzero drive signal is not at the zero crossing point, continuing to apply the nonzero drive signal by scaling the nonzero drive signal to the boost voltage range or boost current range until an earlier occurrence of: i) the nonzero drive signal reaching the zero crossing point, or ii) the accumulated boost time exceeding a defined prolonged total boost time threshold, after which the second portion second portion of the nonzero drive signal is immediately applied in the amplitude-limited mode.

* * * * *